United States Patent
Neiser

(10) Patent No.: US 10,967,956 B2
(45) Date of Patent: Apr. 6, 2021

(54) APPARATUS AND METHOD FOR INTERACTION WITH A FLUID

(71) Applicant: Paul Neiser, Mountain View, CA (US)

(72) Inventor: Paul Neiser, Mountain View, CA (US)

( * ) Notice: Subject to any disclaimer, the term of this patent is extended or adjusted under 35 U.S.C. 154(b) by 319 days.

(21) Appl. No.: 15/985,464

(22) Filed: May 21, 2018

(65) Prior Publication Data

US 2018/0334248 A1 Nov. 22, 2018

Related U.S. Application Data

(60) Provisional application No. 62/564,250, filed on Sep. 27, 2017, provisional application No. 62/509,732, (Continued)

(51) Int. Cl.
*B64C 39/00* (2006.01)
*B64C 23/00* (2006.01)
(Continued)

(52) U.S. Cl.
CPC .............. *B64C 23/005* (2013.01); *B64C 3/26* (2013.01); *B64C 3/36* (2013.01); *B64C 11/18* (2013.01);
(Continued)

(58) Field of Classification Search
CPC ....... B64C 11/18; B64C 11/343; B64C 13/50; B64C 2001/0045; B64C 23/005;
(Continued)

(56) References Cited

U.S. PATENT DOCUMENTS

| 1,364,752 A | 1/1921 | Hallstead |
| 2,794,608 A * | 6/1957 | Johnson .................. B64C 3/40 244/46 |

(Continued)

FOREIGN PATENT DOCUMENTS

| DE | 3606549 A1 | 9/1987 |
| GB | 329994 A | 5/1930 |

(Continued)

OTHER PUBLICATIONS

Neiser, Paul, International Search Report and Written Opinion, PCT/US2018/033742, Oct. 25, 2018, 11 pgs.
(Continued)

*Primary Examiner* — Claude J Brown
(74) *Attorney, Agent, or Firm* — Morgan, Lewis & Bockius LLP

(57) ABSTRACT

A fluid interaction apparatus includes a wing having a first configuration with a first profile drag coefficient and a second configuration with a second profile drag coefficient that is less than the first profile drag coefficient. The fluid interaction apparatus further includes a body having a longitudinal axis, wherein the body is coupled to the wing. The fluid interaction apparatus further includes an actuator configured to change the wing from the first configuration when moving in a first direction relative to the body to the second configuration when moving in a second direction relative to the body, the second direction having a substantial component parallel to the longitudinal axis of the body.

13 Claims, 26 Drawing Sheets

Related U.S. Application Data filed on May 23, 2017, provisional application No. 62/509,225, filed on May 22, 2017.

(51) Int. Cl.
*B64C 3/36* (2006.01)
*B64C 11/34* (2006.01)
*B64C 3/26* (2006.01)
*B64C 13/50* (2006.01)
*B64C 11/18* (2006.01)
*B64C 29/00* (2006.01)
*B64C 1/00* (2006.01)

(52) U.S. Cl.
CPC ............ *B64C 11/343* (2013.01); *B64C 13/50* (2013.01); *B64C 39/005* (2013.01); *B64C 29/0091* (2013.01); *B64C 2001/0045* (2013.01)

(58) Field of Classification Search
CPC ..... B64C 29/0091; B64C 39/005; B64C 3/26; B64C 3/36; B64C 33/00
USPC .......................................................... 244/52
See application file for complete search history.

(56) References Cited

U.S. PATENT DOCUMENTS

| | | | | | |
|---|---|---|---|---|---|
| 3,229,545 | A | * | 1/1966 | Hautau | B64C 3/40 74/89.28 |
| 3,489,375 | A | * | 1/1970 | Tracy | B64C 3/40 244/46 |
| 4,022,403 | A | * | 5/1977 | Chiquet | B61B 15/00 244/46 |
| 5,899,410 | A | * | 5/1999 | Garrett | B64C 39/068 244/45 R |
| 7,185,847 | B1 | * | 3/2007 | Bouchard | F42B 10/12 244/3.28 |
| 8,915,697 | B2 | * | 12/2014 | Pitre | F03D 13/10 415/1 |
| 10,358,205 | B2 | * | 7/2019 | Saroka | F42B 10/38 |
| 2005/0274844 | A1 | * | 12/2005 | Stuhr | B64C 3/40 244/46 |
| 2007/0243063 | A1 | * | 10/2007 | Schellstede | F03D 13/22 416/10 |
| 2015/0151830 | A1 | | 6/2015 | Fengfeng | |
| 2015/0246720 | A1 | * | 9/2015 | Gandhi | B60F 5/02 244/2 |
| 2017/0283035 | A1 | * | 10/2017 | Ji | B64C 39/024 |

FOREIGN PATENT DOCUMENTS

GB 470537 A 8/1937
WO WO-2013066439 A1 * 5/2013 ............ F42B 10/14

OTHER PUBLICATIONS

Neiser, Paul, International Preliminary Report on Patentability, PCT/US2018/033742, Nov. 26, 2019, 8 pgs.

* cited by examiner

2600

2602 Provide a fluid interaction apparatus that includes:

a wing having a first configuration with a first profile drag coefficient and a second configuration with a second profile drag coefficient that is less than the first profile drag coefficient; and a body coupled to the wing 2604 Move the wing through a fluid in a periodic path relative to the body, including moving the wing in a first direction during a first phase of the periodic path and, during a second phase of the periodic path, moving the wing in a second direction having a substantial component parallel to a velocity of the fluid 2606 Change the wing from the first configuration when moving in the first direction to the second configuration when moving in the second direction

Figure 26

APPARATUS AND METHOD FOR INTERACTION WITH A FLUID

RELATED APPLICATIONS

This application claims priority to U.S. Provisional Patent Application No. 62/564,250, filed Sep. 27, 2017, entitled "Apparatus and Method for Interaction with a Fluid"; U.S. Provisional Patent Application No. 62/509,732, filed May 23, 2017, entitled "Apparatus and Method for Interacting with a Fluid"; and U.S. Provisional Patent Application No. 62/509,225, filed May 22, 2017, entitled "Apparatus and Method for Interacting with a Fluid," each of which is hereby incorporated by reference in its entirety.

BACKGROUND

A conventional fixed wing aircraft is unable to hover, as well as take-off or land vertically. The minimum speed of such an aircraft in horizontal flight is the stall speed. A large stall speed typically requires a long runway for take-off and landing, which significantly limits the number of reachable destinations of an aircraft. A greater than zero stall speed is also a safety concern, since it adds an additional failure mode to the operation of an aircraft.

A conventional fixed wing aircraft also typically has an empennage (e.g., a tail assembly) at the rear of the fuselage, where in some cases the empennage is also supported by an extension of the fuselage. These features add weight and increase the wetted area. For stability reasons a horizontal stabilizer produces a downwards force, which must be counteracted by the main wing, which increases drag further. These penalties can be mitigated, and the maneuverability of the aircraft can be increased, by delegating control authority to the main wing and its configuration relative to the body of the aircraft.

The helicopter is currently a popular aircraft capable of vertical take-off and landing (VTOL). Advancing blade compressibility effects and retreating blade stall limit the maximum cruising speed of a conventional helicopter. During cruise, the magnitude of the free stream flow velocity of a rotor blade varies periodically. This increases the average profile drag relative to a comparable fixed wing. Since the cruising speed constraint also limits the minimum induced drag, the range of a helicopter relative to a comparable fixed wing aircraft of the same weight is reduced. The large tip velocities of the rotor blades also cause noise pollution. The tail rotor of conventional helicopter is an exposed single point of failure which consumes power without contributing to thrust or lift. The large amount of kinetic energy contained in the blades is also a safety. To avoid resonance effects, the main rotors of conventional helicopters typically operate at constant rotational speed throughout the flight envelope. This may reduce the size of the flight envelope and impose additional performance penalties on a portion of the flight envelope.

To address the problems with helicopters and conventional fixed wing aircraft, hybrid aircraft have been proposed. These typically feature a fixed wing and a collection of rotors which enable VTOL operations. These rotors are stowed or throttled back during cruise, when less thrust is required. Such hybrid aircraft are heavier and have a higher profile drag compared to purely cruise-optimized fixed wing aircraft. Other VTOL aircraft consume more power during hover, which limits the endurance.

Similar to helicopter rotors, conventional propellers that are used for thrust are noisy and suffer from compressibility effects. As described below, the ratio of the profile drag to the induced drag of a propeller blade is also unnecessarily large, which is also relevant to propellers being used in wind turbines.

SUMMARY

The problems described above are addressed by the embodiments described herein by providing an apparatus with a morphing wing (e.g., a wing whose shape or volume is changed during flight). In some embodiments, aero- or hydro-dynamic properties are improved by providing a wing that morphs periodically, or continuously (or nearly so) during flight.

To that end, in accordance with some embodiments, a fluid interaction apparatus (e.g., an aircraft, a ship, or a wind turbine) is provided. The fluid interaction apparatus includes a wing having a first configuration with a first profile drag coefficient and a second configuration with a second profile drag coefficient that is less than the first profile drag coefficient. The fluid interaction apparatus further includes a body having a longitudinal axis, wherein the body is coupled to the wing. The fluid interaction apparatus further includes an actuator configured to change the wing from the first configuration when moving in a first direction relative to the body to the second configuration when moving in a second direction relative to the body, the second direction having a substantial component parallel to the longitudinal axis of the body.

Further, in accordance with some embodiments, a vehicle (e.g., an aircraft) is provided. The vehicle includes a body having a longitudinal axis. The vehicle further includes a telescopic wing configured to extend and contract along a span of the telescopic wing during periodic movement of the telescopic wing relative to the body. The vehicle further includes a support member having a first end rotatably coupled to the body and an opposing second end rotatably coupled to the telescopic wing.

Further, in accordance with some embodiments, an aircraft is provided. The aircraft includes a body having a longitudinal axis. The aircraft further includes a first telescopic wing configured to extend and contract along a span of the first telescopic wing during periodic movement of the first telescopic wing relative to the body, wherein the span of the first telescopic wing is substantially perpendicular to the longitudinal axis of the body. The aircraft further includes a first support member having a first end rotatably coupled to the body and an opposing second end rotatably coupled to the first telescopic wing. The aircraft further includes a second telescopic wing configured to extend and contract along a span of the second telescopic wing during periodic movement of the second telescopic wing relative to the body. The span of the second telescopic wing is substantially perpendicular to the longitudinal axis of the body. The aircraft further includes a second support member having a first end rotatably coupled to the body and an opposing second end rotatably coupled to the second telescopic wing.

Further, in accordance with some embodiments, a method of interacting with a fluid is provided. The method includes providing a fluid interaction apparatus that includes: a wing having a first configuration with a first profile drag coefficient and a second configuration with a second profile drag coefficient that is less than the first profile drag coefficient. The fluid interaction apparatus further includes a body coupled to the wing. The method further includes moving the wing through the fluid in a periodic path relative to the body, including moving the wing in a first direction during a first phase of the periodic path and, during a second phase of the periodic path, moving the wing in a second direction having a substantial component parallel to a velocity of the fluid. The method further includes changing the wing from the first configuration when moving in the first direction to the second configuration when moving in the second direction.

Further, in accordance with some embodiments, a fluid interaction apparatus is provided. The fluid interaction apparatus includes a wing having a first configuration with a first profile drag coefficient and a second configuration with a second profile drag coefficient that is less than the first profile drag coefficient. The fluid interaction apparatus further includes a body coupled to the wing. The fluid interaction apparatus further includes means for moving the wing through a fluid in a periodic path relative to the body, including moving the wing in a first direction during a first phase of the periodic path and, during a second phase of the periodic path, moving the wing in a second direction having a substantial component parallel to a velocity of the fluid. The fluid interaction apparatus further includes means for changing the wing from the first configuration when moving in the first direction to the second configuration when moving in the second direction.

Further, in accordance with some embodiments, a fluid interaction apparatus is provided. The fluid interaction apparatus includes a wing; a body coupled to the wing; and an actuator configured to move the wing periodically. A direction of motion of the wing within the path is in a plane perpendicular to the span of the wing. The path is one of a linear path or a figure-eight shaped path.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 26 illustrates a flow chart for a method of interacting with a fluid, in accordance with some embodiments.

DETAILED DESCRIPTION OF THE INVENTION

Figure 1:
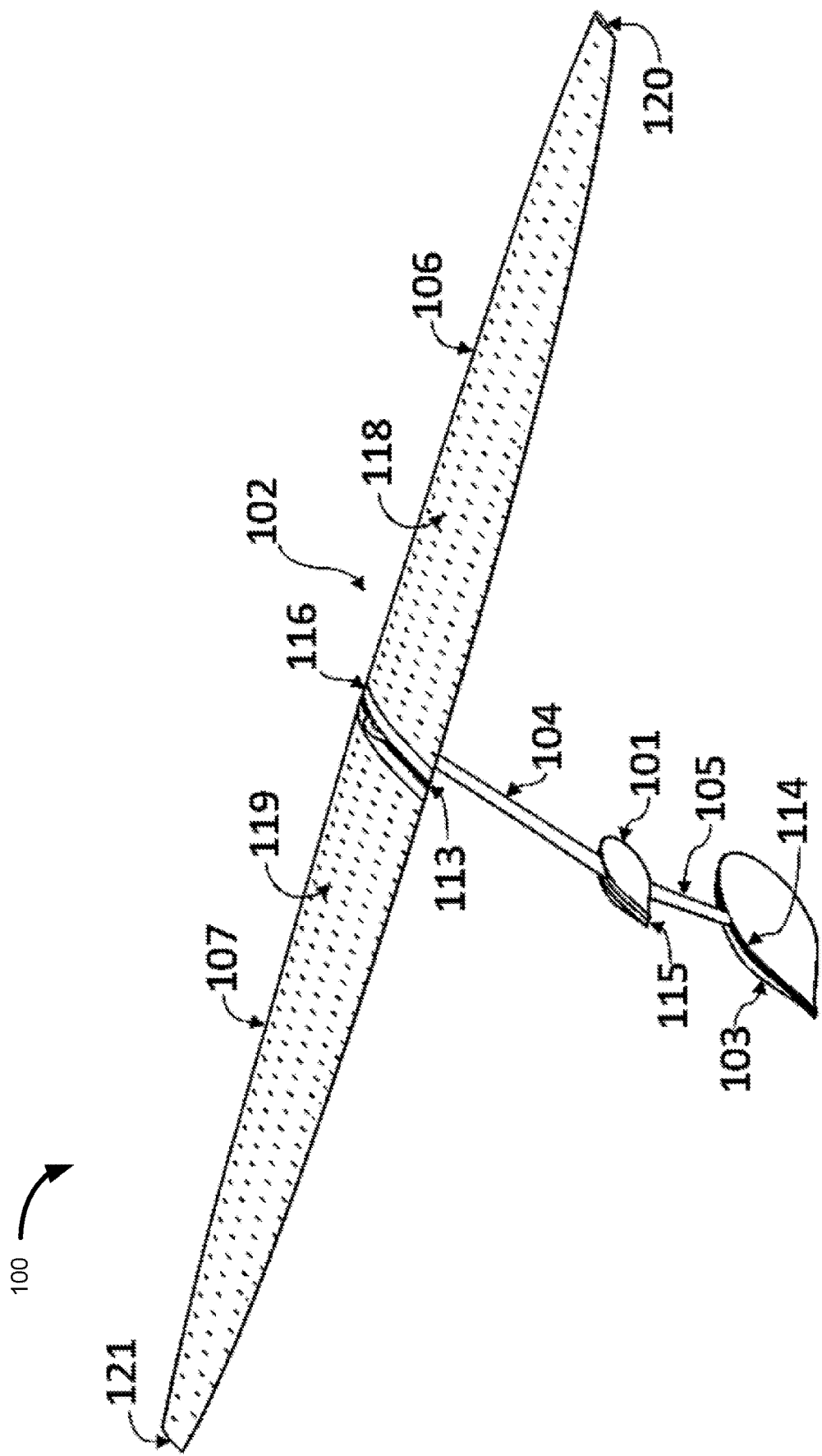
FIG. 1 is a perspective view of a vehicle with telescopic wings (e.g., an aircraft), in accordance with some embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

One can define an inertial reference frame. When the relative distances and speeds are small enough, one can neglect the rotation of the earth. In some embodiments, an "inertial frame" is located on the surface of the earth. In some embodiments, the X-axis of the inertial frame is defined to be pointing north, and the Y-axis pointing west. In some embodiments, the Z-axis is pointing in the opposite direction of the local acceleration due to gravity.

The term "fluid" used herein encompasses all types of materials that exhibit the properties of a fluid. It can refer to a liquid such as water, or a gas such as air, for example.

The term "fluid interaction apparatus" or "FIA" used herein can apply to any apparatus that experiences a force due to interaction with a fluid. Note that an FIA can interact with several different types and species of fluid simultaneously, such as water and air in the case of a ship. Unless specified, the assembly of different fluids will be referred to as "the fluid" for simplicity. For example, the force can comprise a buoyancy force, an aerodynamic or hydrodynamic lifting or drag force. The drag force can comprise viscous, pressure or wave drag, amongst others. Note that an FIA can have a zero net force if several different types of forces cancel at a particular instant in time. One example of an FIA is an apparatus that displaces the surrounding fluid and experiences a force due to a pressure gradient in the fluid, like an aerostat. Such an apparatus can also experience other types of forces, such as lift and drag forces of aerodynamic or hydrodynamic origin. Another example of an FIA comprises a wing or foil. An FIA can also comprise an apparatus which accelerates individual particles in a fluid by means of electromagnetic forces. An example would be a Hall Effect thruster. Note that a fuselage or any apparatus, for which interacting with the fluid is not the primary purpose, is also an FIA, as long as it experiences a force due to interaction with the fluid. The number of FIAs within an embodiment are a matter of definition and can vary. Thus, an FIA could comprise several other FIAs. For example, a conventional propeller can be treated as one FIA, while each propeller blade is also regarded as an FIA. The entire embodiment can also be considered to be one FIA.

One can define a collection of apparatuses involving at least one FIA as a "vehicle." An example of a vehicle is an aircraft, or a ship.

The FIA position and orientation can be described with a reference frame centered on the instantaneous center of mass with axes aligned with the instantaneous principal axes. These axes are obtained by treating the FIA as a rigid body instantaneously. The axis labels are determined from context, with the z-axis pointing generally downwards and the x-axis pointing forward. This frame is called the FIA frame ("FIAF").

The term "nominal, level cruise" used herein describes a locomotion mode in which the average velocity of the vehicle center of mass is constant over one period, and lies in the horizontal plane parallel to the XY-plane of the inertial frame. For simplicity, said velocity vector is aligned with the X-axis of the inertial frame by default. The term "nominal" indicates the absence of disturbances, which is intended to simplify the description of the locomotion mode.

In the case where the motion of the FIA is periodic, one can also define an average FIAF, or "AFIAF". Note that the motion during subsequent periods need not be identical, in which case each period has a distinct AFIAF. Over a specified period one can calculate an average speed and corresponding direction vector. In some embodiments, a reference frame is defined that is centered on a point that travels with the average velocity throughout the duration of the period. The initial position of this reference frame is given by letting the average position of the FIAF over one period coincide with the average position of the AFIAF frame over one period. Thus, the trajectory of this new reference frame in the inertial frame is a straight line. During nominal, level cruise this straight line is horizontal. This line is coincident with and halved by the point that describes the average position of the FIAF in the inertial frame during the specified period. The x-axis of the AFIAF is aligned with the average velocity vector, and the z-axis lies in a plane which contains the x-axis as well as the local acceleration due to gravity, and is directed downwards.

In some embodiments, the origin of the inertial frame is defined to be sufficiently close to the instantaneous AFIAF origin, such that the curvature of the earth can be neglected. Note that during nominal, level cruise the AFIAF x-axis is aligned with the inertial frame X-axis, and the AFIAF z-axis is parallel to and pointing in the opposite direction of the inertial frame Z-axis The term "wing apparatus" used herein describes a collection of material, part of which can interact with the surrounding fluid via contact stresses which act on the interface between the wing apparatus and the fluid. In some embodiments, a "wing" or "wing apparatus" is a mechanical element that produces lift when interacting with a surrounding fluid.

The term "fixed wing" used herein describes a particular kind of wing apparatus. In some embodiments, a "fixed wing" aircraft is an aircraft with a wing apparatus that is not configured to move (e.g., rotate) with respect to a body (e.g., fuselage) of the aircraft (e.g., a wing of a fixed wing aircraft may deform relative to a body of the aircraft but is not rotationally-coupled to the body of the aircraft). In some embodiments, a "fixed wing" aircraft is distinct from a rotary-wing aircraft (e.g., a helicopter). In some embodiments, portions of a fixed wing (e.g., flaps and ailerons) may be configured to move with respect to a body.

The term "morphing wing" used herein refers to any wing apparatus which comprises more than one pseudo-rigid body during a specified set of locomotion modes. Note that a morphing wing is able to operate as a fixed wing during a certain duration of time within a specified locomotion mode.

The "net fluid force" or "NFF" is the net force exerted by the surrounding fluid(s) on a specified apparatus. A fluid can give rise to different types of stresses that act on the apparatus. When each type of stress is integrated over the corresponding boundary between the fluid and the apparatus, a resulting force can be found. When all resulting forces are summed together for each fluid, a resulting NFF can be established. The NFF acts on a center of gravity of the apparatus, designated "CG".

The "net fluid moment", or "NFM" is the net moment exerted by the surrounding fluid(s) on a specified apparatus about the apparatus center of gravity. The stress applied to the apparatus by the fluid can be integrated over an incremental area or volume of the apparatus. The resulting incremental force vector might produce an incremental moment about the instantaneous center of gravity of the apparatus. When all incremental moments are integrated over the entire area or volume of the apparatus, the NFM is found.

A first apparatus might experience stresses from a second apparatus. These stresses can be integrated over the entire volume of the first apparatus to yield an "internal force", or IF, and an "internal moment", or IM. Note that the IF and IM act on and about the instantaneous center of gravity of the first apparatus. The first apparatus can experience an IF from several other apparatuses. When all individual IFs acting on the first apparatus are summed together, the "net internal force", or NIF, is found. The NIF also acts on the center of gravity of the first apparatus. Similarly, the "net internal moment", or NIM, is the sum of all IMs acting on the first apparatus and about its center of gravity. Note that although the IFs and IMs are external to a particular apparatus, they are internal to the vehicle. The sum of all internal forces and internal moments acting on the sum of all elements of the vehicle is zero.

A specified apparatus experiences a net force and net moment acting on and about its center of gravity. By subtracting the IF and IM from the net force and net moment, one can find the net external force and net external moment acting on the apparatus. These can comprise a net fluid force and moment as well as gravity forces, for example. The net external forces and moments acting on an apparatus contribute to the net external forces and net external moments acting on the vehicle.

The term "free stream flow" is the theoretical flow relative to a specified point on an FIA which would occur if the entire vehicle did not interact with the fluid. It can thus also be referred to as a global free stream flow. The free stream flow can comprise contributions from the motion of the FIA in the inertial frame. It can also comprise contributions from the motion of the fluid in the inertial frame, such as wind or currents. Different specified points of the FIA can experience different free stream flows. For example, an FIA could rotate, such that different points on the FIA move at different velocities in the inertial frame and experience different free stream flow velocities in a theoretically stationary fluid.

The term "local free stream flow" is the theoretical flow relative to a specified FIA which would occur if only the specified FIA did not interact with the fluid. The local free stream flow comprises a contribution of the free stream flow as well as a contribution due to the remainder of the vehicle interacting with the fluid. For example, the downwash created by a horizontal fixed wing could affect the local free stream flow velocity magnitude and direction relative to a horizontal stabilizer mounted downstream of the wing.

One can define a local lift and local drag as follows. A fluid force can be found by identifying the stresses acting between a fluid and a specified closed area or volume of an FIA and integrating said stresses over said area or volume. The fluid force can be a net fluid force acting on a specified FIA, or an incremental fluid force acting on a specified portion of a specified FIA, for example. At a specified reference point of the area or volume, such as the area or volume centroid, one can find the velocity vector of the local free stream flow. By default, when the fluid force is a net fluid force acting on a specified FIA, the reference point is the center of gravity of the FIA. Note that the FIA in question may also be an incremental volume or area of another FIA. The local drag is the component of the fluid force which is aligned with the local free stream flow velocity vector. The local lift is the component orthogonal to the local drag. Note that the local drag can be negative if it is directed in the opposite direction of the relative local free stream flow velocity vector. This would be the case for an FIA that produces thrust, such as a propeller, for example.

One can define the global lift and global drag for a specified FIA or specified portion thereof as follows. The term "global" could also be dropped when it is clear that a vector component of the NFF is being referred to, as opposed to the NFF itself. The global lift and drag are defined in the same manner as the local lift and drag, except that the free stream flow velocity is used as to resolve the components of the lift and drag as opposed to the local free stream flow velocity. The global drag is thus the component of the aforementioned fluid force parallel to the free stream flow velocity vector at a specified reference point. The global lift vector is the component of the fluid force orthogonal to the global drag vector. Note that an FIA can also produce a negative global drag, if it is directed in the opposite direction of the relative free stream flow velocity vector.

The component of a net fluid force in the positive X-direction of the inertial frame is defined as "forward force" FF. The component of a net fluid force along the positive Z-direction of the inertial frame is defined as "upward force" UF. The component of a net fluid force in the negative Y-direction of the inertial frame is defined as "rightward force" RF. Note that the FF, UF, RF can be negative. The FF, UF, and RF are acting at the center of gravity of a specified FIA.

One can identify at least two ways in which an incremental volume or area of an FIA interacts with a fluid to generate an incremental force.

The first type of fluid interaction arises from stresses acting on an FIA due to free stream fluid with a static pressure gradient being displaced through action of the FIA. Examples of FIAs employing the first type of fluid interaction are a blimp, an aerostat, or a hot air balloon.

The second type of fluid interaction involves the rate of change of momentum of a fluid. Examples of FIAs employing the second type of fluid interaction are a helicopter main rotor, a rocket motor, a propeller, a Hall Effect thruster, a duct, an aircraft wing, or an accelerating flat plate with a normal vector parallel to the free stream flow.

The "type of FIA" refers to the way in which the NFF is generated. For example, when a portion of the NFF is generated via the first type of fluid interaction, a portion of the FIA type can be described as an aerostat or hydrostat, or similarly for other fluids. When a portion of the NFF is generated via the second type of fluid interaction, one can further distinguish between different types of FIA in terms of the way in which a rate of change of momentum is applied to the fluid. For example, if the rate of change of momentum is applied by means of a conventional wing, the type of FIA can be described as such. Other types of FIAs are the propeller type, rocket type, for example. Note that a particular FIA can be a hybrid configuration of several types, such as is the case for a hybrid airship which experiences a substantial portion of NFF from both aerostatic and aerodynamic effects.

In the aforementioned vector description of lift and drag, any thrust components aligned with the free stream flow affect the magnitude of the drag. Furthermore, buoyancy forces can appear in both lift and drag components. Thrust and buoyancy are more closely related to the conventional notion of lift, however. To remedy this, one can characterize the performance of a particular FIA in terms of the power consumed in connection with the FIA at a specified point of time.

One can identify at least two such types of power consumption. The first type of power consumption is referred to as the "NFF unrelated power" consumption, while the second type of power consumption is denoted the "NFF related power" consumption. Each FIA has an NFF related and unrelated power consumption associated with it.

The NFF related power consumption of a specified FIA is the portion of power consumed by the entire vehicle that is associated with the interaction of the specified FIA with the fluid. The interaction with the fluid can take several forms. It can comprise any power consumed by the entire vehicle due to the influence of the specified FIA on the fluid flow field. This can include any power consumed due to the FIA imparting a net of change of momentum to the fluid in the far wake compared to free stream conditions, which in turn results in a net change in energy of the fluid. The net change of momentum can arise from induced drag and profile drag experienced by the FIA, as well as any increase in drag experienced by the remainder of the vehicle due to the action of the FIA, for example. The interaction also includes any effect of the mass of materials which are added to the structure of the FIA or the remainder of the vehicle in order to facilitate the interaction between the FIA and the fluid. Note that the NFF related power consumption can be non-zero even if the NFF acting on the specified FIA is zero.

The NFF unrelated power consumption of a specified FIA can be calculated by subtracting from the total power consumption of the vehicle the NFF related power consumption of the specified FIA. The NFF unrelated power consumption is the portion of power consumed by the entire vehicle that is not related to the interaction between the specified FIA and the fluid at a specified point in time. One can interpret the NFF unrelated power as the power that would be consumed by the entire vehicle regardless of the interaction between the fluid and the specified FIA.

In the following paragraphs, several characteristics of embodiments of the disclosure are described.

In some embodiments, a fluid interaction apparatus (FIA) is provided (e.g., fluid interaction apparatus 100, FIGS. 1-13, or fluid interaction apparatus 200, FIGS. 14-24).

In some embodiments, the FIA interacts with a gaseous fluid (e.g., air). In some embodiments, the FIA is a vehicle. In some embodiments, the FIA is an aircraft. In some embodiments, the FIA is a wind turbine (or windmill).

In some embodiments, the FIA interacts with a liquid fluid (e.g., water). In some embodiments, the FIA is a boat/submarine and the wing(s) described below generate thrust (e.g., replace traditional propellers to drive the boat forward). In some embodiments, a respective wing, as described below, is shaped as an airfoil. In some embodiments, a respective wing, as described below, is shaped as a hydrofoil.

To that end, in some embodiments, the fluid interaction apparatus has a wing (e.g., either of wing apparatuses 106/107 of FIA 100 or any of the wing apparatuses described with reference to FIA 200, such as wing apparatuses 202/208/209/210/211/212/213). The wing has a first configuration with a profile drag coefficient (or, equivalently, a first equivalent flat plate drag area for zero-lift drag) and a second configuration with a second profile drag coefficient (or equivalent flat plate drag area for zero-lift drag) that is less than the first profile drag coefficient (e.g., the wing has different aerodynamic or hydrodynamic properties when it is in the first configuration as compared to when it is in the second configuration). The first and second configurations are different configurations. In some embodiments, the first configuration and second configurations have different shapes. In some embodiments, the first configuration and second configurations have different wetted areas (e.g., the wetted area is the area which is in contact with the external fluid flow). Note, however, that the profile drag coefficient is defined below using a constant reference area. In some embodiments, the first configuration and second configuration have different volumes. The different shapes, wetted areas, and/or volumes of the wing in the first configuration and second configuration, respectively, give rise to the difference between the first profile drag coefficient and the second profile drag coefficient.

Figure 2:
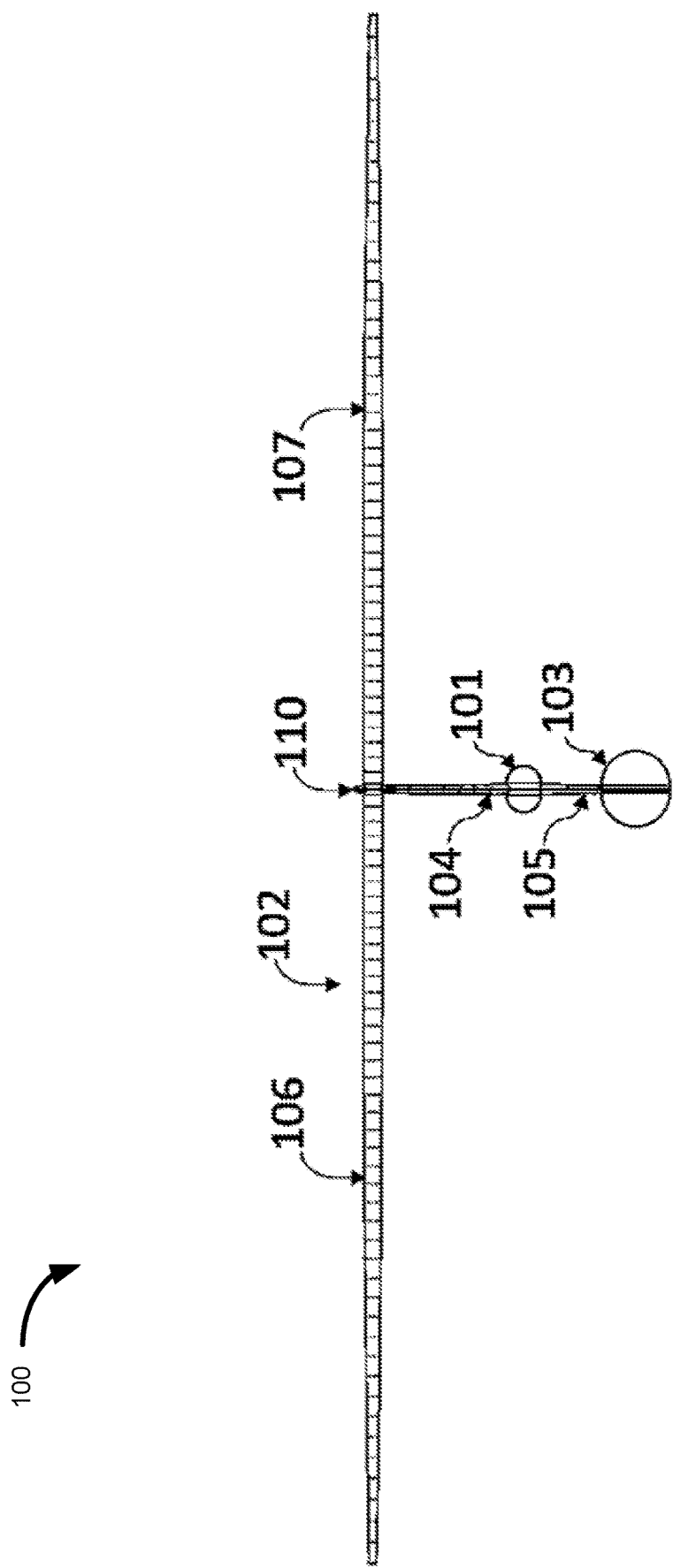
FIG. 2 is a front view of the vehicle shown in FIG. 1, in accordance with some embodiments.
Figure 4:
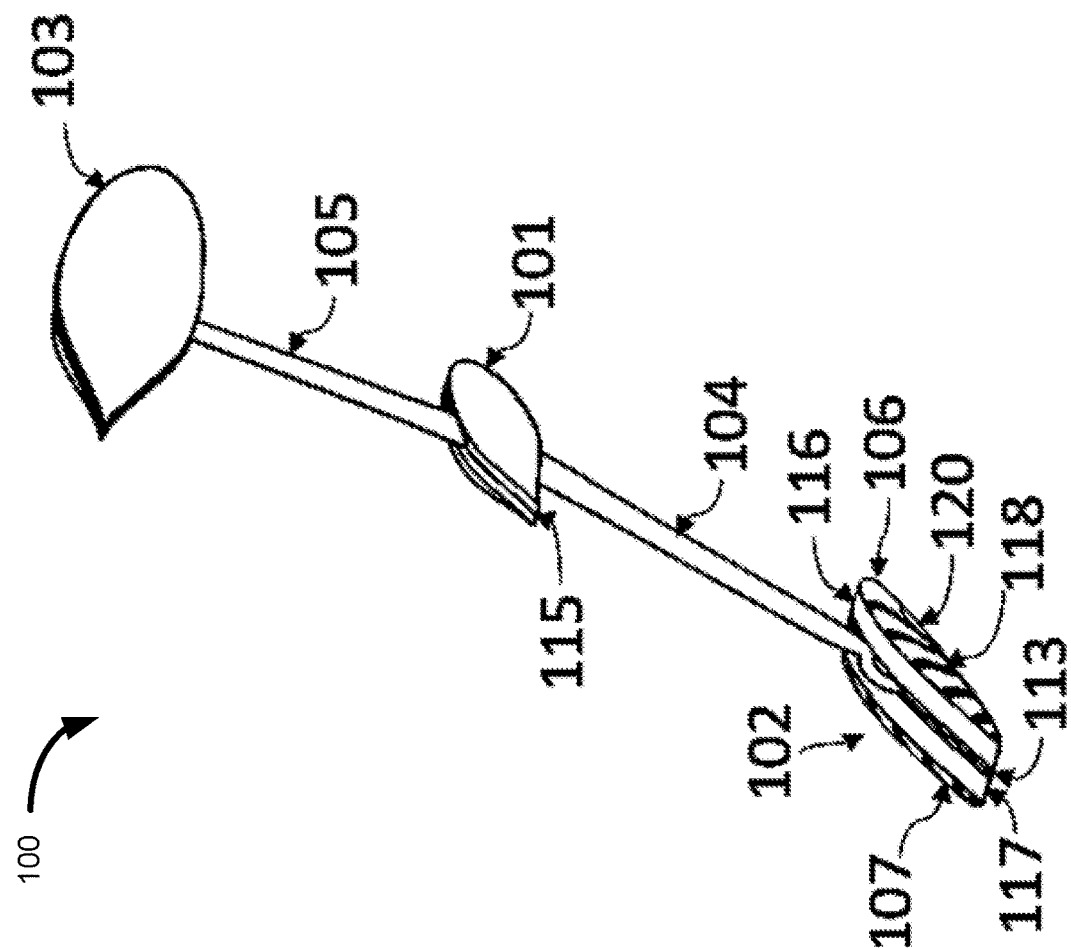
FIG. 4 is a perspective view of the vehicle shown in FIG. 1 with its telescopic wings in a retracted configuration, in accordance with some embodiments.
Figure 5:
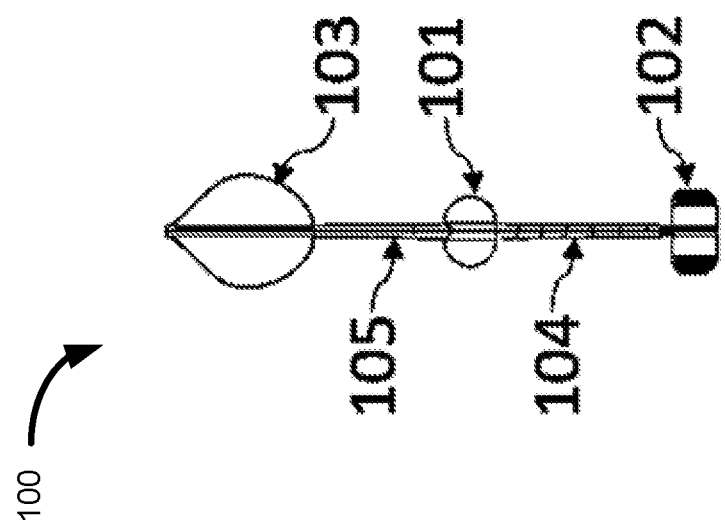
FIG. 5 is a front view of the vehicle shown in FIG. 4 with its telescopic wings in a retracted configuration, in accordance with some embodiments.
Figure 7:
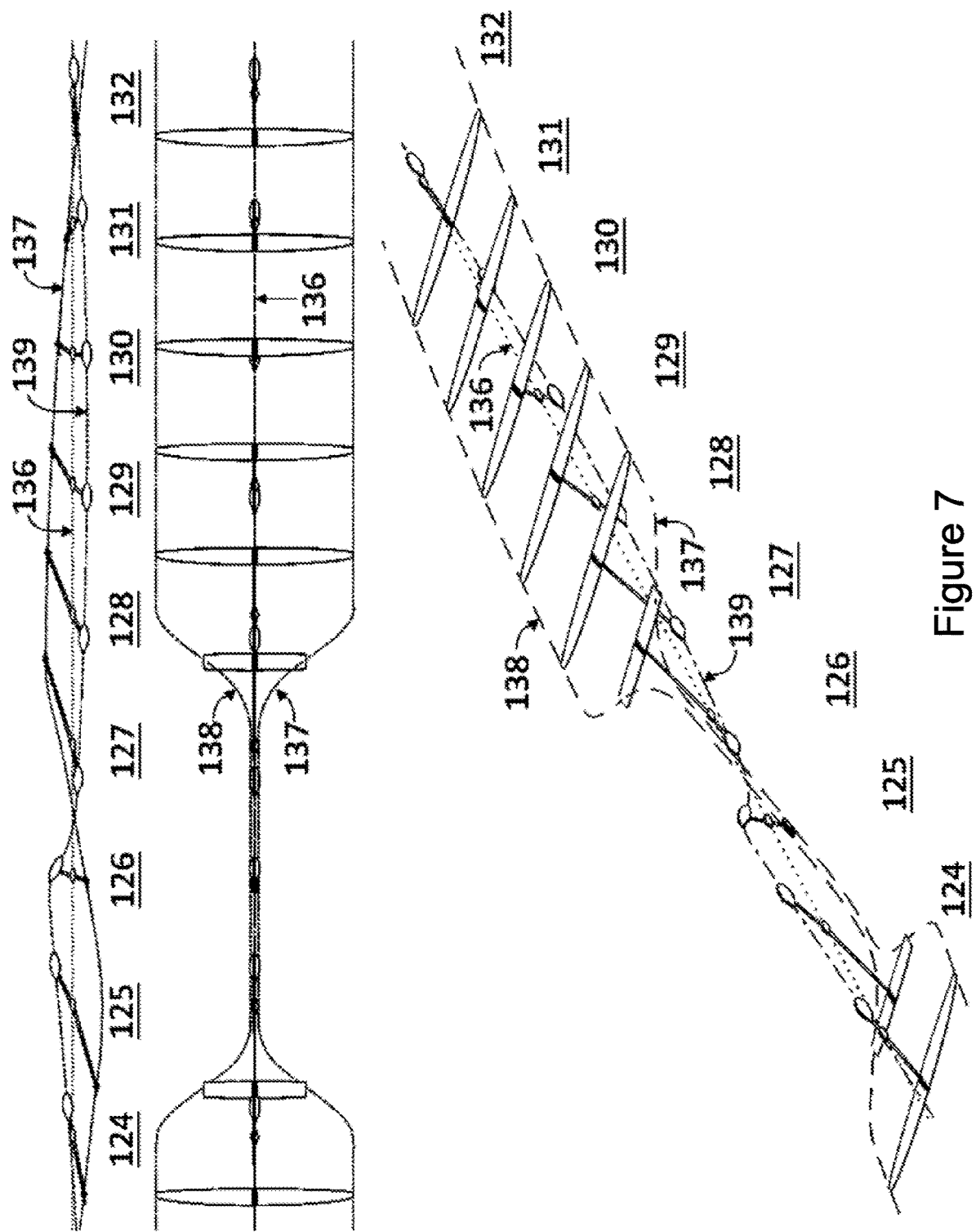
FIG. 7 shows the vehicle in FIG. 1 at different points in time during a trajectory, as viewed by a stationary observer, in accordance with some embodiments.

In some embodiments, the wing is a telescopic wing, the first configuration is an extended configuration (e.g., the wing is extended), and the second configuration is a contracted configuration (e.g., the wing is contracted). For example, as shown in FIGS. 1-2, wing apparatus 106/107 is a telescopic wing that is extended, whereas, as shown in FIGS. 4-5, wing apparatus 106/107 is contracted. The extension and contraction of wing apparatuses 106/107 is also shown in FIG. 7. For example, snapshot 126 illustrates wing apparatuses 106/107 in a contracted configuration, whereas snapshot 129 shows the wing apparatuses 106/107 in an extended configuration. The wing apparatus has a different shape, volume, and wetted area in the extended configuration as compared with the contracted configuration, resulting in different profile drag coefficients for the two configurations.

Figure 16:
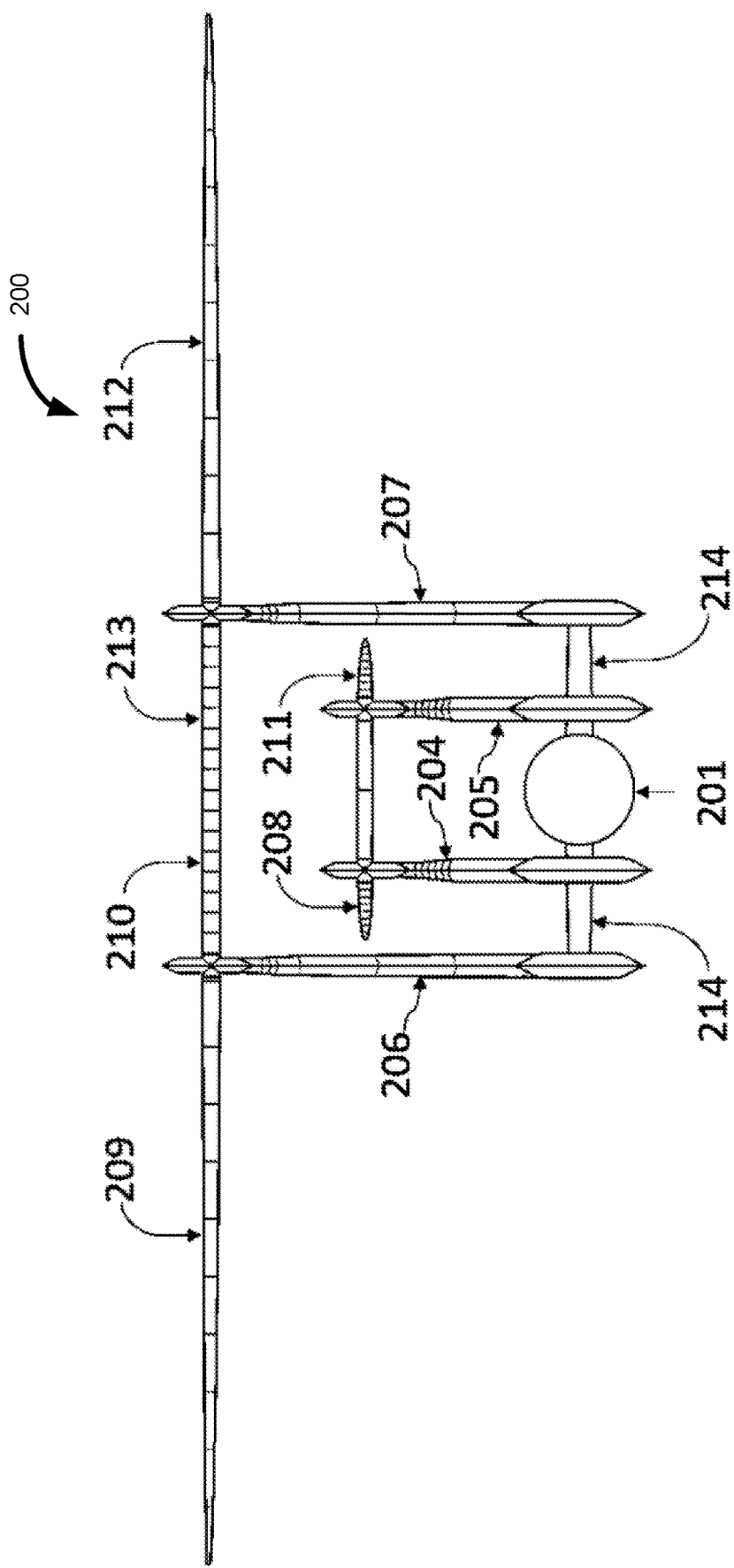
FIG. 16 is a front view of the vehicle with the configuration shown in FIG. 14, in accordance with some embodiments.
Figure 17:
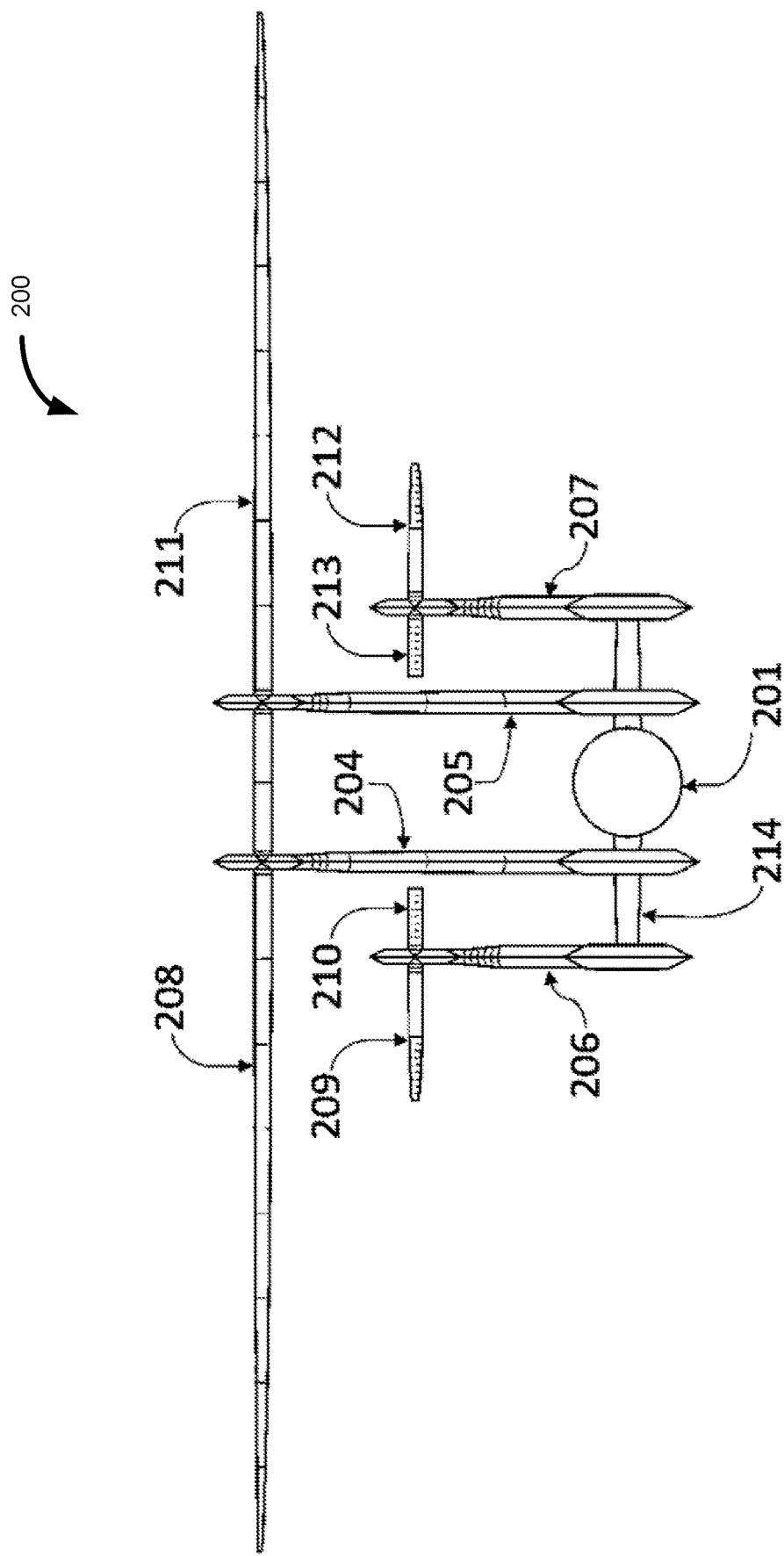
FIG. 17 is a front view of the vehicle with the configuration shown in FIG. 15, in accordance with some embodiments.
Figure 18:
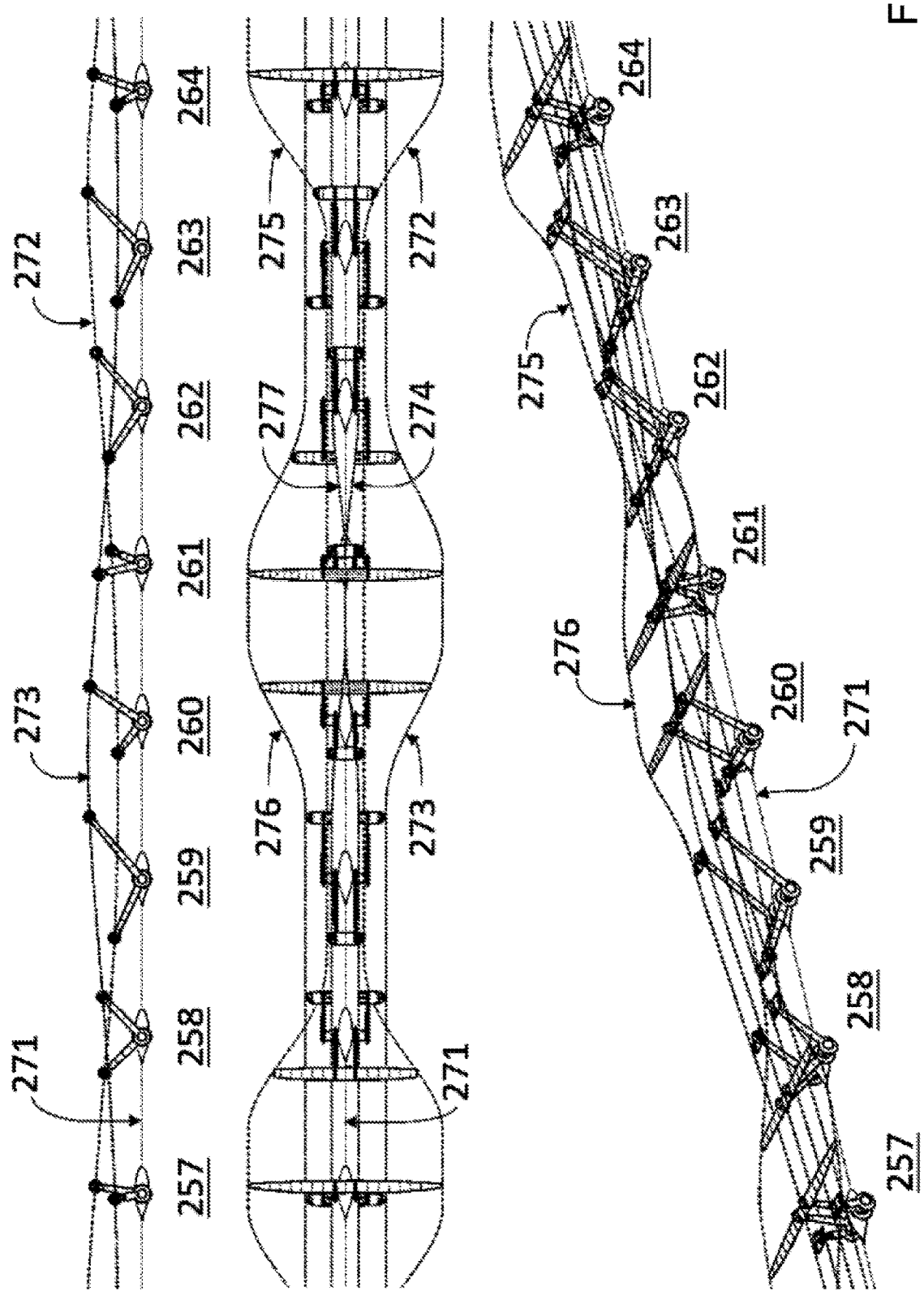
FIG. 18 shows the vehicle shown in FIG. 14 at different points in time during a trajectory, as viewed by a stationary observer, in accordance with some embodiments.

Similarly, FIGS. 14-24 illustrate examples in which wing apparatuses 202/208/209/210/211/212/213 are telescopic wing apparatuses that extend and contract. The extension and contraction of wing apparatuses 202/208/209/210/211/212/213 is also shown in FIG. 18. For example, snapshot 257 illustrates wing apparatuses 209/210/212/213 in a contracted configuration while wing apparatuses 208/211 are in an extended configuration and snapshot 261 illustrates wing apparatuses 209/210/212/213 in an extended configuration, while wing apparatuses 208/211 are in a contracted configuration.

The FIA also includes a body. In some embodiments, the body is another wing (or a fuselage, or an aerodynamic fairing of a flywheel, and/or a counterweight). For example, in some embodiments, the body is a fuselage (e.g., fuselage 101, FIG. 1-13 or fuselage 201, FIGS. 14-24). In some embodiments, there may not be a distinct fuselage. In this case, with reference to FIG. 1, wing apparatus 102 may be considered "the wing" and momentum storage apparatus 103 may be considered "the body." In other such cases, with reference to FIG. 14, wing apparatus 202 may be considered "the wing" and wing apparatus 212 may be considered "the body." In some embodiments, the body has a longitudinal axis (e.g., an axis connecting the front of the fuselage 140 to the back of the fuselage 141, FIG. 3; an axis connecting the front of the fuselage 281 to the back of the fuselage 282, FIG. 14). In some embodiments, the body is elongate (e.g., the longitudinal axis is substantially parallel to a direction of travel of the vehicle) (e.g., the body is longer in the x-direction than in the y-direction). In some embodiments, the body has a tear-drop shape. In some embodiments, in use, the longitudinal axis of the body is substantially parallel to an average direction of a free stream flow relative to the center of mass of the wing as measured in an inertial frame, where the average is calculated (e.g., considered) over one period of periodic motion of the wing (e.g., the FIA is a vehicle and the longitudinal axis of the body is substantially parallel to a travel direction of the vehicle). As used herein, substantially parallel means essentially parallel (or within 20 degrees).

In some embodiments, e.g., in which the fluid interaction apparatus is a wind turbine, the longitudinal direction of the body is substantially parallel to an average wind flow direction (e.g., the designed-for operation of the FIA is such that, in use, the longitudinal direction of the body is substantially parallel to a wind flow direction), where the average is calculated (e.g., considered) over one period of periodic motion of the wing The wing may also have a longitudinal axis (e.g., that is distinct from the span of the wing). As used herein, the longitudinal axis is defined to lie in the x-z plane of a body-fixed frame of the body, where the frame is defined according to aeronautical convention and as described herein. During nominal operations, the xz-plane of the body frame is parallel to the XZ-plane of the inertial frame as defined herein. In some embodiments, the xz-plane is also a plane of symmetry for the fluid interaction apparatus. Thus, the longitudinal axis of a wing is generally substantially along the direction of the wing's chord, even if the wing is longer in a different direction (e.g., the y direction). In some embodiments, the longitudinal axis is substantially parallel to the x-axis of the body frame of the body, where the frame is defined according to aeronautical convention.

The body is coupled to the wing. In some embodiments, the body is coupled to the wing by a support member (e.g., rod apparatus 104, FIGS. 1-13; rod apparatus 204/205/206/207, FIGS. 14-24). In some embodiments, the support member (e.g., support apparatus) has a first portion (e.g., a first end, e.g., rod apparatus tip 110) coupled with the wing (e.g., rotatably coupled with the wing via a rotational joint 112/227/228) and a second portion (e.g., a second end, e.g., rod apparatus base 122/219/221) coupled with the body (e.g., rotatably coupled with the body via a rotational joint 215/217). For example, with reference to FIGS. 1-13, wing apparatuses 106/107 are both coupled to rod apparatus 104 and can rotate independently relative to rod apparatus 104.

Figure 12:
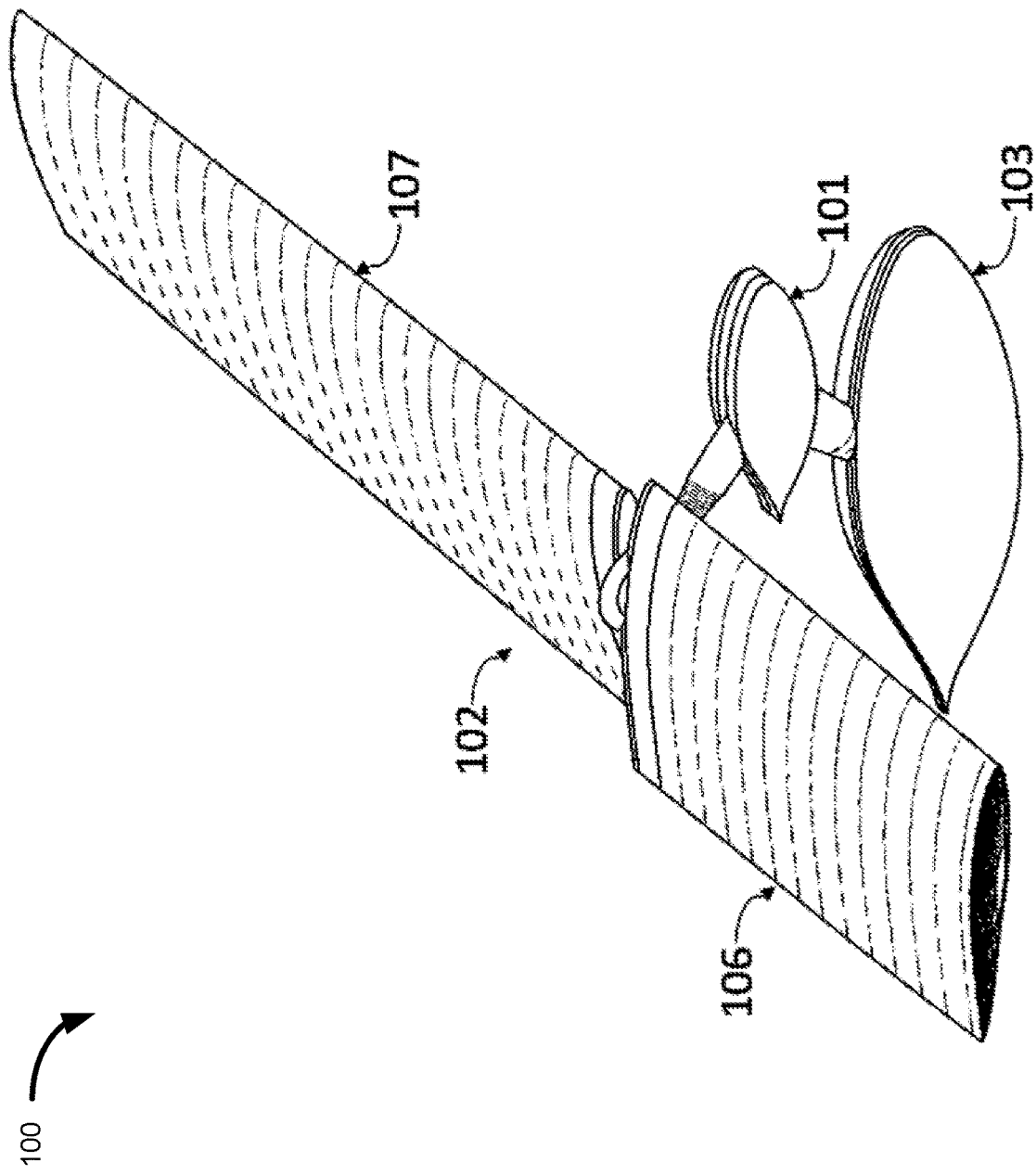
FIG. 12 is a perspective view of the vehicle shown in FIG. 1, illustrating independent pitch control of telescopic wings around a common axis of rotation, in accordance with some embodiments.
Figure 13:
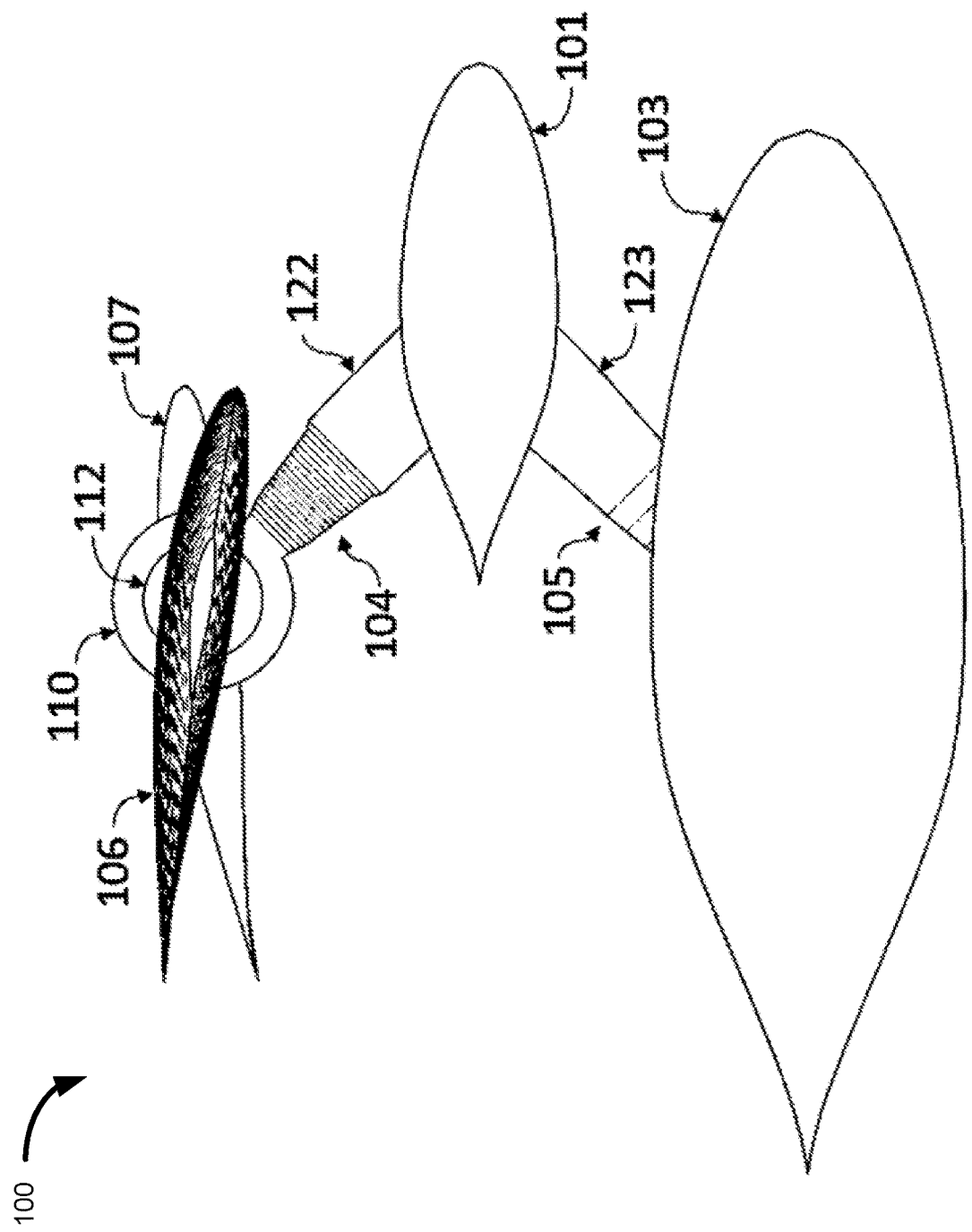
FIG. 13 is a side view of the vehicle shown in FIG. 12, in accordance with some embodiments.

In some embodiments, the support member couples a pair of telescopic wings to the body. For example, as shown in FIG. 1, rod apparatus 104 is coupled with wing apparatus 106 and wing apparatus 107. Wing apparatus 106 and wing apparatus 107 are coaxial (e.g., lengthwise) but have independently controllable angles of attack (e.g., as shown in FIGS. 12-13).

Figure 3:
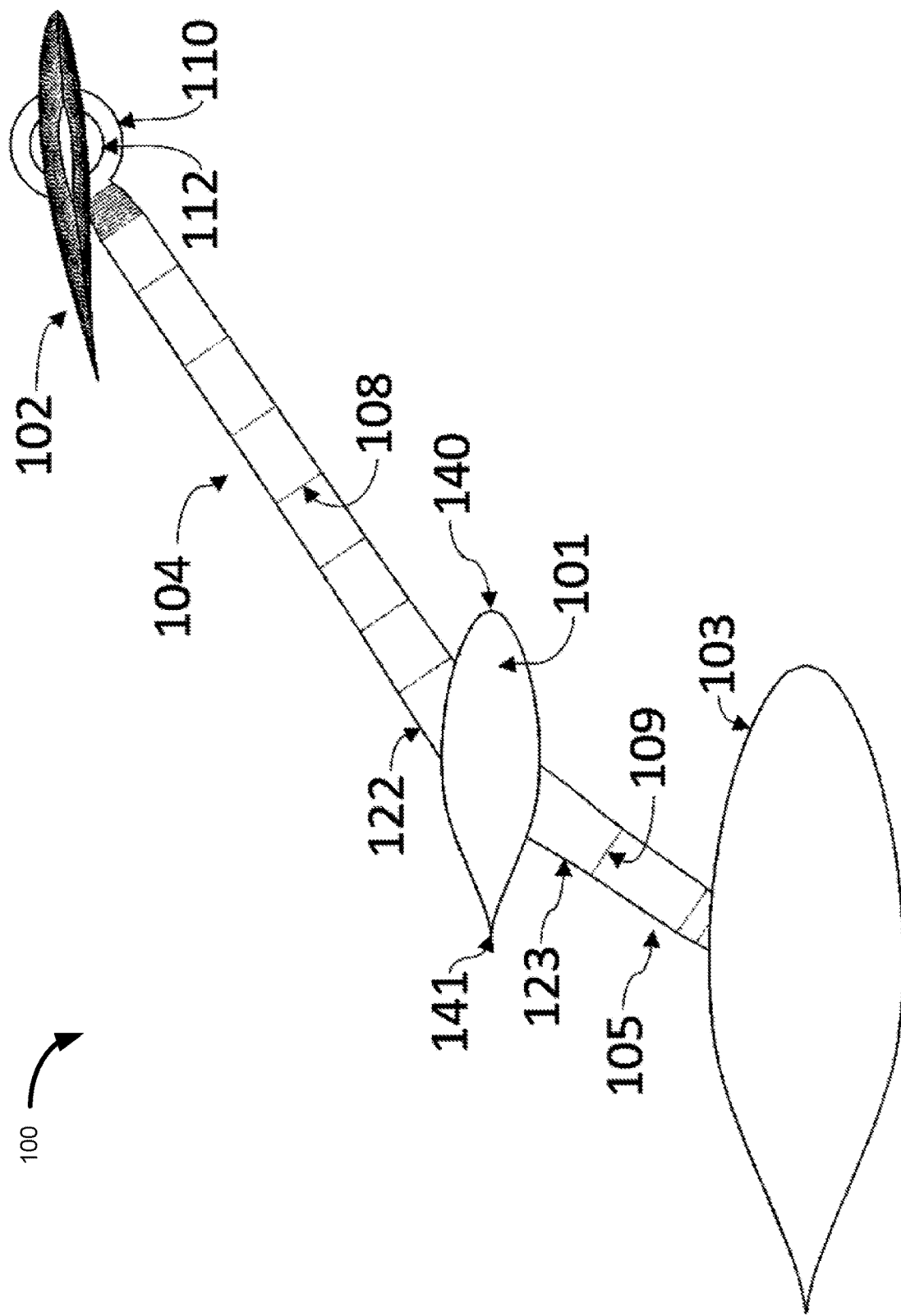
FIG. 3 is a side view of the vehicle shown in FIG. 1, in accordance with some embodiments.

In some embodiments, the support member is a telescopic support member. For example, FIG. 3 shows rod apparatus 104 partially extended. In addition, as shown in FIG. 7, rod apparatus 104 is contracted in snapshot 126 and extended in snapshot 128. As shown in FIG. 18, in some embodiments, rod apparatuses 204/205 extend and contract together, and rod apparatus 206/207 extend and contract together.

The FIA further includes a first actuator 2513-1 (FIG. 25) configured to change the wing from the first configuration when moving in a first direction (e.g., toward a rear of the FIA) to the second configuration when moving in a second direction (toward a front of the FIA).

As used herein, an actuator is any component that is responsible for moving and controlling a mechanism or system. In simple terms, it is a "mover." For example, the actuators described herein may include a linear stepper motor (e.g., for translational movement), a rotational stepper motor (e.g., for rotational movement), a conventional electric motor, or an internal combustion engine, or a turboshaft engine. The actuators described herein may include one or more hydraulic components.

The second direction has a substantial component parallel to the longitudinal axis of the body (e.g., moves either toward the front or rear of the FIA). In some embodiments, the second direction has a substantial component parallel to the longitudinal axis of the body when the second direction is within 45 degrees of the longitudinal axis of the body. In some embodiments, the second direction is toward the front of the FIA. In some embodiments, the second direction is opposite an average direction of the free stream flow relative to an average location of the center of mass of the wing (e.g., relative to the average location of the center of mass of the body).

In some embodiments, the FIA includes one or more actuators configured to move the wing relative to the body. For example, in some embodiments, the FIA includes a second actuator (e.g., actuator 2513-2, FIG. 25) configured to rotate the support member about its axis of rotation (e.g., relative to the body) and a third actuator configured to extend and contract the support member during the periodic movement. The combined movement of the support member rotating around the body (e.g., with the wing coupled to the other side of the support member) and the support member extending and contracting provides the movement of the wing relative to the body.

In some embodiments, the wing moves periodically in a periodic path relative to the body. Here, periodic means occurring at intervals and is intended to include quasi-periodic movement (e.g., having irregular periodicity). For example, a tip of the wing moves periodically in a periodic path relative to the body (e.g., wing apparatus tips 120/121 move in a periodic path relative to the body as shown by relative paths 133/134, FIGS. 8-11; in addition, relative paths 265 through 270 illustrate periodic paths of wing tips relative to a body, FIGS. 19-21). In some embodiments, the periodic path is a lift- or thrust-producing periodic path. In some embodiments, the wing moves periodically with a period less than 1 minute, less than 10 seconds, or less than 1 second. In some embodiments, the wing moves in the first direction relative to the body during a first phase of the periodic path (e.g., a cruising phase, during which time the wing is extended) and moves in the second direction during a second phase of the periodic path (e.g., a forcing phase, during which time the wing is contracted). In other embodiments, a period may comprise several such phases. For example, a period may include a first phase, a second phase, a third phase, and a fourth phase, where the configuration of the wing in the third phase similar to the configuration of the wing in the first phase, and where the configuration of the wing in the fourth phase similar to the configuration of the wing in the second phase. In some embodiments, the free stream fluid flow velocity magnitude and direction relative to a wing is substantially constant during a first phase and substantially constant during a second phase. In such embodiments, the magnitude and direction of the velocity of the wing relative to the body may also be substantially constant during the first phase and substantially constant during the second phase. In some embodiments, the first actuator changes the wing from a first configuration to a second configuration (e.g., different from the first) within a time frame that is less than 1 minute, less than 10 seconds, or less than 1 second. In some embodiments, the time frame within which the first actuator changes the wing from the first configuration to the second configuration is as short as is feasible, where feasibility is determined by structural or actuator constraints. Such a reconfiguration occurs between the first phase and the second phase, for example, and is denoted the "transition phase."

For example, the wing moves in the first direction relative to the body during the first phase of the periodic path (e.g., a during which the free stream fluid flow velocity magnitude and direction relative to a wing is substantially constant) and moves in the second direction during a second phase of the periodic path (e.g., free stream fluid flow velocity magnitude and direction relative to a wing is substantially constant). Between the first phase and the second phase is a first transition phase during which the wing is reconfigured from the first configuration to the second configuration and between the second phase and the first phase is a second transition phase during which the wing is reconfigured from the second configuration to the first configuration. In some embodiments, during the first phase, the wing remains in the first configuration. In some embodiments, during the second phase, the wing remains in the second configuration.

In some embodiments, such structural or actuation constraints may extend to duration of a transition phase to such an extent, that the duration of a phase (such as a second phase) is negligible, such that a first transition phase immediately follows a second transition phase. In such embodiments, the periodic path and/or the reconfiguration may be described as continuous.

In some embodiments, the thrust generated by the wing in the first phase is greater than the thrust generated by the wing in the second phase. In some embodiments, the lift experienced by the wing in the first phase is greater than the lift experienced by the wing in the second phase. In some embodiments, the net fluid force experienced by the wing in the first phase is greater than the net fluid force experienced by the wing in the second phase.

In some embodiments, the wing moves faster in the second phase than in the first phase relative to a stationary object (e.g., a magnitude of a component of an average velocity of the wing in inertial space in the second phase is smaller than throughout the first phase).

In some embodiments, a speed of the wing with respect to the wind (e.g., the free stream flow velocity magnitude) is substantially constant throughout the first phase. In some embodiments, a speed of the wing with respect to the wind (e.g., the free stream flow velocity magnitude) is substantially constant throughout the second phase. Here, "substantially constant" means that the speed of the wing with respect to the wind does not change because of controlled-motion of the wing (e.g., the wind may change on its own, but the wings speed relative to a stationary reference remains unchanged).

In some embodiments, the FIA is a vehicle. The first direction is toward a rear of the vehicle and the second direction is toward a front of the vehicle. That is, in some embodiments, the wing moves toward and away from the front of the vehicle in a periodic movement. The first actuator moves the wing into the second configuration, where it has a relatively lower profile drag coefficient (or equivalent flat plate drag area for zero-lift drag) when moving toward the front of the vehicle (e.g., when its speed with respect to the fluid is faster), and moves the wing into the first configuration, where it has a relatively high profile drag coefficient (and greater lift or thrust) when moving toward the rear of the vehicle.

In some embodiments, the periodic path of the wing is substantially linear relative to the body (e.g., back-and-forth along an axis that is within +/−45 degrees of the longitudinal axis of the body) (e.g., in a vertical plane extending in a direction of travel, e.g., the XZ-plane). In some embodiments, the periodic path of the wing is a closed, non-linear, periodic path. In some embodiments, the periodic path of the wing is a figure-8 shape (e.g., in a vertical plane extending in a direction of travel, e.g., the XZ-plane). In some embodiments, a figure-8 shape is two separate enclosed loops connected at a point (e.g., a figure-8 shape includes the shape of an infinity sign). In some embodiments, the periodic path of the wing is non-circular and/or non-ellipsoid. As described below, the periodic path of the wing can be different for different modes of flight. For example, the FIA may be a vehicle capable of vertical take-off and landing (VTOL) with a first mode of operation in which the periodic path of the wing is linear, or in the shape of an infinity sign when the periodic path is viewed from the side, as in FIG. 9, and a second mode of operation in which the periodic path is a non-linear closed loop.

Note that in some embodiments, a non-morphing wing travels in a periodic path that's either linear or figure-eight shaped (e.g., in a vertical plane extending in a direction of travel, e.g., the XZ-plane). For example, the wing does not change from a first configuration to a second configuration.

In some embodiments, as noted above, the wing is a telescopic wing. The telescopic wing is configured to extend and contract along a span (e.g., generally along a primary axis) of the telescopic wing during the periodic movement of the telescopic wing relative to the body. In some embodiments, the span of the telescopic wing is substantially perpendicular to the longitudinal axis of the body.

In some embodiments, the FIA includes a second body (e.g., a counterweight). In some embodiments, the body is another wing (an additional telescopic wing configured to extend and contract along a span of the additional telescopic wing during periodic movement of the additional telescopic wing relative to the body, where the span of the additional telescopic wing is substantially parallel to the span of the telescopic wing). For example, in some embodiments, with reference to FIG. 14, wing apparatus 202 may be considered "the wing," fuselage 282 may be considered the body, and wing apparatus 212 may be considered "the second body." In some embodiments, the second body is not a wing (e.g., momentum storage apparatus 103, FIGS. 1-13). In some embodiments, the second body includes cargo and/or a fuel/power supply (e.g., a battery or a turboshaft engine). In some embodiments, the second body moves in a periodic path relative to the body (e.g., as shown by relative path 135 of MSA 103, FIGS. 8-9)

In some embodiments, the FIA includes an additional support member (e.g., an additional telescopic support member, such as rod apparatus 105) having a first end (e.g., rod apparatus base 123) rotatably coupled to the body and an opposing second end rotatably coupled to the second body. Thus, the additional support member couples the body to the second body. For example, with reference to FIG. 1, rod apparatus 105 is coupled at one end to fuselage 101 and coupled at an opposite end to momentum storage apparatus 103. In some embodiments, the FIA includes one or more actuators to extend and contract the additional support member and/or rotate the additional support member relative to the body.

In some embodiments, during a predefined period of operation (e.g., a cruising period of operation), the extension and contraction of the support members are controlled to produce a level cruise path of the body of the aircraft. During cruise, throughout one period of periodic motion, the change in location of the center of mass of the aircraft in an inertial frame (e.g., relative to a stationary object, such as an object on the ground) may be horizontal.

In some embodiments, the FIA is an aircraft. The aircraft includes a body having a longitudinal axis (e.g., fuselage 282, FIGS. 14-24). The FIA further includes a first telescopic wing (e.g., any of wing apparatuses 209/210/212/213) configured to extend and contract along a span of the first telescopic wing (e.g., lengthwise, pointing from wing apparatus tip 252 toward wing apparatus tip 255, FIG. 14) during periodic movement of the first telescopic wing relative to the body. In some embodiments, the span of the first telescopic wing is substantially perpendicular to the longitudinal axis of the body (e.g., where the longitudinal axis is an axis connecting the front of the fuselage 281 to the back of the fuselage 282, FIG. 14). In some embodiments, the span of the first telescopic wing is curved. In some embodiments, the span of the first telescopic wing is angled back (e.g., 5-30 degrees) from the longitudinal axis of the body. The FIA includes a first support member (e.g., either of rod apparatuses 206/207) having a first end rotatably coupled to the body and an opposing second end rotatably coupled to the first telescopic wing (e.g., through horizontal support 214). In some embodiments, the first support member can rotate entirely around (e.g., 360 degrees around) its coupling with the body (e.g., with at least a component of the rotation being in the XZ-plane). The FIA includes a second telescopic wing (e.g., either of wing apparatuses 208/211) configured to extend and contract along a span of the second telescopic wing (e.g., lengthwise) during periodic movement of the second telescopic wing relative to the body. In some embodiments, the span of the second telescopic wing is substantially perpendicular to the longitudinal axis of the body (e.g., parallel to the span of the first telescopic wing, or curved, or set back, as described with reference to the span of the first telescopic wing). The FIA includes a second support member (e.g., either of rod apparatuses 204/205) having a first end rotatably coupled to the body (e.g., through a horizontal support) and an opposing second end rotatably coupled to the second telescopic wing.

In some embodiments, the second support member can rotate entirely around (e.g., 360 degrees around) its coupling with the body (e.g., with at least a component of the rotation being in the XZ-plane).

In some embodiments, the FIA includes a pair of telescopic wings coupled to the first support member. For example, as shown in FIG. 17, rod apparatus 207 is coupled with wing apparatuses 212 and 213 (e.g., telescopic wings).

The invention applies without limitation to the design and operation of fluid interaction apparatuses, or FIAs. The interaction can comprise forces acting between the fluid and the apparatus. The invention may be implemented in several different embodiments concerning both apparatus and method.

The vehicle might at any one time be operating in a particular locomotion mode, such as hover, climb, or cruise. Depending on the locomotion mode, as well as other criteria of interest, the aforementioned FIA can be operated in several different ways. Throughout a locomotion mode, an FIA might be operated in a periodic fashion.

Some embodiments include an FIA which has a zero-lift drag. In some embodiments, the FIA is able to modify its zero-lift drag. This could be accomplished by changing the velocity of the FIA in inertial space, or by changing the wetted area by reconfiguring the shape of the FIA, for example.

In some embodiments, the FIA is able to generate lift. In some embodiments, the FIA is able to modify its lift by reconfiguring the shape of a wing element. In some embodiments, the FIA accomplishes this by morphing a wing element. This can be done using flaps, ailerons, or telescopic wing elements. In some embodiments, the FIA is also able to modify its lift by changing the angle of attack of a wing element, or by changing the velocity of the FIA in inertial space.

In some embodiments, the FIA has a lift dependent drag component. In some embodiments, the FIA is able to modify the lift dependent drag by modifying the lift. In addition, the FIA may be able to modify the lift dependent drag by modifying the shape of a wing element.

Several periodic trajectories in the parameter space which describe the operation of such an FIA can be found.

For example, during one duration of time during one period, the FIA could be experiencing a large net fluid force magnitude compared to other phases. This net force could be in part due to a lift force. This lift force might be partially a result of reconfiguring wing elements. This reconfiguration might also increase the wetted area, which in turn might also contribute to a higher zero-lift drag component compared to other phases. The lift dependent drag component might also be larger during this phase compared to other phases in which less lift or thrust is produced. The reconfiguration may involve increasing the span of the wing, for example. This could reduce the span loading and reduce the induced drag compared to other configurations that would produce the same amount of lift. In the context of the current example, this duration of time will be denoted the "forcing phase" for convenience. Note that in other embodiments, the larger net force during the forcing phase can also be substantially due to a drag force. As a result of the larger zero-lift drag configuration, as well as any lift dependent drag, the FIA might consume a larger amount of energy per unit horizontal distance travelled during the forcing phase compared to other phases. In cases where the magnitude of the NFF is not sufficient to differentiate the forcing phase from another phase, one can define the forcing phase as the phase in which the total energy of the vehicle is increased. Alternatively, the forcing phase is the phase in which the NFF has a larger component in the average direction of motion of the vehicle.

During another duration of time during one period, the FIA could be operating at a different state. In this state, the FIA might consume a smaller amount of energy per unit horizontal distance travelled than during the forcing phase. One such state could feature a substantially smaller zero-lift drag compared to the forcing phase. The reduced zero-lift drag might be partially the result of reconfiguring the FIA to a shape with a reduced wetted area. In the context of the current example, this duration of time will be denoted the "cruising phase". During the cruising phase, the FIA might be producing a comparatively smaller or negligible amount of lift and lift dependent drag compared to the forcing phase.

Note that FIA might rely on a net internal force and moment during the cruising phase in order to cancel a portion of the drag and the weight forces acting on it. This net internal force can be provided by other apparatuses contained within the vehicle.

For example, the vehicle could comprise a second FIA which has similar features as the first FIA. The second FIA could be operating in a forcing phase while the first FIA is in a cruising phase. During this time, the second FIA could be supplying a portion or all of the net internal forces and moments required by the first FIA.

Alternatively, the vehicle could comprise a second apparatus. This apparatus can be denoted an energy storage apparatus (ESA) and is configured to allow the FIA to do work on the ESA, and vice versa. The ESA can recover, store and release energy. An ESA may also do work on elements or apparatuses other than said FIA. During the forcing phase, the ESA could experience a net internal force through interaction with the FIA, and thus increase its kinetic energy or potential energy, or both. During the cruising phase the ESA could reduce its energy by doing work on the FIA involving the desired net internal force. Note that this energy transfer requires relative motion between the ESA and the FIA. On average the ESA experiences a net internal force from at least the aforementioned FIA to cancel any external forces such as gravity or any net fluid force acting on the ESA over one period. Note that the ESA can also be classified as an FIA, but need not have all of the possible attributes of the aforementioned FIA.

In a third example, the FIA itself is used to store energy. During the forcing phase the FIA could use the NFF to increase its own potential or kinetic energy. This energy is subsequently consumed during the cruising phase.

If range is to be maximized, the cost is the energy consumed per unit horizontal distance travelled in inertial space. This cost over one period will be designated "Jp" in the context of this example, while the cost over the forcing phase is denoted "Jf" and over the cruising phase "Jc". One can define a baseline cost as "Jb", which might correspond to conventional methods of propulsion in a fluid, such as a propeller. In accordance with some embodiments, the cost Jf may be larger than Jb, and Jc may be smaller than Jb. The total cost Jp is the horizontal distance weighted sum of Jf and Jc. If the FIA covers a sufficiently larger horizontal distance during the cruising phase than the forcing phase, the cost Jp can be smaller than Jb. During nominal, level cruise, this might require the FIA to move in at least the positive x-direction of the AFIAF during the cruising phase, and in the negative x-direction during the forcing phase for periodicity. During other locomotion modes such as climbing, the FIA might have to move substantially in the average direction of motion during the cruising phase in order to realize such improvements. The average speed at which the range is maximized for an embodiment might also be higher than the speed of a baseline vehicle. In another embodiment, and improvement in endurance can also be achieved by a similar method.

There are benefits to certain embodiments other than potential range improvements. Some embodiments can achieve a reduction in noise. In the case of airborne flight, a reduction in minimum speed can be achieved. For example, the FIA can travel at a speed which exceeds the stall speed of the FIA during a forcing phase, while the AFIAF moves at a slower speed or remain stationary during hover. The relative motion of the FIA relative to the AFIAF can also result in an increased effective disc area, which can also reduce the induced drag of the vehicle.

The performance of a particular FIA can be maximized by minimizing an objective function, or "objective". The objective of a particular FIA configuration may be the average energy consumed by a vehicle per unit horizontal distance travelled in the inertial frame. This could maximize the range of the vehicle. Another objective may be the average energy consumed by the vehicle per unit time. This could maximize the endurance of the vehicle. Another objective may be to minimize the average time a vehicle requires to get from point A to point B in the inertial frame. Another objective of an FIA may be to maximize the power extracted from the fluid, such as would be the case for a wind turbine. Other objective functions are also possible. The objective can also be a combination of several different the aforementioned functions. For instance, a weighted sum of average time, cost of manufacture, and energy consumed per unit horizontal distance travelled could be another objective.

While minimizing the objective, a particular FIA apparatus and method of operation may need to satisfy constraints. Constraints may apply to the method of operation, as well as the configuration of the FIA.

For a given FIA configuration, one constraint may fix the instantaneous translational velocity direction and magnitude of the FIA in the inertial frame. For example, the specified FIA may comprise the main wing structure of a conventional fixed wing aircraft that is in contact with the fluid. In this case, the main wing is rigidly attached to the fuselage, and therefore any constraints on the position, velocity or acceleration of the fuselage also apply to the main wing. Note that the main wing is considered in isolation of any additional apparatuses such as ailerons or flaps such that the main wing can be considered to be a pseudo rigid body. During nominal, level cruise, the acceleration of the fuselage may be constrained to be zero. By definition, the inertial frame X-axis is parallel to the velocity vector of the fuselage. The velocity of the fuselage in the Z-direction and Y-direction is thus constrained to be zero. Due to the particular configuration of the vehicle this constraint also applies to the main wing structure in contact with the fluid.

One constraint may fix the average translational velocity direction and magnitude of the FIA in the inertial frame during one period of periodic motion. For example, during hover, the FIA might be required to remain stationary on average. This constraint also applies to the scenario in which the FIA is a wind turbine, for example. In another example, during nominal, level cruise, an FIA might be required to travel with the zero average translational velocity in the inertial frame Z-direction and Y-direction. There may also be an average velocity constraint for an FIA in the form of given average velocity in the X-direction during nominal, level cruise for a vehicle travelling through a fluid.

For certain components of velocity, there may be no instantaneous or average velocity constraint on the specified FIA. For example, during nominal, level cruise, the average cruise velocity of an aircraft, i.e., the average velocity of the center of gravity of the aircraft along the X-direction in the inertial frame, may take any value within a range specified by the performance envelope of the aircraft.

There might be an instantaneous net internal force or moment constraint that applies to the FIA. For example, a vehicle could include a first FIA and a second FIA. The acceleration of the first FIA may be constrained at every point in time during a particular locomotion mode. The instantaneous acceleration of the first FIA in the inertial frame also constrains the instantaneous net internal force or moment applied on the first FIA by the second FIA. During nominal, level cruise, for example, the first FIA might include a fuselage which is required to experience zero acceleration in the inertial frame. In order to maintain a zero net force acting on the fuselage, a constant net internal force needs to be applied on the fuselage by the remainder of the vehicle, i.e. the second FIA, at any instant in time in order to cancel the net external force. The net external force may vary over time, and experience contributions from the weight force and drag force on the fuselage, for instance. If the specified FIA is the fuselage, then the internal force that needs to be applied on the fuselage at an instant in time is the instantaneous net internal force constraint. In this case, the internal force constraint on the first FIA results in an equal and opposite instantaneous internal force constraint on the second FIA. A conventional fuselage may also require a zero net moment to act about the center of gravity. If the net external moment is zero at any instant in time, a constant, zero net internal moment needs to be applied on the fuselage by the remainder of the vehicle, i.e. the second FIA, to maintain a zero angular acceleration of the fuselage during nominal, level cruise.

Another constraint may take the form of an average net internal force or moment constraint. For example, a vehicle could include a first FIA and a second FIA. The average acceleration of the first FIA over one period of periodic motion may be constrained to a given value, such as zero. This would result in an average internal force constraint on the second FIA. For example, during nominal, level cruise, the second FIA may be required to deliver an internal force impulse on the first FIA which is equal and opposite to the weight and drag impulse acting on the first FIA during one period of periodic locomotion. Note that the instantaneous internal force acting between the first and second FIA may be allowed to take any value within a range of acceptable values, where the range is limited by structural considerations, for example.

There might also be no instantaneous or average internal force or moment constraints that apply to the FIA. For example, a wind turbine propeller may have no requirement to transfer a certain amount of internal force to its support on average or instantaneously. This would allow the turbine to operate at a range of different thrust levels as opposed to a fixed, externally mandated thrust. There may be an upper or lower limit constraint on the range of thrust levels or the aforementioned internal force due to structural or aerodynamic considerations, amongst others.

There are also a large number of other types of constraints, such as constraints on the peak power consumption, on vehicle cost, on mechanical complexity, or on the relative position of the FIA and the vehicle center of gravity.

For a given set of constraints, there may be a variety of different FIA configurations and methods of operation that may be employed.

In some embodiments, the apparatus comprising the specified FIA is configured in a way in which the FIA can be operated at least two different points in the vector space of the instantaneous NFF and instantaneous local free stream flow velocity such that the average value of the objective over one period is lower than the baseline objective, which is calculated for the scenario where the FIA is operated at a single point in the aforementioned vector space while also meeting the constraints.

The aforementioned configuration can take several forms. In some embodiments, a vehicle is configured in a way in which an average internal force constraint or an average free stream velocity constraint applies to at least one FIA. There are many ways in which this can be accomplished. For instance, a momentum storage apparatus (MSA) can be employed to balance any peaks and troughs in the internal force delivered by a particular FIA to the remainder of the vehicle such that a specified instantaneous internal force constraint is satisfied at all times. This would convert any instantaneous internal force constraint on the FIA into an average internal force constraint which only needs to be satisfied on average over one period. The momentum storage apparatus can be any apparatus configured to absorb, store, and deliver a momentum impulse. With reference to, e.g., FIG. 14, this can be facilitated by allowing the FIA, such as FIA 202, to interact with at least one other FIA, such as FIA 203. In other embodiments, three FIA can be operated in a manner similar to FIA 202 and 203. With reference to, e.g., FIG. 1, this can be facilitated by allowing the FIA, such as FIA 102, to interact with an apparatus similar to MSA 103. The MSA can be used to absorb linear or angular momentum and deliver all or a portion of said momentum as required. In a third example, this can be facilitated by allowing the FIA itself to function as a momentum storage apparatus. In a fourth example, this can be facilitated by allowing the FIA, such as FIA 102, to interact with an apparatus which uses surrounding fluid as a momentum storage apparatus. For example, by increasing the added mass of a second FIA moving at constant free stream velocity, the momentum of the second FIA can be increased. This momentum can be recovered by reducing the added mass of the second FIA again.

The aforementioned configuration can also modify or advantageously affect any free stream flow velocity constraints. By means of a suitable connecting apparatus, the FIA can be configured to satisfy an average velocity in the inertial frame, or an average free stream flow velocity constraint, if desired. Such a connecting apparatus could allow relative motion between the FIA and the AFIAF.

The configuration can comprise a configuration in which the specified FIA is subject to an average internal force constraint, or an average free stream flow velocity constraint. The FIA configuration may also comprise additional features, such as the ability of the FIA to modify its shape relative to the fluid.

The precise trajectory of the FIA in the vector space comprising the parameters describing the configuration of the FIA, the instantaneous free stream velocity, and the instantaneous NFF is dependent on the particular objective function as well as any additional constraints.

In the following paragraphs, one specific vehicle embodiment will be described. This embodiment is depicted in FIGS. 14-22.

The vehicle comprises several apparatuses, which can be distinguished by the function they perform during nominal, level cruise. As will be explained later, one can identify a fuselage apparatus, and a connecting apparatus (e.g., a supporting member). Although both of these apparatuses are also FIAs by definition, they are referred to in the aforementioned way for clarity. The remaining apparatuses will be referred to as FIAs, which can be described as two FIAs, labelled 202 and 203.

Figure 14:
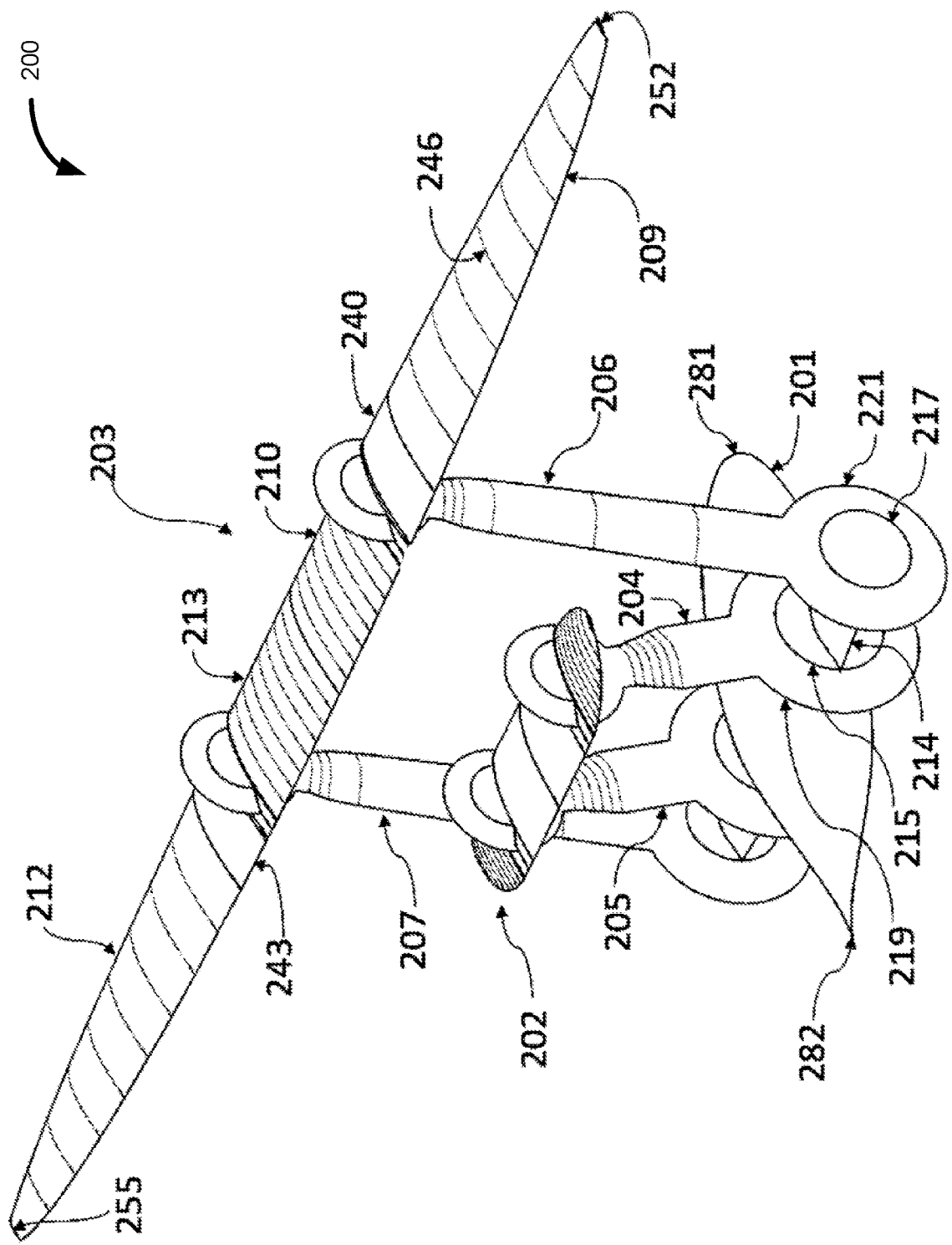
FIG. 14 is a perspective view of another vehicle with telescopic wings (e.g., an aircraft), in accordance with some embodiments.

The fuselage apparatus includes the fuselage 201 as well as the horizontal support 214, shown in FIG. 14. Fuselage 201 may comprise sources of energy, sources of power, or payload. The payload may comprise cargo, or one or more passengers. Note that some of the aforementioned items may also be located within other apparatuses of the vehicle.

One can define a "fuselage frame" as follows. In some embodiments, the fuselage frame x-axis is parallel to the line connecting the front of the fuselage 281 and the rear of the fuselage 282, and is directed towards the front. The fuselage frame z-axis is directed downwards and lies in a plane containing the x-axis of the fuselage frame as well as the acceleration due to gravity during nominal, level cruise. The fuselage frame is fixed relative to the fuselage in the aforementioned orientation. The origin of the fuselage frame is at the instantaneous center of mass of the fuselage apparatus.

Figure 15:
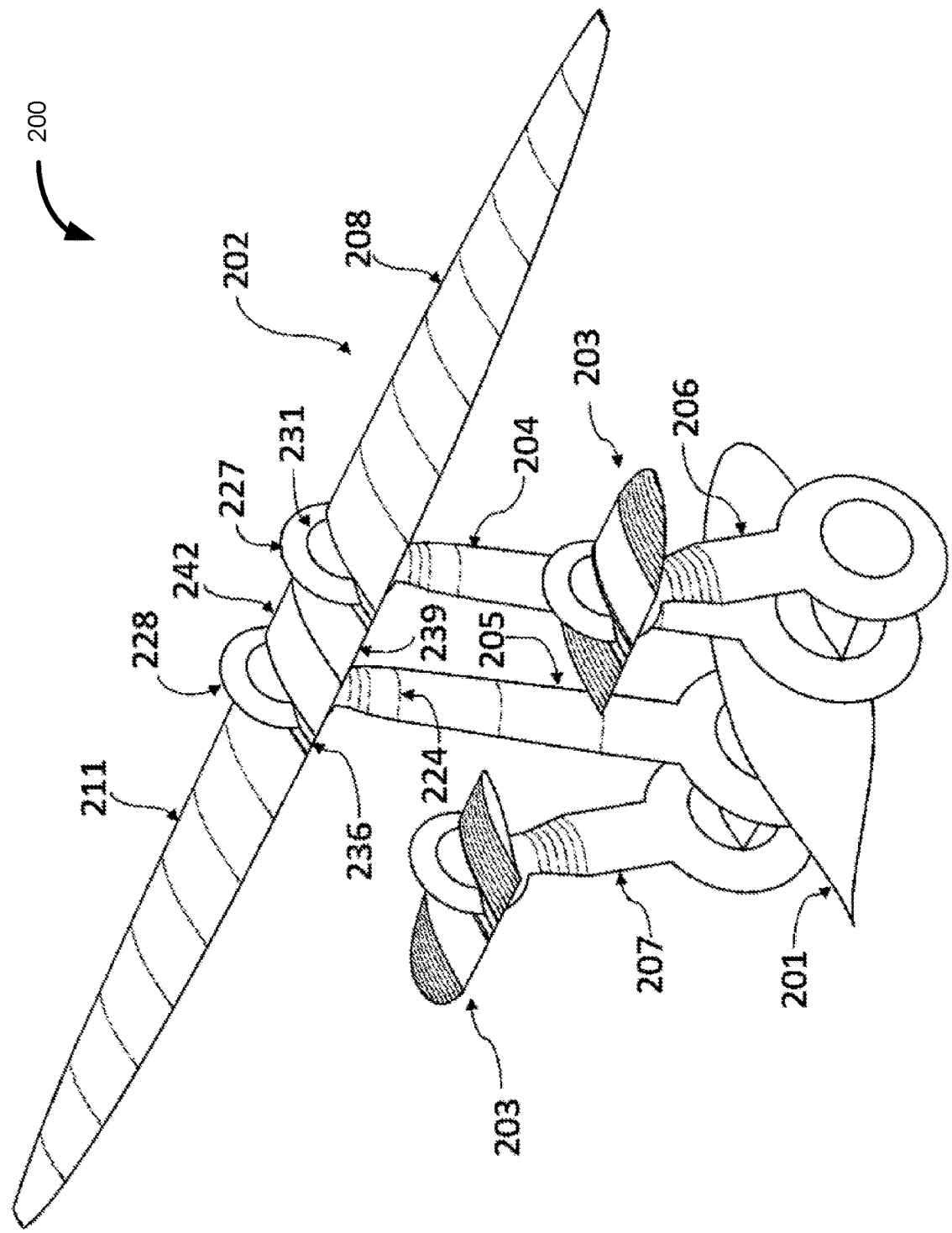
FIG. 15 is a perspective view of the vehicle shown in FIG. 14 in a different configuration (e.g., with its outer telescopic wings retracted and pulled in toward the body, and its inner telescopic wings extended longitudinally away from the body), in accordance with some embodiments.

FIA 202 includes 2 independent wing apparatuses: one left wing apparatus 211 and one right wing apparatus 208 as shown in FIG. 15. FIA 203 includes 4 wing apparatuses: one far left wing apparatus 212, one middle left wing apparatus 213, one middle right wing apparatus 210, and one far right wing apparatus 209 as shown in FIG. 14.

For both FIA 202 and FIA 203, the AFIAFs are oriented and located as previously defined.

In some embodiments, the shape of each wing apparatus can be reconfigured to change the wetted area. Note that in some locomotion modes such as constant velocity slow speed flight for a certain range of vehicle velocities, the FIAs need not vary the wetted area during nominal operation. In other vehicle embodiments, the FIAs are not able to substantially vary the wetted area. There are a wide variety of methods available for reconfiguring the shape of a wing apparatus to change the wetted area.

In some embodiments, the wing apparatus comprises a telescopic mechanism. Each wing apparatus comprises at least one "child" wing element, which is configured to be at least partially enveloped by a "parent" wing element. There are also several different embodiments of the telescopic mechanism. In some embodiments, the child element might comprise structural elements attached to skin elements.

The structural elements could be designed to carry the majority of the loads. These loads could be the accumulating bending moments and shear stresses along the span of the wing. The skin elements could be configured to transfer the loads of the surrounding fluid acting on a small portion of the span of the wing apparatus to the structural elements. The structural elements of the child element could be configured to be enveloped at least in part by the structural elements of the parent element in telescopic fashion.

There are several options available for reconfiguring the skin elements. In some embodiments, the skin elements could be reconfigured using axial deformations. While the structural elements retract, the skin elements could deform elastically in axial directions and thus reduce their wetted area. Another example of axial deformation is the use of piezoelectric material.

In another embodiment, the skin elements can be reconfigured using shear deformations. As the structural elements retract, the skin elements can undergo elastic out of plane bending. Alternatively, the shear deformations can be achieved by the use of piezoelectric material. The folding can be controlled in such a way, that the wetted area of at least the child element is reduced. For example, the skin elements can fold along axes aligned substantially in the chordwise direction, into previously unoccupied space of the child element. Thus only a fraction of the skin elements are in contact with the surrounding fluid.

The skin elements might also include only rigid elements. The rigid elements could be folded in a controlled manner along predefined axes. For example, rotational joints or localized regions conducive to elastic bending could be arranged along those axes to allow controlled, reversible buckling of the rigid skin elements in a way that reduces the wetted area of at least the child elements.

In other embodiments, the complexity and structural penalty of structural elements enclosed by skin elements is avoided. In this case, no distinction is made between structural elements and skin elements, as is the case in stressed-skin structures. Compared to the aforementioned case in which the skin includes only rigid elements, therefore, the skin is also employed as a structural element. In some such embodiments, a child element might include just one rigid element in contact with the fluid, and can be enveloped at least in part by the structural elements of the parent element in telescopic fashion.

A parent wing element can be the child element relative to another element. The wing element which is a child to no other wing element is a base element. In some embodiments, there is up to one wing base element per wing apparatus. For example, wing apparatus 211 has base element 242 as indicated in FIG. 15, wing apparatus 209 has base element 240 as indicated in FIG. 14, and wing apparatus 210 also has base element 240. Wing apparatus 212 has base element 243 as indicated in FIG. 15. In some embodiments, wing apparatus 209 has 9 child elements in total, wing apparatus 208 has 8 child elements, and wing apparatus 210 has 8 child elements. Other embodiments can have any number of child elements. The theoretical location of the tip of a wing element is indicated schematically by a dotted line 246 in order to more clearly illustrate the operation of the telescoping morphing method selected for this vehicle embodiment. The wing apparatus 209 has a wing apparatus tip 252, and wing apparatus 212 has wing apparatus tip 255.

In some embodiments a rod apparatus (e.g., support member), such as rod apparatus 204, includes a rod apparatus base 219, rod apparatus 224, and a rod apparatus tip 227.

One can define a "rod apparatus base frame", or "RABF", as follows. The origin is located at the center of the rod apparatus base. This point lies on the rotational axis describing the relative motion between the rod apparatus base and horizontal support 214. The point is located at the half-way point of the passage of this axis through the rod apparatus base. Similarly, the center of the rod apparatus tip can be defined in terms of the rotational axis describing the relative motion between the wing apparatus base and the rod apparatus tip. In some embodiments, during nominal, level cruise the RABF xz-plane is parallel to the fuselage frame xz-plane. The RABF x-axis is parallel to the projection of the vector that describes the relative position of the center of the rod apparatus tip and the center of the rod apparatus base onto the rod apparatus xz-plane.

The rod apparatus base 221 connects rod apparatus 206 rotatably to the horizontal support 214. In some embodiments, there is one rotational DOF between a rod apparatus base 221 and the horizontal support 214. In some embodiments, the one rotational DOF comprises a rotation about an axis fixed relative to the fuselage frame during nominal operations. In some embodiments, said axis of rotation is furthermore parallel to the fuselage frame y-axis. Thus, there is a rotational joint 217 connecting the rod apparatus base 221 to the horizontal support 214. In some embodiments, the allowed rotational angles range through 360 degrees. In other embodiments, the range of angles describing the relative rotation between the fuselage frame and the RABF can be limited to a range less than 360 degrees.

The relative motion between the other three rod apparatus bases and the horizontal support 214 can be described in the same way. In some embodiments all axes of rotation are also positioned to lie on the same line in the fuselage frame. In other embodiments, the axes can be offset relative to each other in the xz-plane of the fuselage, as long as other criteria, such as avoiding interference between the wing apparatuses, are met.

There is also a rotational joint 231 connecting the rod apparatus tip 227 of rod apparatus 204 to wing apparatus 208. This rotation also has 1 DOF, with a rotational axis also fixed in a direction parallel to the fuselage frame y-axis. In some embodiments, base element 239 of wing apparatus 208 can rotate about this axis relative to the rod apparatus tip 227 by 360 degrees. The relative motion between the other three rod apparatus tips and the corresponding wing apparatus base elements can be described in the same way.

A fairing 236 reduces the drag due to the gap in the wing apparatus base element. The fairing reversibly deforms passively or actively to allow the neck of the rod apparatus tip to pass through the wing apparatus base element during rotation. This gap allows the rod apparatus tip to be sized independently of the wing apparatus and can help reduce the wetted area and weight of the vehicle. In other embodiments, the rod apparatus tip chord is large enough that the neck of the rod apparatus tip does not interfere with the wing apparatus base element.

In some embodiments the rod apparatuses can be reconfigured. The rod apparatus tip is able to translate relative to the rod apparatus base along the RABF x-axis. There are several possible embodiments for this axial extension mechanism. For example, a telescopic mechanism similar to the aforementioned wing apparatus morphing mechanism may be employed.

In some embodiments, therefore, each wing apparatus base element has 2 translational DOFs and 1 rotational DOF relative to the fuselage frame.

The 1 rotational DOF of the wing apparatus base element allows the angle of attack of the wing apparatus to be determined independently of the attitude of the remainder of the vehicle.

The 2 translational DOF allow the wing apparatus base element and rod apparatus tip to move in a 2 dimensional space relative to the fuselage frame. Note that in this context the rod apparatus tip center describes the position of the rod apparatus tip. The same is true for the rod apparatus base. The "relative range space" of the rod apparatus tip, i.e. set of possible relative positions of the rod apparatus tip relative to the rod apparatus base in the fuselage frame is constrained by the maximum and minimum length of each rod apparatus as well as the maximum and minimum allowed angles of the rod apparatus base relative to the fuselage frame. In this case, since the allowed angle range spans 360 degrees, the relative range space lies in a plane parallel to the fuselage frame xz-axis, and includes the area between 2 concentric circles with radiuses equal to the maximum and minimum length of each rod apparatus. Note that this assumes the fuselage cannot interfere with the wing apparatuses when the rod is fully retracted. When this is not the case, the "inner boundary" is no longer a circle, but a path which is a function of the fuselage shape, the wing apparatus shape and configuration as well as the rod apparatus configuration. Note that structural considerations might also render the true "outer boundary" shape non-circular. Note that in other embodiments the relative range space of the rod apparatus need not be 2 dimensional, but can be 1 dimensional when the allowed relative positions describe a line. Note that in other embodiments, the relative range space of the rod apparatus can be 3 dimensional as well. In other embodiments only 1 translational DOF may exist between the rod apparatus tip and the fuselage. In other words, the position of the rod apparatus tip relative to the rod apparatus base may be constrained to move along a prescribed path. The relative range space in this case can be two dimensional or one dimensional depending on the shape of the curve can also be three dimensional. In the two dimensional case, the shape of the prescribed relative path between a rod apparatus tip and the AFIAF or fuselage can take a periodic form similar to the form shown in FIGS. 8-11 or FIGS. 19-21. The path can also take other shapes, such as the shape of a figure eight, an infinity sign, a straight line, or curved line.

The location of the center of gravity of FIA 202 or FIA 203 depends on the configuration of the wing apparatuses contained within. By changing the angle of rotation of the wing apparatus bases relative to the corresponding rod apparatus tips, the location of the center of the center of gravity of an FIA projected on the xz-plane of the fuselage frame can be adjusted for some embodiments. By changing the span or the extension fraction of wing apparatuses the location of the center of gravity of an FIA projected onto the y-axis of the fuselage frame can be adjusted. The center of gravity of an FIA therefore has 3 translational DOF in the fuselage frame, which allow it to move in a 3 dimensional space relative to the fuselage frame. During nominal, level cruise, for the depicted embodiment, the wing apparatuses are configured in symmetric fashion about the xz-plane of the fuselage frame.

The benefit of the 2 translational DOF, is that several different trajectory shapes, which describe the motion of the FIA 202 and FIA 203 relative to their respective AFIAF, are possible. Both FIA 202 and FIA 203 are able to move periodically within the xz-plane of the AFIAF frames. For example, for hovering flight, the optimal trajectory of the FIA relative to the AFIAF might lie in the xz-plane of the AFIAF frame. The same might be true for nominal, level cruise. The shape of the optimal trajectories, however, might be different. The ability to modify the shape of the trajectory, therefore, can lead to performance improvements.

During nominal, level cruise, the relative position of the rod apparatus tip to the rod apparatus base is a periodic path on a plane parallel to the fuselage xz-plane. This path can take several shapes depending on the objective.

For this vehicle embodiment, the motion during one trajectory embodiment for nominal, level cruise, can be described as follows. In this trajectory embodiment the vehicle is assumed to be on average denser than the medium it is travelling in. In other words, over one period the average NFF of both FIAs combined needs to have a component in the vertical and horizontal direction, and a portion of the vertical component of the NFF needs to arise from the acceleration of fluid. For example, the trajectory embodiment could apply to a vehicle travelling through the air The fuselage could be configured to move with a constant velocity in the inertial frame, where the velocity is identical to the horizontal average velocity vector of each FIA over one period. The AFIAF x-, y-, and z-axes are aligned with the fuselage x-, y-, and z-axes in this example. The fuselage experiences a drag force and a weight force from external sources. In some embodiments, the fuselage also experiences a lift force. To maintain the constant velocity, the fuselage needs to experience a constant net internal force in order to cancel the constant net external force. The fuselage experiences this net internal force from FIA 203 and FIA 202. Note that in some embodiments the net internal force acting on the fuselage needs to be constant at any instant in time during this form of nominal level cruise. In other embodiments the fuselage does not need to move at a constant velocity and therefore does not need to experience a zero net force from internal and external sources.

In order to describe the periodic motion of FIA 202 and 203, one could describe one period in terms of 4 phases. These 4 phases are labelled "forcing phase 1", "transition phase 1", "cruising phase 1", and "transition phase 2".

During "forcing phase 1", FIA 202 is configured to produce a substantially larger net fluid force compared to "cruising phase 1". The net fluid force has a component due to lift, zero-lift drag, and lift dependent drag. Both wing apparatuses 208 and 211 contained in FIA 202 are in configurations which reduce the drag while producing the given net fluid force. For example, this equates to their span being maximized, with all telescopic child elements being fully extended relative to their parent elements. Note that in other trajectory embodiments, the span might not be maximized during forcing phase 1. In other embodiments the magnitude of the NFF is an insufficient differentiator between forcing phase 1 and cruising phase 1. In this case, one can define the forcing phase as the phase in which the average NFF has a larger component in the positive X-direction of the inertial frame.

During forcing phase 1, there is a net internal force acting on FIA 202. The net internal force has components in the negative x-direction and in the positive z-direction of the AFIAF. An equal and opposite force is acting on the remainder of the vehicle. Part of this force is directed to the fuselage, where it cancels the weight and drag force. The other part is acting on the connecting apparatus and FIA 203. There is also a weight force acting on FIA 202 due to any mass associated with its elements. This weight force is aligned with the AFIAF z-axis. There is also a desired net force acting on FIA 202. The magnitude and direction of this net force determines the acceleration of FIA 202 in the inertial frame, and depends on the desired trajectory of FIA 202 during forcing phase 1. Note that in other embodiments the net force acting on FIA 202 during forcing phase 1 is substantially zero during at least a portion of the forcing phase 1. In order to provide this net force for a given weight and internal force, an appropriate net fluid force needs to be generated. In some embodiments, the net fluid force on FIA 202 has a component in the positive x-direction and the negative z-direction of the AFIAF.

There are numerous ways in which the aforementioned net fluid force components acting on FIA 202 can be produced. In some embodiments, the FIA 202 has a velocity component in the positive X-direction and the negative Z-direction of the inertial frame. With an appropriate configuration of the wing apparatuses contained within FIA 202 this can result in a lift vector with components in the positive X- and Z-direction of the inertial frame. The drag vector has components in the negative X-direction and positive Z-direction. Since the net fluid force has components in the positive X- and Z-direction, and the lift vector has a larger component in the X-direction than the drag vector.

In some embodiments, the rotational velocity of FIA 202 in the inertial frame is parallel to the Y-axis during nominal level cruise.

During forcing phase 1, FIA 203 is configured to operate at a smaller net fluid force than FIA 202. All four wing apparatuses 209, 210, 212, and 213 contained in FIA 203 are in configurations which minimize the drag for a given net fluid force. In some embodiments, this equates to a minimized span, with all telescopic child elements being in a retracted position relative to their parent elements. Note that in other embodiments the desired net fluid force might require the span of the wing apparatuses in FIA 203 to not be minimized during forcing phase 1. In some embodiments, the net fluid force from FIA 203 also has a lifting component. In other embodiments, it does not have a lifting component.

In some embodiments the net fluid force of FIA 203 has a component in the negative X-direction. FIA 203 experiences a net weight force due to any mass associated with its elements. A net internal force is also acting on FIA 203. When all these forces acting on FIA 203 are summed together, a net force is found. This net force accounts for any deceleration or acceleration of FIA 203 along its desired trajectory in the inertial frame. Note that in other embodiments this net force is substantially zero during at least a portion of time during forcing phase 1.

FIA 203 has a velocity in the inertial frame which has a component in the positive X-direction. Due to the periodicity constraint, and FIA 202 having a velocity component in the negative Z-direction, FIA 203 has a velocity component in the positive Z-direction. In some embodiments, the velocity component of FIA 203 in the positive X-direction is larger than the same velocity component of FIA 202. The component in the Y-direction is zero at all times.

In the above description, the lift force is being modified, which can be accomplished in several ways. In some embodiments the following methods are used. The relative velocity between the fluid and a wing apparatus controls the magnitude and direction of the lift force. The wing shape and angle of attack of the wing apparatus as well as the properties of the fluid affect mainly the magnitude of the lift force.

If the objective is to maximize the range of the vehicle during nominal, level cruise, the cost could be the energy consumed per unit horizontal distance travelled. In this case, FIA 203 might operate at a lower cost during forcing phase 1 than FIA 202. The larger horizontal velocity in the inertial frame for FIA 203 compared to FIA 202 could result in a further horizontal distance travelled by FIA 203. The combined cost associated with FIA 202 and FIA 203 is the horizontal distance weighted sum of the individual costs. In some embodiments, the combined cost is minimized by operating the vehicle based on the aforementioned principles. The combined cost can be less than the hypothetical combined cost for a comparable conventional propeller driven fixed wing vehicle, for example. This demonstrates the usefulness of the ability of the FIAs to move relative to their AFIAFs along at least the x-direction of the AFIAF frames. Combined with the ability to modify the zero-lift drag of the FIAs, which in this case is accomplished by modifying the wetted area of the FIAs, an improvement in the range can be achieved.

The aforementioned velocities of FIA 202 and FIA 203 in the inertial frame result in the following velocities relative to the AFIAF. During forcing phase 1, FIA 202 has a velocity relative to the AFIAF with components along the positive z-direction and negative x-direction of the AFIAF. FIA 203 has a velocity relative to the AFIAF with components along the negative z-direction and positive x-direction of the AFIAF.

During nominal level cruise, the phase "cruising phase 1" is identical to "forcing phase 1" with FIA 203 and FIA 202 switching roles. The same applies to the relationship between "transition phase 1" and "transition phase 2". The operation of two FIAs such as FIA 202 and FIA 203 thus requires a matching of the forcing phase of one FIA to the cruising phase of another. Assuming the transition phases require negligible time for simplicity, the ratio of the duration of the forcing phase to the duration of one period would have to be 0.5. If this ratio, denoted "xt", is not the optimal ratio for an individual FIA, several methods are available for increasing the performance of the vehicle. In a first example, one can operate "N" FIAs in a manner similar to FIA 202 and FIA 203, where N is any number larger than 2. In this case, the trajectories of the N FIAs are 360/N degrees out of phase. The periodic motion of each of the N FIAs can be described in terms of "forcing phase 1", "transition phase 1", "cruising phase 1", and "transition phase 2". Assuming the transition phases have a negligible duration for simplicity, there may be "Q" FIAs in a forcing phase at any one time, where Q is greater than or equal to 1 and smaller than N. There may also be "P" FIAs in a cruising phase at any one time, where P=N−Q. In a second example, FIA 202 and FIA 203 can be operated according to different trajectory embodiments, which contain durations of time where FIA 202 and FIA 203 are both in a cruising phase simultaneously. The latter case is similar to the cruising phase of FIA 102 and MSA 103. For example, one period for FIA 202 could be described in terms of phases "forcing phase 1", "transition phase 1", "cruising phase 1", "transition phase 2", "cruising phase 2", "transition phase 3", "cruising phase 3", "transition phase 4". One period for FIA 203 would be 180 degrees out of phase with the trajectory of FIA 202, such that forcing phase 1 of FIA 203 coincides with cruising phase 2 of FIA 202. In a third example, FIA 202 and FIA 203 need not be substantially identical in their interaction with the fluid and their operation. For instance, FIA 202 may be configured in a way in which the optimal xt for FIA 202 is 0.6 while the optimal xt for FIA 203 is 0.4. Such an arrangement can be attained using optimization methods. In a fourth example, the length of the transition phases can be used to adjust the value of xt.

During transition phase 1, FIA 202 is reconfigured to assume the configuration of FIA 203 in forcing phase 1, and vice versa. In some embodiments, the duration of the transition phase is as short as possible since it might involve temporarily less ideal operation of the vehicle compared to forcing phase 1 or cruising phase 1. The operation of the vehicle during the transition process can be a function of actuation or structural constraints. For example, there might be a constraint on the magnitude of the net internal force acting on FIA 202. This limits the magnitude of the acceleration it needs to experience in order to change its velocity to that initially held by FIA 203. There might also be a limit on the acceleration during the retraction or extension of the telescopic wing elements. The angular acceleration of a wing apparatus about the pitch axis might also be limited. The most suitable operation of the vehicle during the transition phase depends on the particular embodiment.

One can now describe a more detailed example trajectory in the inertial frame. FIG. 18 shows the vehicle during nominal, level cruise at different, equally spaced points in time. From top to bottom, the figure contains a side view, followed by a top view, followed by a perspective view of the vehicle. In the side and top view, the vehicle is travelling from left to right, and in the perspective view it is travelling from the bottom left to the top right. The paths traced in the inertial frame by points on the vehicle are also shown.

Note that the trajectory shown is a sketch meant to illustrate the basic principles that could be employed by a vehicle with similar features. The most suitable trajectory which satisfies the constraints depends on the embodiment and objective.

Three different views of the same trajectories in the inertial frame are shown. The top sequence shows the right side of the vehicle which is moving from left to right in the figure. The middle sequence is a top view of the vehicle shown at same points in time as in the top sequence. The bottom sequence is a projected view from the top rear of the vehicle. Each configuration snapshot shows the vehicle at a different location as viewed by an observer stationary in the inertial frame. The trajectories shown are the path 271 of fuselage 201, path 272 of the tip of wing apparatus 208, path 273 of the tip of wing apparatus 209, path 274 of the tip of wing apparatus 210, the path 275 of the tip of wing apparatus 211, the path 276 of the tip of wing apparatus 212, and path 277 of the tip of wing apparatus 213. Snapshot 257 depicts the vehicle during forcing phase 1, with wing apparatuses 208 and 211 of FIA 202 in their fully extended configurations and with the wing apparatuses of FIA 203 in their fully retracted configurations. Snapshots 258 to 260 show the vehicle during transition phase 1. Snapshot 261 exemplifies cruising phase 1, with wing apparatuses 208 and 211 now in their fully retracted configuration and the remaining wing apparatuses in their fully extended configuration. Snapshots 262 to 263 illustrate the reconfiguration occurring during transition phase 2. Snapshot 264 shows the vehicle during forcing phase 1 once more.

The trajectory of the rod apparatus tip center of rod apparatus 204 relative to the fuselage frame is denoted the "rod apparatus tip relative trajectory 1", or RATRT1. Similarly, RATRT2, RATRT3, and RATRT4 can be defined for rod apparatus 205, 206, and 207 respectively. One can define the "overall amplitude" of a RATRT as a measure of the maximum extent of the RATRT in any direction. More specifically, the overall amplitude is the diameter of a sphere of smallest possible radius which still encompasses all points of a RATRT. Note that the overall amplitude is not a measure of the maximum extent along any particular axis of the fuselage frame. One can also define the RATRT "x-amplitude" to be the difference between the maximum and minimum extent of the projection of the RATRT on the fuselage frame x-axis. The RATRT "y-amplitude" and "z-amplitude" can be defined in a similar manner.

The trajectory of the origin of FIAF of FIA 202 relative to the fuselage frame is denoted the "FIA relative trajectory 1", or FIART1. Similarly, FIART2 can be defined for FIA 203.

Recall, that for this vehicle embodiment, the relative range space of a rod apparatus lies in a plane parallel to the fuselage frame xz-axis, and includes the area between an "inner boundary" and an "outer boundary". For this embodiment, during nominal level cruise, each RATRT forms a periodic path. This path can have any shape as long as it remains within the relative range space. Its curvature can vary with position in configuration space. This large range of possible RATRTs provides the vehicle with the freedom to optimize its trajectory for different locomotion modes. Note that this path can cross over itself any number of times or at no time during a period. For example, the path could form a figure-8 pattern and cross over itself at least once during a period. Note that the path of one RATRT can also "cross itself" continuously for a duration of time of one period, which can also include the entire period. In other words, the path may contain a portion which the rod apparatus tip traverses in both directions at least once during a period. For example, the path might be a straight line, along which the rod apparatus tip moves in one direction during a forcing phase, and the other direction during a cruising phase, with direction reversals occurring at each end of the straight line during transition phases. Such a portion of the path need not be straight, but can be curved or of seemingly arbitrary shape.

For this vehicle embodiment, during nominal, level cruise, the projections of RATRT1 and RATRT2 on the xz-plane of fuselage frame are identical. In this configuration the RATRTs are said to be "mirrored" for convenience. This is due to the symmetry of the vehicle about the fuselage frame xz-plane and the connection of both RATRT1 and RATRT2 to FIA 202. Similarly, RATRT3 and RATRT4 are also mirrored. In this trajectory embodiment, FIART1 and FIART2 are identical in shape and scale, although they need not occupy the same position relative to fuselage frame. For example, FIRART1 could lie above the fuselage, while FIART2 is located below the fuselage.

In the following discussion, the projection of RATRT1 and RATRT3 on the xz-plane of fuselage frame will be used as a substitute for FIART1 and FIART2, since the two are closely related. These projections will be labelled "projected RATRT", or PRATRT1 and PRATRT3. Due to mirroring, PRATRT1 can be used to describe both PRATRT1 and PRATRT2, and PRATRT3 can be used to describe both PRATRT3 and PRATRT4. In this context the inner and outer boundaries are also treated as projections on the xz-plane, for simpler description in 2D. Without the designating number, a PRATRT refers to a generic case which applies to any or all PRATRT1 to 4.

For improved performance, it might be desirable minimize the time spent in a transition phase as a fraction of the period. This could translate to maximizing the overall amplitude of a PRATRT for a given relative range space. To this end, the location and shape of a PRATRT can be optimized within the range space.

In some embodiments the periodic path formed by a PRATRT encloses an area, and does not cross itself. In some trajectories it is possible for the path to fully enclose the inner boundary of the relative range space for the rod apparatus. Whether the path is allowed to actually enclose the fuselage depends on zero average net external moment considerations, which are introduced later and constrain the possible locations of the fuselage relative to the PRATRT. Other factors such as weight, drag and complexity also determine whether a PRATRT enclosing the inner boundary is desirable.

In the case where the inner boundary is enclosed at least once by PRATRT1, it might be desirable to maximize the overall amplitude of PRATRT1. This might result in PRATRT1 to be coincident with the outer boundary at least once. In some embodiments, such an optimization might lead to PRATRT1 and PRATRT3 to be substantially identical.

In the case where a PRATRT encloses the inner boundary at least once, the connecting apparatus can comprise a rail in the shape of the PRATRT. In this case, the vehicle might comprise at least 2 telescopic wing apparatuses with mounts located at the center. The wing apparatuses could be configured to move along the rail in accordance with the desired trajectory for each FIA.

For some embodiments of the vehicle and the trajectory, it might not be possible or desired for a PRATRT to fully enclose the inner boundary of the relative range space for the rod apparatus.

For example, consider a case where the desired PRATRT1 to 4 are identical straight lines, and the range space for PRATRT1 and 2 is identical in shape and scale to the range space for PRATRT3 and 4. For simplicity, consider a scenario, where the inner bound and outer bound are concentric circles. In this case the overall amplitude of a PRATRT is maximized by it being arranged tangentially to the inner circle with both ends of the straight line lying on the outer circle. Note that such a configuration also needs to obey other constraints, such as a zero average net external moment constraint, which might require a shortening of the overall amplitude of the PRATRT, with only one end of the PRATRT lying on the outer circle. Note that in order to avoid interference between two FIAs in this example, PRATRT1 can be on one side of the inner circle, and PRATRT3 on the other side. More specifically, PRATRT1 can be positioned tangentially to one point of the inner circle, and PRATRT3 can be positioned tangentially to a different point on the inner circle. During the transition phases, this can lead to a large internal moment impulse on any apparatus connected to both FIAs. If this moment impulse is undesirable, the PRATRT3 can be located on the same side of the inner circle as PRATRT1, but with an offset in at least the direction perpendicular to the straight lined PRATRT1 in order to avoid interference. In some embodiments, PRATRT3 can be arranged with a negligible offset in the direction perpendicular to the direction vector of the straight lined PRATRT1 with an offset in the parallel direction of at least the full length of PRATRT1. Overlapping of PRATRT1 with PRATRT3 is thus avoided in the parallel rather than perpendicular direction.

Note that the concepts described in this example with a straight PRATRT are also relevant to PRATRT which are not straight but curved, or enclose an area. They also apply to cases where the inner and outer boundaries are not circular.

In the trajectory example illustrated in FIGS. 18-21 the periodic path formed by a PRATRT encloses an area, and does not cross itself during nominal level cruise. In some embodiments, the PRATRT1 and PRATRT3 are substantially identical in shape and scale. In this case, the PRATRTs are placed above the inner boundary of the relative range space and do not once enclose the inner boundary. As mentioned, both PRATRTs could also be located on opposite sides of the inner boundary. In the depicted embodiment, the x-amplitude of a PRATRT is larger than the z-amplitude. In this trajectory embodiment PRATRT1 and PRATRT3 can occupy the same position in the fuselage frame, and can thus be said to be mirrored according to the aforementioned definition. In this case PRATRT1 can be used to describe PRATRT1, PRATRT2, PRATRT3, and PRATRT4. Note that on PRATRT1 the position of a rod apparatus tip associated with FIA 202 is offset by a half-period relative to the position of rod apparatus tip associated with FIA 203. The "mirroring" is only possible or desirable when the motion of both rod apparatus tips along PRATRT1 does not result in collision or excessive fluid dynamic interference between the FIAs and rod apparatuses. Collision, as well as undesired levels of fluid dynamic interference are denoted "interference" for simplicity. The benefit of mirroring could be the possibility for both FIAs to operate on a similar, optimized trajectory with a comparably large overall amplitude. The penalty of such mirroring could be the added structure and drag of the connecting apparatus, which itself needs to avoid interference. If the optimal PRATRT1 for the particular locomotion type is not interference free, then compromises in PRATRT1 shape can also incur a cost penalty.

There are several ways in which interference involving the connecting apparatus can be avoided. In some embodiments, the rod apparatuses are offset relative to each other. The relative position of one rod apparatus base center relative to another rod apparatus base center has a component along at least the fuselage frame y-axis. One can define a rod apparatus base angle as the rotation about the fuselage frame y-axis that would be required in order to align the fuselage frame with the rod apparatus base frame. With the placement of the inner boundary outside and below PRATRT1, there is a point along the PRATRT1 where the rod apparatus base angles relative to the fuselage frame are equal for rod apparatus 204 and rod apparatus 206. This angle is defined the "crossing angle". Since the rod apparatuses are at sufficiently different extensions, there is no undesired interference between the wing apparatuses. During forcing phase 1, rod apparatus 204 extends further than rod apparatus 206 at the crossing angle. As shown in FIG. 17, interference between rod apparatus 204 and wing apparatus 210 is avoided by wing apparatus 210 being in a fully retracted state and by offsetting the base of rod apparatus 206 a sufficient distance in the positive fuselage frame y-direction relative to rod apparatus 204. Wing apparatus 209 is exempt from any extension restrictions, but at this point in the trajectory is also in a fully retracted state. Similarly, interference is avoided between rod apparatus 205 and wing apparatus 213. During cruising phase 1, rod apparatus 206 extends further than rod apparatus 204 at the crossing angle. As shown in FIG. 16, interference between rod apparatus 206 and wing apparatus 208 is avoided by wing apparatus 208 being in a fully retracted state and by offsetting the base of rod apparatus 206 a sufficient distance in the positive fuselage frame y-direction relative to rod apparatus 204. Similarly, interference is avoided between rod apparatus 206 and wing apparatus 211.

Note that the above analysis assumed that the FIART1 and FIART2 are identical in shape during nominal, level cruise. This need not be the case.

Figure 19:
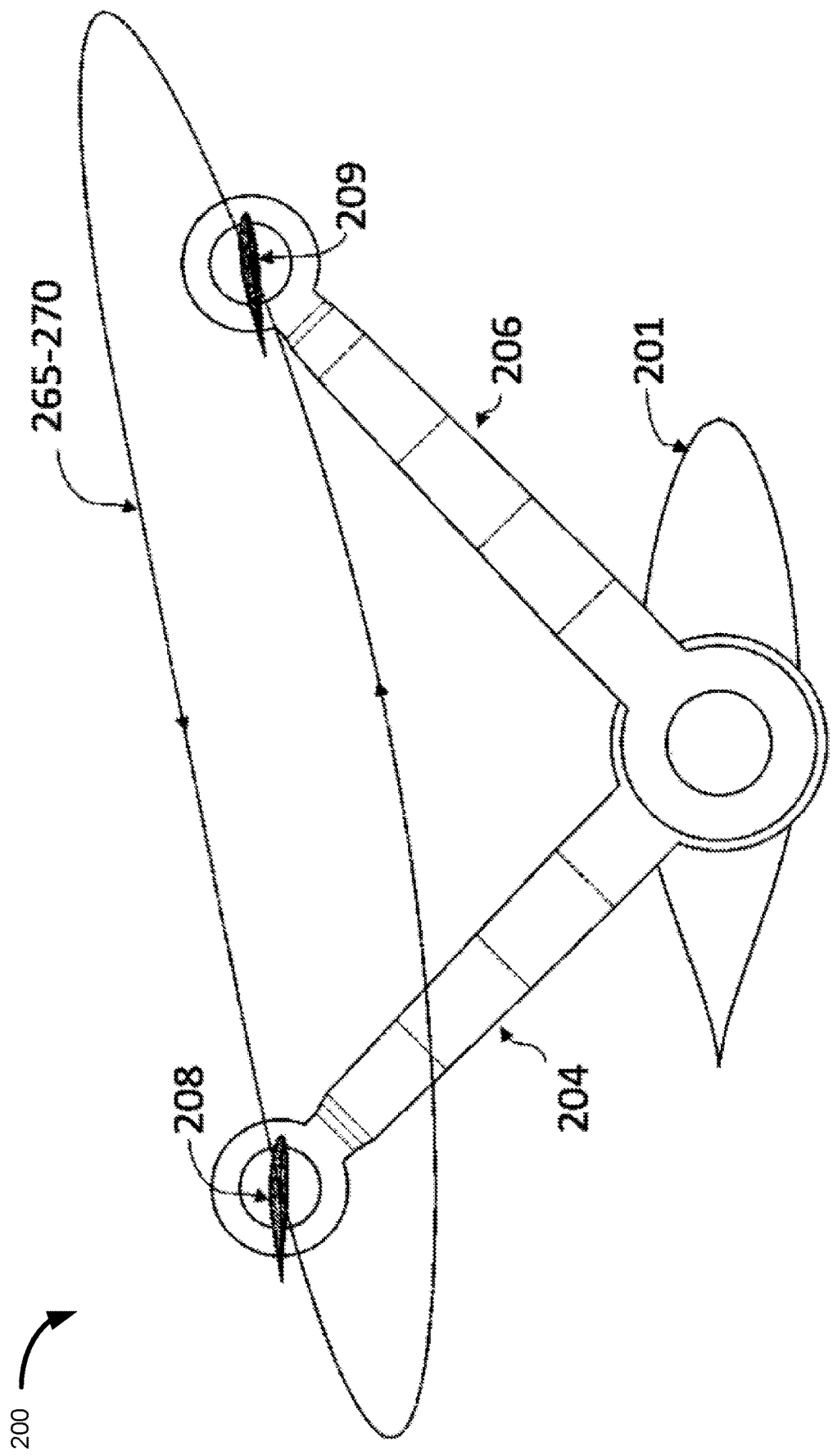
FIG. 19 is a side view of the vehicle shown in FIG. 14 in a different configuration, in accordance with some embodiments. The paths traced by points on the vehicle during the trajectory shown in FIG. 18 as viewed by an observer travelling with the average velocity of the vehicle are also shown.
Figure 20:
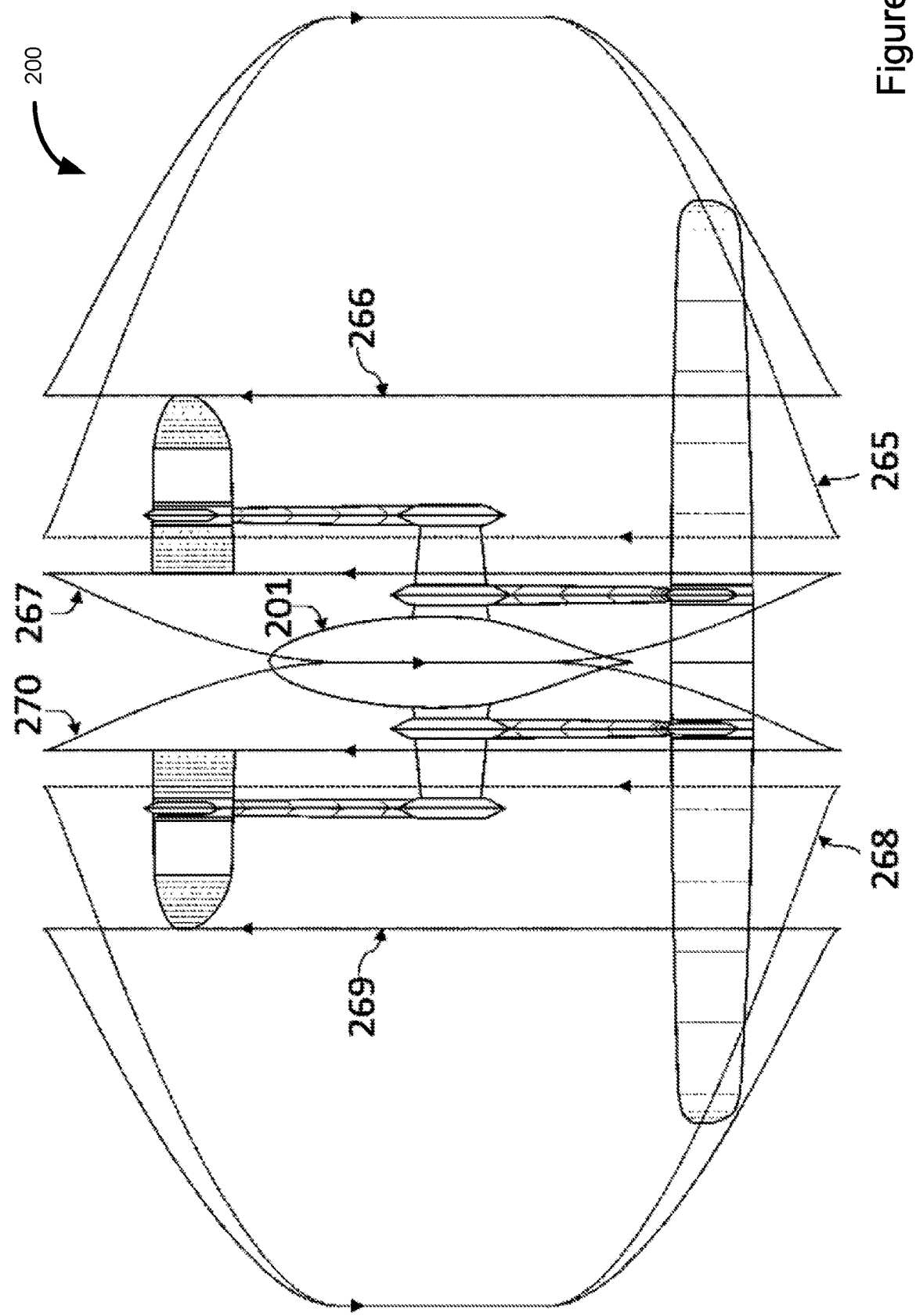
FIG. 20 is a top view of the vehicle and trajectory shown in FIG. 19, in accordance with some embodiments.
Figure 21:
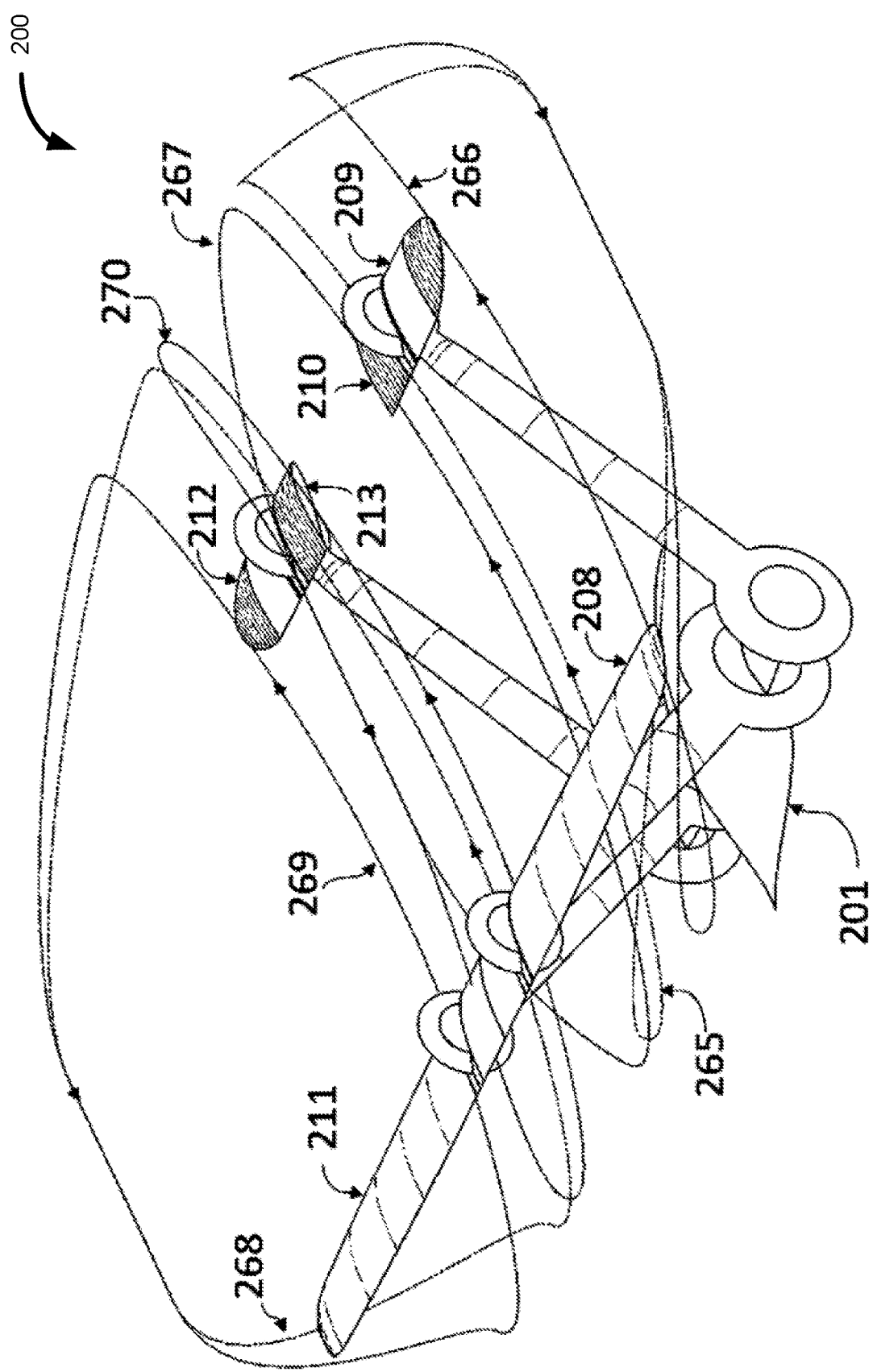
FIG. 21 is a perspective view of the vehicle and trajectory shown in FIG. 19, in accordance with some embodiments.

FIGS. 19-21 show the same trajectories as FIG. 18 as viewed by an observer moving with the fuselage frame. The paths indicate the relative motion of the wing apparatus tips in the fuselage frame during one period. Shown are the relative path 265 of the tip of wing apparatus 208, the relative path 266 of the tip of wing apparatus 209, the relative path 267 of the tip of wing apparatus 210, the relative path 268 of the tip of wing apparatus 211, the relative path 269 of the tip of wing apparatus 212, and the relative path 270 of the tip of wing apparatus 213. A snapshot of the vehicle is also shown.

FIG. 19 shows the side view of the relative paths 265 to 270 during nominal, level cruise as well as the vehicle snapshot. The fuselage frame y-axis is pointing out of the page, and the x-axis is pointing to the right. Note that the paths are overlapping when viewed from the side in this simplified representation. In reality the differences in shape, weight, and drag of the wing apparatuses and their associated rod apparatuses will result in a different relative paths for FIA 202 and FIA 203. Note that FIG. 19 does not show the projected rod apparatus tip relative trajectories, although the path of the wing apparatus tips in this case is closely related to the rod apparatus tip center. In the configuration shown the vehicle is in transition phase 1, with FIA 202 reducing its wetted area by retracting wing apparatuses 208 and 211. In some embodiments, wing apparatuses 209, 210, 212, and 213 of FIA 203 are still in their retracted state during this stage of the deceleration for structural reasons. In other trajectory embodiments, the reconfiguration during the transition phase will be different. The wing apparatus tips are moving in a counter-clockwise sense along the relative paths 265 to 270 in this particular view. This is indicated by the arrow heads superimposed on the path.

FIG. 20 shows a top view of the relative paths of FIG. 19 as well as the vehicle snapshot. The fuselage frame z-axis is pointing into the page, and the fuselage frame y-axis is pointing to the right. The direction of motion along each path is indicated by the arrow heads superimposed on the paths. The change of wetted area by means of telescopic extension and retraction of the wing apparatuses is particularly apparent. Also note the function of the horizontal support 214 in separating the tip of wing apparatus 208 from rod apparatus 206, and the tip of wing apparatus 210 from rod apparatus 204, as well as reducing fluid dynamic interference between the rod apparatuses 204 and 206, for example.

FIG. 21 is perspective view of the scene shown in FIG. 19 and FIG. 20.

Figure 22:
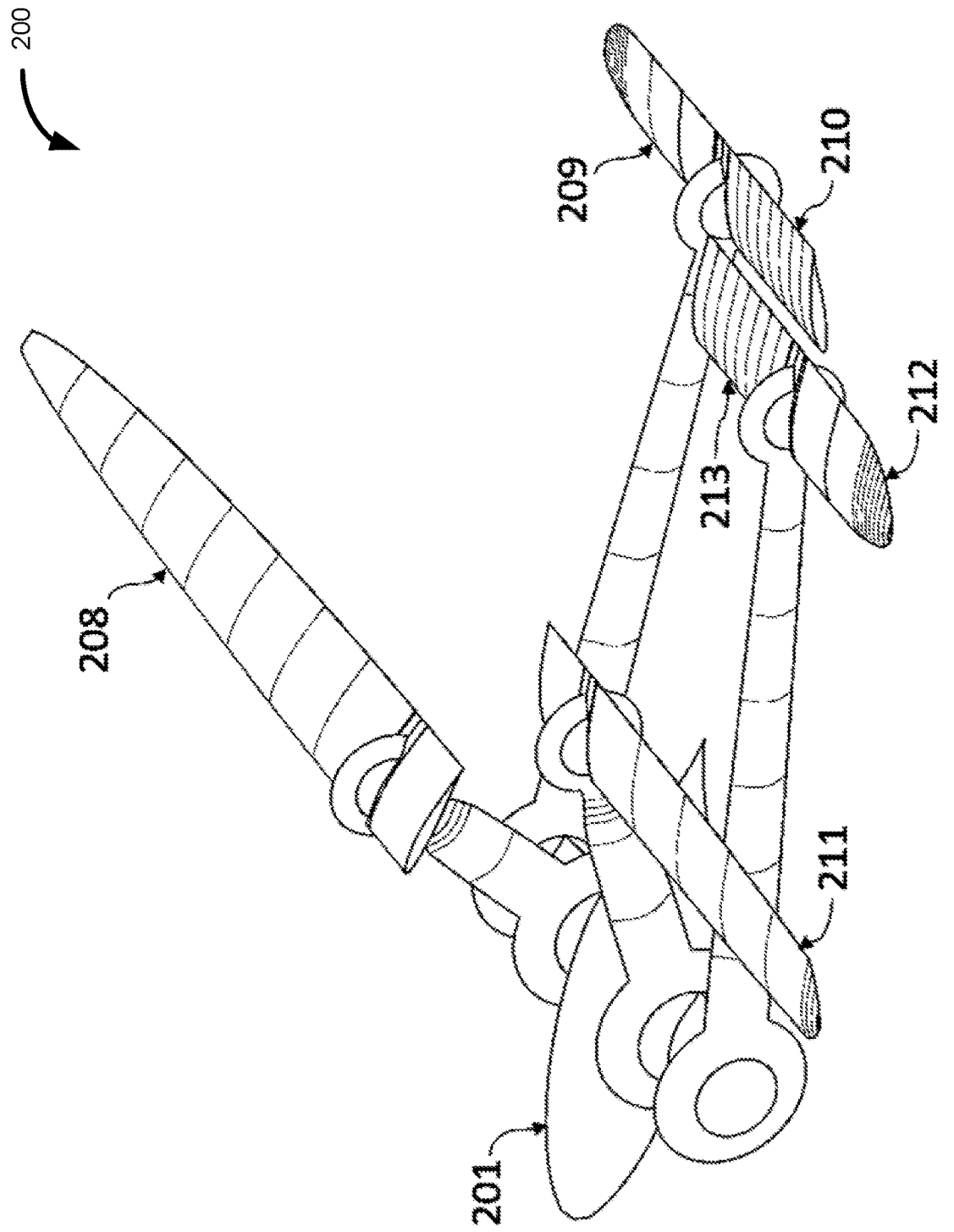
FIG. 22 is a perspective view of the vehicle shown in FIG. 14 in a different configuration, in accordance with some embodiments.

FIG. 22 shows the vehicle in a configuration that illustrates the individual degrees of freedom of some embodiments. Note that some or all of the rod apparatuses can rotate and extend independently of other rod apparatuses. The wing apparatuses can also rotate relative to their respective rod apparatus tips by any desired angle about the fuselage y-axis. They can also extend a desired amount.

Figure 23:
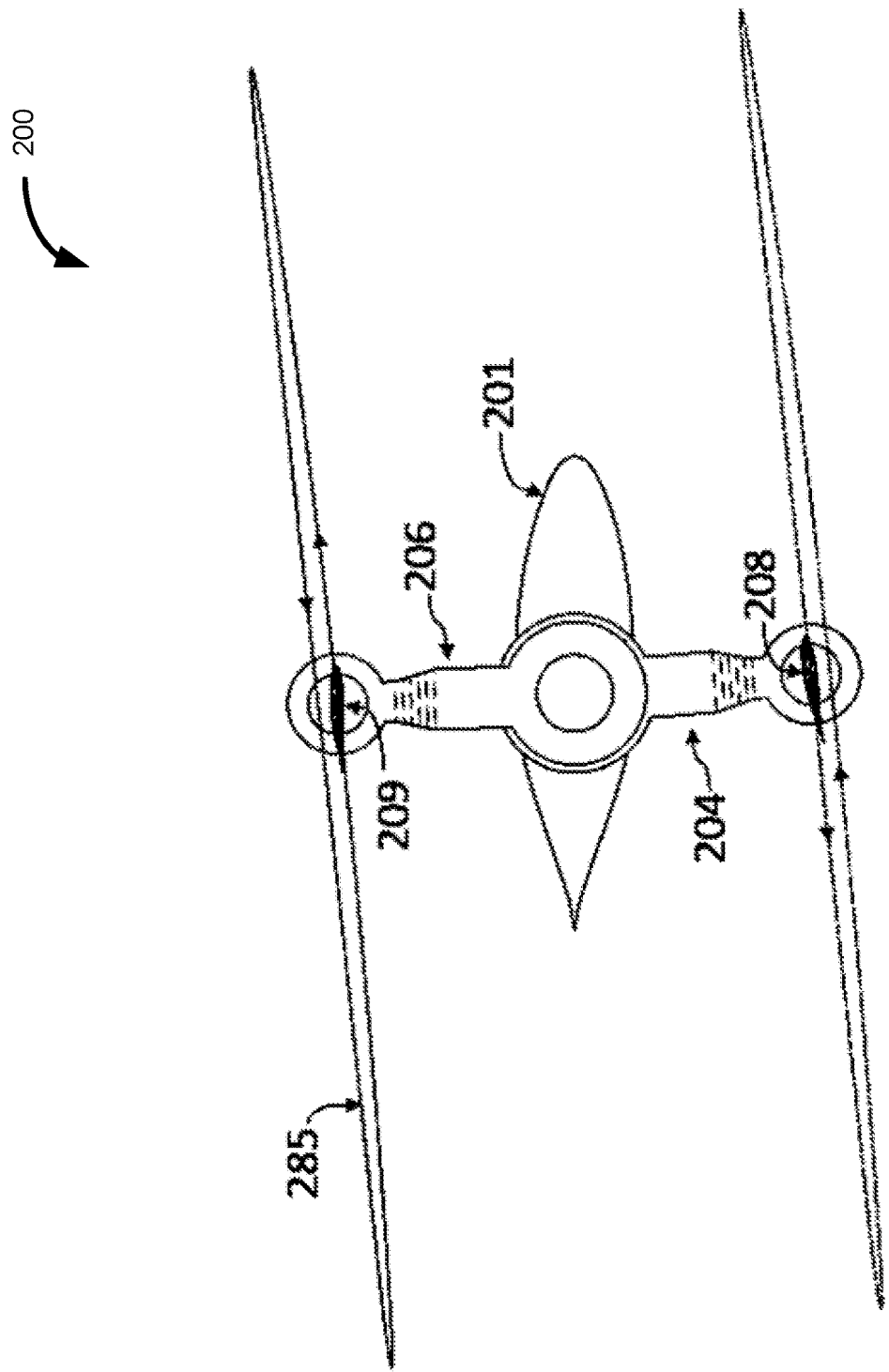
FIG. 23 is a side view of the vehicle shown in FIG. 14, in accordance with some embodiments.
Figure 24:
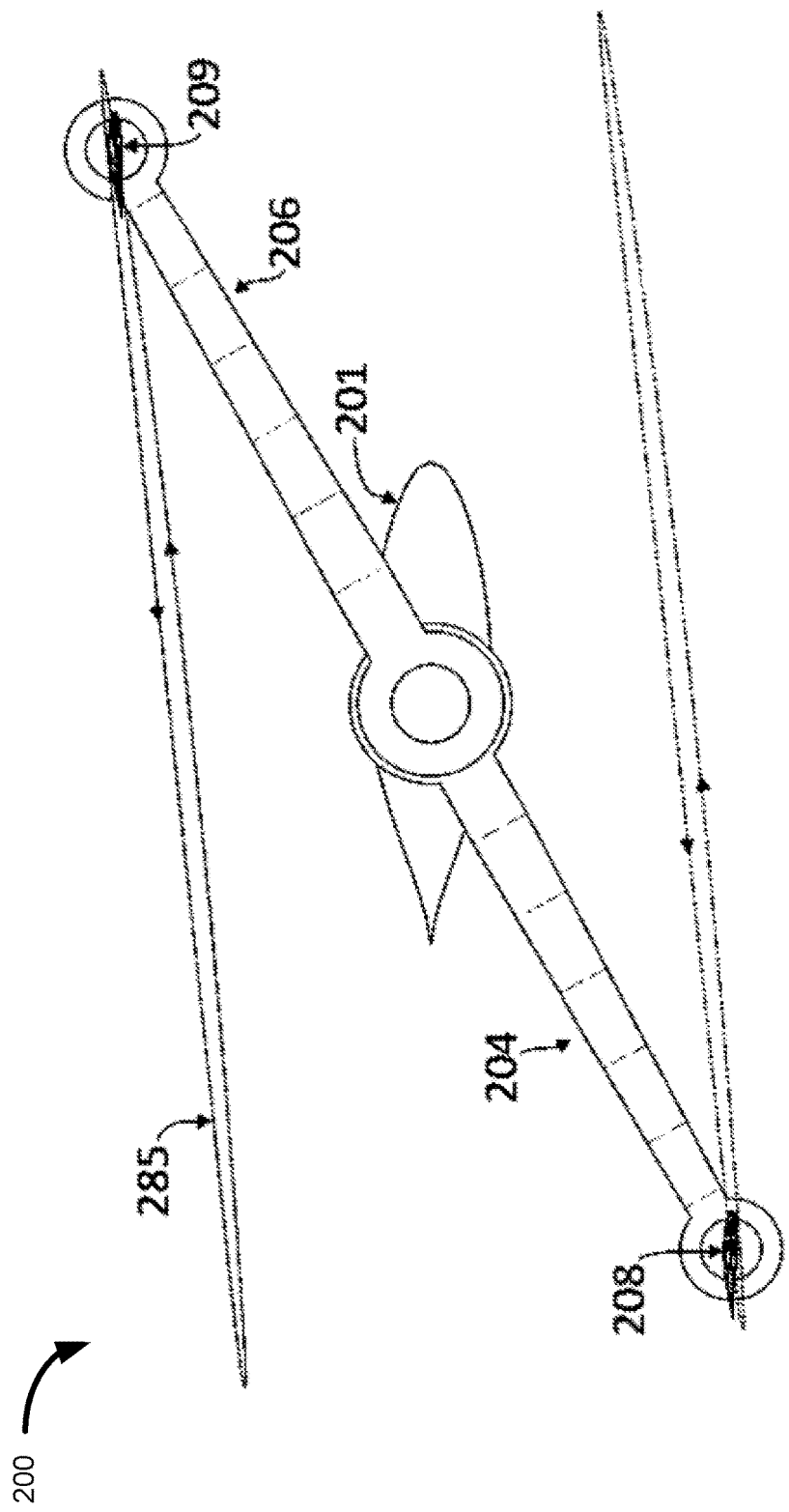
FIG. 24 is a side view of the vehicle shown in FIG. 14 in a different configuration, in accordance with some embodiments.

FIG. 23 is a side view of the vehicle shown in FIG. 14, in accordance with some embodiments. FIG. 24 is a side view of the vehicle shown in FIG. 14 in a different configuration, in accordance with some embodiments. Collectively, FIGS. 23-24 illustrate a substantially linear periodic path/path 285 of wing apparatuses 208/209. In some embodiments, the substantially linear periodic path is achieved by extending (e.g., FIG. 24) and contracting (FIG. 23) rod apparatuses 204/206 as need to maintain the movement of the wing apparatus 208/209 within a plane (e.g., the X-Y plane).

The relative motion between FIA 202, FIA 203 results in a position offset between the net external forces acting on FIA 202 and the net external forces acting on FIA 203 as well as the net external forces acting on the fuselage and connecting apparatus. This can result in a net external moment about the center of gravity of the vehicle. Since the relative positions and forces are in the xz-plane of the fuselage frame in this case, the net external moments will be parallel to the fuselage frame y-axis. During maneuvering flight such moments can be used to control the pitch orientation of the vehicle. In the context of the following discussion on moments, the term AFIAF refers to the average FIA frame associated with the entire vehicle.

During nominal, level cruise, the average net pitching moment acting about the center of gravity of the vehicle over one period should be zero. This also applies to the rolling and yawing moments. This can be achieved by positioning the fuselage relative to the AFIAF in a way that results in a zero average net external moment over one period. In some embodiments, the fuselage may be positioned anywhere along a line in the AFIAF xz-plane to achieve this.

Any instantaneous pitching moment acting about the vehicle center of gravity can also be undesirable. There are numerous ways to mitigate any undesirable effects on the attitude of the vehicle.

For example, one could use at least one flywheel to modify the angular momentum of the entire vehicle about the y-axis of the AFIAF in accordance with instantaneous external pitching moments. A flywheel could be mounted in the fuselage, for example. A flywheel could also be mounted in the rod apparatus base or rod apparatus tip. The flywheel axis of rotation could be aligned with a principal axis of the flywheel, but does not have to if any undesired instantaneous moments are cancelled by another flywheel. The axis of rotation could be fixed relative to the fuselage frame. The axis could be parallel to the fuselage frame y-axis. The flywheel could comprise energy storage materials, such as batteries or fuel. This could help minimize any increase in weight associated with such an inertial moment cancelling device, potentially making it more attractive than using devices such as elevators which rely on interaction with the fluid and carry a weight and drag penalty. The flywheel could also comprise structural materials and actuators for operating the flywheel. An actuator could apply a moment to the flywheel, which applies an equal and opposite moment on the rest of the vehicle, which in turn can cancel the effect of any external moment on the attitude of the rest of the vehicle. Since there is no average pitching moment over one period during nominal level cruise, the flywheel speed remains constant on average.

The shape of the flywheel is dictated by drag and structural considerations, amongst others. When placed inside the fuselage, it might be advantageous for the flywheel to be symmetric about the axis of rotation to maximize the space utilization. For example, the flywheel could be spherical or cylindrical in shape. The flywheel need not be encased, but can interact with the fluid and experience a net fluid force and moment, which are accounted for in the net external force and moment acting on the vehicle. In this case, the most suitable flywheel shape could have three different principal moments of inertia When more than one flywheel is employed, their axes of rotation need not all be parallel. The flywheel axes of rotation can be oriented in any manner, as long as at least one axis has at least a component along the fuselage y-axis and any angular velocity components in the fuselage xz-plane can be arranged to cancel each other during nominal level cruise. The advantage of such a configuration would be the availability of instantaneous momentum impulses along the x- or z-axis of the fuselage frame for maneuvering and other trajectories.

Another method for modifying the angular momentum of the vehicle about the y-axis of the AFIAF is the use of gyroscopic effects. In some embodiments, the vehicle comprises at least one flywheel with a first axis of rotation configured to rotate about a second axis which is not parallel to the first axis. In some embodiments, the first axis of rotation can be aligned with a principal axis of the flywheel. The flywheel is mounted in a way that allows it to rotate about the first axis. The mounting of the first axis is configured in a way that allows the first axis to rotate about a second axis not parallel to the first axis. In some embodiments, the second axis is orthogonal to the first. In some embodiments, the second axis is fixed relative to the fuselage frame. The angular momentum of the vehicle about the fuselage frame y-axis can be modified as follows.

If the first axis of rotation has a component along the fuselage frame y-axis, the angular momentum along the y-axis can be modified by changing the rate of rotation of the flywheel about the first axis. This is similar to a conventional flywheel mentioned previously.

Said angular momentum can also be modified without changing the rate of rotation of the flywheel about the first axis. If the rate of rotation about the first axis is non-zero, and if the second axis has a non-zero component in the fuselage frame xz-plane, then a rotation of the first axis about the second axis will modify the angular momentum of the vehicle about the fuselage frame y-axis.

Note that these operations can also change the contribution of this "gyroscopic apparatus" to the net angular momentum of the vehicle about the fuselage frame x- or z-axis. In some embodiments, the vehicle can comprise at least another such gyroscopic apparatus configured in a way that one apparatus cancels the contributions of the other gyroscopic apparatuses to the net angular momentum of the vehicle about the fuselage frame x- or z-axis as desired.

As a concrete example, consider a vehicle comprising gyroscopic apparatus A, or GAA, and gyroscopic apparatus B, or GAB. Both could be located in the fuselage. They could be located sequentially along the fuselage centerline. They comprise structural material, energy storage material such as batteries, as well as actuator components. In this example they are identical for convenience. They are spherical in shape in order to maximize the space utilization inside the fuselage as well as the largest moment of inertia. The first axis of rotation is aligned with the principal axis corresponding to the largest principal moment of inertia. They are symmetric about the first axis of rotation, such that the two smaller principal moments of inertia are equal. In their nominal position, the angular momentum of both GAA and GAB cancels. In some embodiments, the second rotational axis of GAA is parallel to the second rotational axis of GAB and the fuselage frame x-axis. The first rotational axes of GAA are and GAB are perpendicular to their respective secondary axes. In the nominal position, the first rotational axes are parallel to the fuselage frame z-axis. In the nominal position, the angular velocity of GAA is pointing in the positive fuselage frame z-direction. GAA and GAB are rotating with a specified rotational speed about their first rotational axis, and thus have a specified angular momentum. In some embodiments, the rotational speed of GAA and GAB is equal.

When an increase in angular momentum of the vehicle about the fuselage frame y-axis is required, GAA can be rotated in the negative sense about the fuselage frame x-axis while GAB rotates about the same axis in the opposite direction with the same angular position and rate as GAA. Any components of the angular momentum of GAB that are not aligned with the fuselage y-axis are cancelled by equal and opposite components of GAA. The components of GAB and GAA that are aligned with the fuselage y-axis add together, resulting in a net angular momentum about this axis, as desired.

In other embodiments, the vehicle comprises at least one flywheel with a first axis of rotation, configured to rotate about a second axis of rotation, which in turn is configured to rotate about a third axis of rotation. The second axis is neither parallel to the first nor the third axis. The principle of operation during nominal level cruise is the same as in the aforementioned case with a first and second axis. Note that the benefit of a 3 axis gyroscope could be increased maneuverability due to the availability of angular momentum about all three axes of the fuselage frame. Note that these axes can be theoretical and need not have distinct physical manifestations.

Note that other methods for altering the angular momentum of the entire vehicle exist. Any incremental mass which accelerates relative to the inertial frame and which has an acceleration vector that does not pass through the center of gravity of the vehicle will contribute to a rate of change of angular momentum of the vehicle. This effect can be used to mitigate any undesired change in attitude of the remaining elements of the vehicle due to a net external moment on the vehicle.

The vehicle could also comprise additional fluid interaction apparatuses in order to generate additional external moments to lead to a zero net instantaneous or average external moment. For example, the vehicle could additionally comprise at least one elevator, or a wing apparatus producing a net fluid force and weight force with a line of action that does not pass through the instantaneous center of gravity of the vehicle. This elevator or wing apparatus can be operated to ensure a zero net pitching moment about the center of gravity at an instant in time. Such a device could also be used to ensure a zero average pitching moment, provided other methods are employed for instantaneous pitching moment cancellation, if required. Note that this would increase the drag and weight of the vehicle. The vehicle could also be operated in a way in which no pitching moments are generated at any instant in time. This might lead to performance penalties, however.

Figure 9:
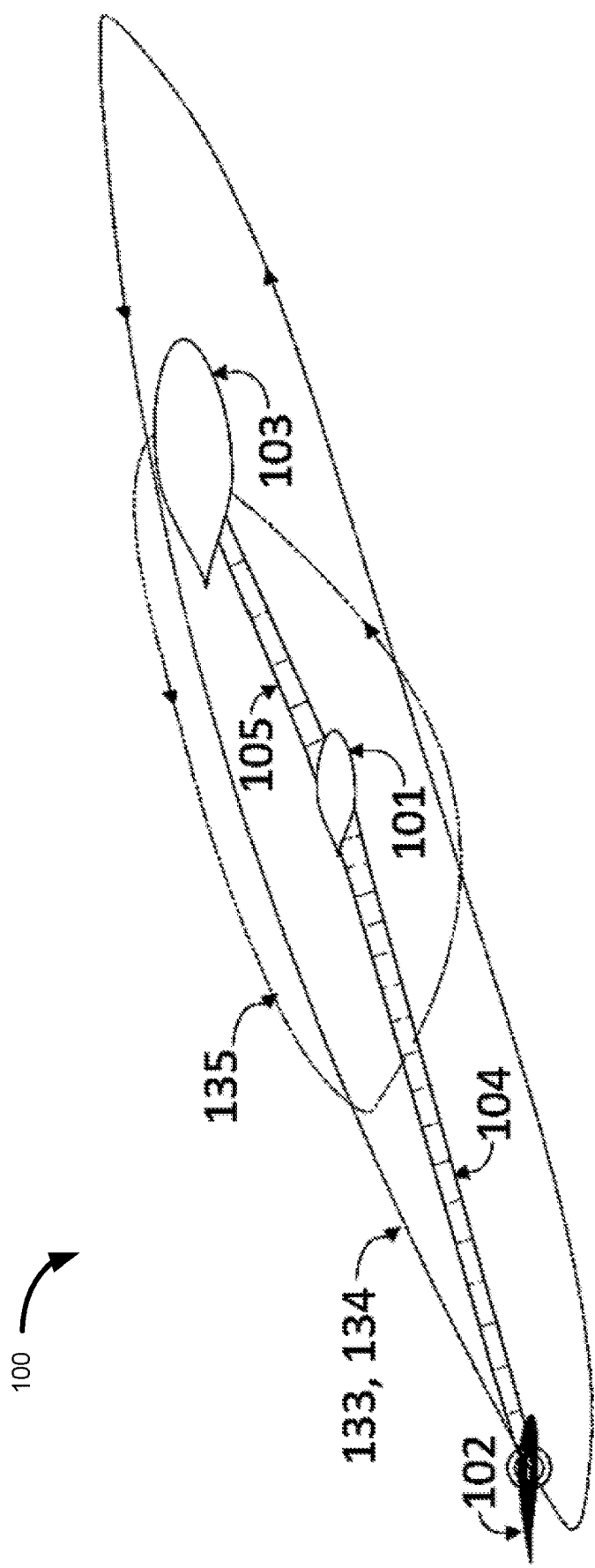
FIG. 9 is a side view of the vehicle and trajectory shown in FIG. 8, in accordance with some embodiments.

FIG. 9 shows the vehicle in a configuration that illustrates the individual degrees of freedom of some embodiments. Note that each rod apparatus can rotate and extend independently to any other rod apparatus. The wing apparatuses can also rotate relative to their respective rod apparatus tips by any desired angle about the fuselage y-axis. They can also extend a desired amount.

There are several different actuator types and locations. Consider the actuation of the rotational joints between the rod apparatus bases and the horizontal support, such as rotational joint 217. In some embodiments, this joint is actuated by an electric motor housed within the structure surrounding the joint. In some embodiments this motor is of the brushless DC type. In other embodiments other types of electric motors such as AC induction motors can be used.

Similar options are available for actuating the rotational joint between the rod apparatus tips and the wing apparatuses, such as rotational joint 231.

The telescopic mechanism within the rod apparatus can be actuated using an electric actuator as well. The actuator can be a linear type actuator, or a radial type. It can also be actuated hydraulically or pneumatically. In this case the reservoir and pump can be located at the location of the actuator in the rod apparatus, with power for the pump being supplied electrically. In other embodiments, piping can transfer the pressurized fluid to the actuator from another location, such as the fuselage. The pressurized fluid can power pistons located inside the rod, which in turn power the relative motion between the parent and child elements of the telescoping apparatus. In other embodiments, the pressurized fluid can fill the space within the rod apparatus, such that the extension and retraction of the telescoping apparatus is analogous to an inflation and deflation.

Similar options are available for actuating the telescopic mechanism within the wing apparatus.

Several methods for energy storage are available. In the case of at least one electric actuator, a battery can be used to store energy. The vehicle could also store the energy in the form of fuel, which could be used to power a turboshaft jet engine or an internal combustion engine, which in turn powers a generator, which powers the actuators. Other methods for energy storage and delivery include compressed gas, flywheels, or fuel cells.

Some embodiments apply a method for recovering energy due to relative motion between FIA 203, FIA 202, and the fuselage. This is particularly relevant during the transition phases during nominal level cruise, where the kinetic energy of one FIA can be recovered and subsequently imparted to the second FIA. In some embodiments, during nominal level cruise, energy could be recovered when the net internal force between two apparatuses has a component in the direction which opposes the relative velocity between the apparatuses.

There are several methods for energy recovery. In some embodiments the actuators themselves can be used for energy recovery. For example, if at least one of the vehicle apparatuses is actuated by an electric motor, this motor could be operated as a generator to recover energy. In other embodiments an electric motor could be added to an existing actuator of a different type to fulfill the energy recovery function and provide redundancy. The recovered energy could be directly routed to another actuator for direct consumption. The energy could also be stored onboard using a battery, capacitor or other electrical energy storage device. The energy could also be routed to an electric energy conversion device, which converts the energy into another form for storage. For example, it could power a secondary electric motor which compresses gas and thus stores the energy as potential energy. The secondary electric motor could also power a flywheel which stores the energy as rotational kinetic energy. In some cases the electric motor could be a linear motor. It could also be a rotational motor. There are a plethora of electric actuator types which could be used for this purpose.

In other embodiments the energy could be recovered using a mechanical device. Such a device would be suitable when large forces are involved, such as during the transition phases. An electric motor might have a torque, force, current, speed, or power limit and might only be able to recover a small fraction of the available energy. One such mechanical device could be a spring. The spring could be translational, or rotational. It could convert the energy into potential energy by deforming elastically under the applied load. This energy could then be released subsequently, or stored for later use by arresting the motion of the spring for a specified amount of time by using a latch, for instance.

For example, a rotational coil spring could be located at the connection between a rod apparatus base and the horizontal support 214 and lie in a plane parallel to the fuselage xz-plane and able to produce moments about an axis parallel to the fuselage frame y-axis. For example, the spring could be rigidly attached to the horizontal support 214. The angle of the rod apparatus base relative to the fuselage can be measured about an axis parallel to the fuselage frame y-axis and relative to the fuselage frame x-axis. There could be a "dead band", or a range of angles between which the rod can move without engaging the spring. There could be two "stops" located at either end of the dead band to facilitate the load transfer between rod apparatus and the spring. There might be a lower bound angle, below which the rod apparatus compresses the spring, and an upper bound angle, beyond which the rod apparatus extends the spring, or vice versa. These angles are the "capture angles". The range of angles between the upper and lower bound capture angles is the dead band. For example, this range can correspond to forcing phase 1 and cruising phase 1. The capture angles might be adjustable to accommodate different trajectory types and associated angle ranges and bounds. In some embodiments, the stops are attached to the rod apparatus base and can be detached, moved, and reattached to any other circumferential position by an actuator. The spring could comprise a radial protrusion for engaging the stops attached to the rod apparatus base. In another embodiment, but only of the stops attached to the rod apparatus base is able to change its position along the circumference. In this case the spring base can also be detached, rotated relative to the horizontal support about an axis parallel to the fuselage frame y-axis, and reattached. Thus the upper and lower bound capture angles can be modified independently as desired. The stops or the position of the spring could also be adjusted in order to store energy in preparation for a maneuver. For example, the spring could be charged in preparation for a large power output required during take-off.

When the rod apparatus base moves beyond a stop and its associated capture angle the spring engages and provides a moment which opposes the rotational motion of the rod apparatus base relative to the horizontal support 214. In some embodiments this moment is a linear function of angular displacement beyond the capture angle. In other embodiments, the moment is a nonlinear function of said angular displacement. This could be achieved by a nonlinear spring, and could better match the desired moment profile as a function of time. As the rod angular velocity relative to the fuselage decelerates, the relative rotational kinetic energy is recovered in the form of potential energy until the relative motion ceases. The potential energy stored in the spring can be subsequently released as the rod apparatus base angle accelerates in the direction opposite to its original direction. Note that a separate actuator could also provide a moment about the rod apparatus base during this procedure. This allows the moment to be controlled in a more detailed manner to achieve a desired trajectory. The separate actuator is preferably also endowed with an energy recovery capability. Note that several different energy recovery methods can be used in concord. The aforementioned function can also be performed by a different actuation or energy recovery method.

Note that a similar mechanism comprising a dead band and a spring can be employed for the telescopic mechanism contained in the rod apparatus. In this case the spring can also be a coil spring if a cable is used to transfer the rotational motion into a translational motion. In other embodiments, a linear spring can be used.

A related spring mechanism can be used to assists the extension and retraction of the telescopic wing apparatus. Instead of a dead band where the spring is not engaged during a range of displacements, there can be a "locked band", or a period of time during which the spring displacement is under the full control of a separate actuator or mechanism. Consider an actuator apparatus which controls the position of one child element relative to a parent element. Note that in the subsequent discussion, unless specified, the relative motion between the child element and the parent element, as well as any other element of the actuation apparatus relative to the parent element, can be assumed to be 1 dimensional, and along a straight line for simplicity. The actuator apparatus comprises at least one locking mechanism, which, when engaged, is able to substantially constrain the position of the child element relative to the parent element for nominal load cases on the wing. The relative position of locking mechanism relative to the parent element can be adjusted and controlled. The actuator apparatus further comprises an energy recovery, storage and delivery method, or ERSDM, which is also able to do work on and recover energy from the child element. The ERSDM can comprise an external energy input and recovery method which is able to change the amount of energy in the ERSDM independently of the relative position of, or energy flow to or from the child element The aforementioned apparatus can be used in the following way. The ERSDM can receive energy from its external energy source while the child element position relative to the parent element is fixed by the locking apparatus. Once the ERSDM has reached a desired level of stored energy, and at the desired time, the locking apparatus can release the child apparatus. The ERSDM can subsequently do work on the child apparatus. The work can be done with the energy stored within the ERSDM in this example. The child apparatus can accelerate relative to the parent apparatus and increase its kinetic energy. After a predefined time the ERSDM can switch from energy delivery to the child element to energy recovery from the child element. This switching time can be controlled by means of the initial amount of energy contained within the ERSDM in this example. The ERSDM can subsequently recover a certain amount of energy, or a certain amount of time can pass, until the locking mechanism engages again. During the relative motion, some of the energy contained within the ERSDM has done work on the surroundings. This energy can be replenished by the external energy source after the locking mechanism has engaged and the cycle repeats itself. During periodic motion, the aforementioned sequence can be repeated periodically. The benefit is the recovery of energy that is expended periodically to minimize the total energy consumption and reduce the peak power requirement of actuators.

Note that in other examples the external energy source can replenish some of the energy or all of the energy in the ERSDM during the relative motion of the parent and child elements. The latter case could avoid requiring adjustable locking mechanisms during nominal operations, but could increase the peak power requirement on the external energy source.

In some embodiments, the ERSDM can be a spring. The spring tip could be attached to the child element via a linkage. In other embodiments a cable and pulley system is used, with both ends of the cable attached to both ends of the child apparatus base and tip respectively. The cable and pulley system is configured such that an extension and retraction of the child element relative to the parent element result in an extension and compression of the spring respectively. The spring base could be attached to the parent element via an adjustable base, which can be fixed to the parent element, as well as moved relative to the parent element. A locking mechanism could be attached to the aforementioned linkage. When engaged, it could fix the position of the linkage, the spring tip as well as the child element relative to the parent element. When disengaged, it can allow the linkage, the spring tip as well as the child element to move relative to the parent element. The locking mechanism could operate like a clutch. It could comprise a braking mechanism with braking pads which can be applied to the linkage, locking it in place using contact stresses. The locking mechanism could also take the form of at least one latch, which can engage at least one receptacle on the linkage.

The operation of the aforementioned apparatus can be described as follows. Consider the child element being in a fully extended position relative to the parent element. The child element is being prevented from retracting by means of a latch, and is being prevented from extending further by the force of the extended spring pressing the linkage against the latch. During this time the actuator can "charge" the spring using an external actuator to increase the distance between the spring base relative and the latch. The amount of energy of the spring can thus be adjusted to the desired level prior to the retraction. At the desired time, e.g. at or after the end of forcing phase 1 for wing apparatus 208, the latch can release the child element. The force of the spring acting on the child element results in the transfer of potential energy from the spring to kinetic energy of the child element. The ensuing trajectory of the child elements can be likened to that of a lightly damped harmonic oscillator. After approximately one quarter period the spring switches from being extended to being in a retracted state, with the force on the child element switching direction. The linear momentum of the child element continues to compress the spring as the kinetic energy of the child element decreases again. Some of the kinetic energy is recovered by the spring, with the remaining energy being lost to friction, for example. Once the velocity of the child has decreased to approximately zero, a second latch can be engaged. The child element is being prevented from extending by means of the second latch, and is being prevented from retracting further by the force of the compressed spring pressing the linkage against the latch. In some embodiments, the initial energy of the spring was set such that the child element is now in approximately a fully retracted position. The spring can now be compressed further by reducing the distance between the spring base relative and the second latch. This accounts for energy lost during the preceding retraction. At the next desired time, e.g. at or after the end of cruising phase 1 for wing apparatus 208, the second latch can be released, the child element can extend once more until captured by the first latch. Such a "stopped harmonic oscillator" enables the periodic retraction and extension of the wing apparatus with reduced energy expenditure and actuator peak power.

A similar mechanism can also be employed in the control of the wing apparatus angle relative to the rod apparatus tip.

In the above example, a nonlinear spring could also be used in order to achieve a desired force profile. One could also use other energy storage and release mechanisms which can be modelled as nonlinear springs, such as magnets or devices using electric fields for storing energy.

Energy recovery can also be used during other locomotion modes. In some locomotion modes, there might even be a surplus of energy available, which can be recovered by the vehicle. During descending flight, for example, a portion of potential energy could be recovered. During decelerating flight the vehicle can recover some of its kinetic energy in a similar manner. The motion of the fluid relative to the FIAs of the vehicle can result in relative motion between the FIA and other parts of the vehicle. An actuator can provide some resistance to this relative motion, which in turn can allow it to extract energy. One such actuator could be an electric motor being driven like a generator. Other actuator types such as springs can be used as well.

One can now describe several other embodiments or applications in more detail.

Note that the vehicle could also be capable of travelling through a different medium, like water. In that case, the vehicle could reduce the span of its wings in order to account for the higher Reynolds number in water. A different trajectory can be found to account for a different internal force required by the fuselage during nominal, level cruise in water, which might require less lift due to buoyancy and more thrust due to higher viscous drag.

For example, a different vehicle embodiment might comprise just 2 rod apparatuses of the same type as, say, rod apparatus 204, with one rod apparatus base mounted rotatably to the front of the fuselage, and the other at the rear. The rod apparatuses need no longer be offset in the fuselage y-direction to avoid interference. Thus, their centerlines can both lie in the fuselage xz-plane, as long as they are offset by a large enough distance in the fuselage xz-plane that their trajectories in the fuselage frame don't intersect. Some or all of the of these rod apparatuses can be rotatably connected to two wing apparatuses. In some embodiments, these two wing apparatuses are mounted in such a way to the rod apparatus tip that they can rotate independently to each other about an axis parallel to the fuselage y-axis. The wing apparatuses can also be configured to change their shape, e.g. by a telescopic mechanism. The benefits of such a connecting apparatus could comprise a reduction in wetted area and weight by not requiring a horizontal support, and employing only 2 rod apparatuses instead of 4. The downside could be the reduction in allowed angles and extensions of the rod apparatus base relative to the fuselage frame. The rod apparatus will no longer be able to rotate through 360 degrees in this configuration, because possible interference of the rod apparatus and associated wing apparatuses with the fuselage, the other rod apparatus, and other two wing apparatuses needs to be avoided. Whether the reduced configuration space has any effect on the performance depends on whether the desired ideal trajectory in that configuration space is affected. Another downside might arise from larger instantaneous external moments due to an offset between the wing apparatuses along the fuselage x-axis.

In another embodiment, the vehicle has 2 instead of 4 rod apparatuses. One rod apparatus could connect to FIA 202 and the other to FIA 203. Some or all of the FIA can contain one wing apparatus, or a left and a right wing apparatus configured to rotate independently relative to the rod apparatus tip. The rod apparatus bases could be located on either side of the fuselage, which would allow mirroring of the trajectories. Any external yaw moment due to drag asymmetry could be cancelled.

In another embodiment, the vehicle also has 2 instead of 4 rod apparatuses. In this case, the rod apparatus base centers could be coincident, and lie in the xz-plane of the fuselage frame. A joint assembly could allow relative rotation of the rod apparatus bases, with the only source of interference provided by the necks of the rod apparatus bases. The rod apparatus bases are circular, while the fuselage might be airfoil shaped. This results in a gap in the fuselage in the region where the necks of the rod apparatus need to be able to move freely. A fairing similar to 236 could be added to the fuselage in order to close unoccupied regions of the gap and avoid an increase in drag. The respective PRATRT1 and PRATRT2 could be located on different sides of the inner boundary, or offset in a way in which there is no interference between the rod apparatus or their associated wing apparatuses. The reduced number of rod apparatuses could reduce the weight and wetted area of the vehicle. The placement of the PRATRTs could avoid the complexity of reconfiguring the wing apparatuses to avoid interference with the connecting apparatuses.

In some embodiments the direction of the net force on FIA 202 is substantially constant for a portion of time during transition phase 1. In some embodiments, the direction of the net force on FIA 202 is constant for the entire transition phase 1. Similar arguments could apply for FIA 203. This could be the useful for embodiments where the direction of the velocity vector of both FIA 202 and FIA 203 relative to the AFIAF remains substantially constant during forcing phase 1. The directions of said velocity vectors can also be parallel. In this case the positions of FIA 202 and FIA 203 relative to the AFIAF form a straight line in the AFIAF during forcing phase 1. In this case, it might be desirable for the positions of FIA 202 and FIA 203 relative to the AFIAF to also lie on an extension of that line in the AFIAF during transition phases 1 and 2. Thus the positions of FIA 202 and FIA 203 relative to the AFIAF will lie on a straight line segment for the entire period. One benefit could be a simpler, and more structurally efficient connecting apparatus which transfers forces between the two FIAs as well as a fuselage. It could also simplify the actuation method for the vehicle, since the positions of the FIAs only need to be controlled along a straight line. This is particularly true when the line segments denoting the relative position of each FIA relative to the AFIAF over one period in the AFIAF are offset relative to each other in the direction perpendicular to each line segment by a negligible or small amount. If there is a negligible "perpendicular offset", there might have to be an offset relative to each other parallel to each line segment in order to avoid interference between FIA 203 and FIA 202. A small perpendicular offset might also be enough to avoid interference between FIA 203 and FIA 202. Such a small or negligible perpendicular offset in combination with the linear relative motion would reduce any moment impulse caused by large net forces acting on FIA 202 and FIA 203 during the transition phases 1 and 2.

In the above description of one example trajectory embodiment of an FIA, the trajectory could be described in terms of a forcing phase 1, a transition phase 1, a cruising phase 1, and transition phase 2. In other trajectory embodiments, one period may be described in terms of a different composition of phases. For example, if the specified FIA is not able to modify its wetted area, or if it is not desirable for the FIA to do so, one period may be described in terms of two forcing phases separated in time by transition phases. In this case, for some locomotion modes, the NFF vectors during each of the two distinct forcing phases need not be pointing in substantially the same direction. For example, during the first forcing phase of an FIA in nominal, level cruise, the NFF may be substantially vertical, while during the second forcing phase the NFF may be substantially horizontal. In this example, the corresponding free stream flow velocity vector direction and magnitude is a function of the type of FIA and any constraints on the motion of the FIA. If the FIA is a conventional wing, the free stream flow velocity vector is substantially perpendicular to the NFF vector. In other locomotion modes, the NFF vectors during each of the two distinct forcing phases may be pointing in substantially the same direction. For example, during the first and second forcing phase of an FIA in hover, the NFF may be substantially vertical. If the FIA is a conventional wing, the free stream flow velocity vectors for each forcing phase can be parallel but pointing in opposite directions in order to meet the average free stream flow velocity constraint. During each forcing phase the free stream flow velocity can be substantially constant. Note that constraints on the peak net acceleration experienced by the FIA affect the duration of the transition phases relative to the forcing phases. In some vehicle embodiments or locomotion modes, this constraint results in forcing phases of negligible duration, and the trajectory embodiment can be described in terms of a succession of transition phases. Note that during the transition phases the free stream flow velocity is not necessarily substantially constant.

In the following paragraphs, another specific vehicle embodiment will be described (e.g., depicted in FIGS. 1-13).

The vehicle comprises several apparatuses, which can be distinguished by the function they perform during nominal, level cruise. As will be explained later, one can identify a fuselage apparatus, a momentum storage apparatus, and a connecting apparatus. Although all of these apparatuses are also FIAs by definition, they are referred to in the aforementioned way for clarity. The remaining apparatuses will be referred to as FIAs, which is illustrated here as one FIA 102.

The fuselage apparatus 101, or fuselage 101, in FIG. 1 is similar in form, structural composition, contents, and function already described in context of fuselage 201 in the vehicle embodiment shown in FIG. 14, and vice versa. Fuselage 101 differs from fuselage 201 in the way the connecting apparatus is mounted.

One can define a "fuselage frame" as follows. In some embodiments, the fuselage frame x-axis is parallel to the line connecting the front of the fuselage 140 and the rear of the fuselage 141, and is directed towards the front. The fuselage frame z-axis is directed downwards and lies in a plane containing the x-axis of the fuselage frame as well as the acceleration due to gravity during nominal, level cruise. The fuselage frame is fixed relative to the fuselage in the aforementioned orientation. The origin of the fuselage frame is at the instantaneous center of mass of the fuselage apparatus.

FIA 102 includes 2 independent wing apparatuses: one left wing apparatus 107 and one right wing apparatus 106 as shown in FIG. 1. The properties as well as the different possible embodiments of FIA 102 are similar to those of FIA 202 and FIA 203, and vice versa.

The AFIAF of FIA 102 is oriented and located as previously defined.

In some embodiments, FIA 102 is also able to morph. The optimal operation of the vehicle may require the instantaneous NFF related power consumption of a particular FIA to be minimized. For a given instantaneous NFF and a given instantaneous free stream velocity, a given FIA type composition may have an optimum shape relative to the fluid. This optimum shape can vary as the instantaneous NFF or free stream velocity change. By morphing, an FIA is able to operate closer to the optimum shape than it otherwise could, such that a lower instantaneous NFF related power is consumed.

In some embodiments, the relative shape of the FIA 102 is modified in one of two general methods.

The first method relates to the change in relative orientation between the wing apparatus 106 or 107 and the free stream flow. The relative orientation can refer, without limitation, to the angle of attack or the angle of sideslip of each wing apparatus.

For example, a change in local free stream flow velocity direction can lead to a change in the angle of attack. For instance, the downwash produced by the wing apparatus can lead to an induced angle of attack at the wing apparatus.

In another example, a change in the velocity direction of a wing apparatus in the inertial frame can lead to a change in the angle of attack by changing the direction of the free stream flow velocity relative to the wing apparatus. Assuming a stationary fluid relative to the inertial frame, this can be effected through translational or rotational motion of the wing apparatus relative to the center of gravity of the vehicle, and through translational or rotational motion of the wing apparatus relative to the center of gravity of the vehicle. In some embodiments, rotational motion of the wing apparatus relative to the center of gravity of the vehicle does not have a large effect on the trajectory of the wing apparatus in the inertial frame and hence on the direction of the free stream flow velocity relative to the wing apparatus, however. In other embodiments the effect is larger.

In a further example, the orientation of the wing apparatus 106 or 107 relative to the inertial frame can lead to a change in angle of attack. For that purpose, amongst others, wing apparatuses 106 and 107 can be rotated independently relative to rod apparatus tip 110 of rod apparatus 104. Rod apparatus 104 can further be rotated relative to fuselage 101. The relative orientation can also be changed by a combination of these aforementioned examples, and similar scenarios exist for other parameters describing the relative orientation, such as side slip. Other scenarios for changing the relative orientation also exist, such as those involving wind disturbances which change the direction of the free stream flow. In other embodiments, other methods of modifying the relative orientation can also be applied.

The second method relates to the change in shape of the wing apparatus 106 or 107 relative to itself.

The relative shape can be modified in several ways. For example, the shape can be modified by changing the relative position and orientation of pseudo rigid bodies contained within the wing apparatus relative to each other. In some embodiments, wing apparatuses 106 and 107 are able to morph in a manner previously discussed in the context of wing apparatuses 208 or 209, for example.

In some embodiments, there is one wing base element per wing apparatus. For example, wing apparatus 106 has base element 116 as indicated in FIG. 1, wing apparatus 107 has base element 117 as indicated in FIG. 4. In some embodiments, wing apparatuses 106 and 107 have 42 child elements in total. The theoretical location of the tip of a wing element is indicated schematically by a dotted line 118 or 119 in order to more clearly illustrate the operation of the telescoping morphing method selected for this vehicle embodiment. The wing apparatus 106 has a wing apparatus tip 120, and wing apparatus 107 has wing apparatus tip 121.

Figure 6:
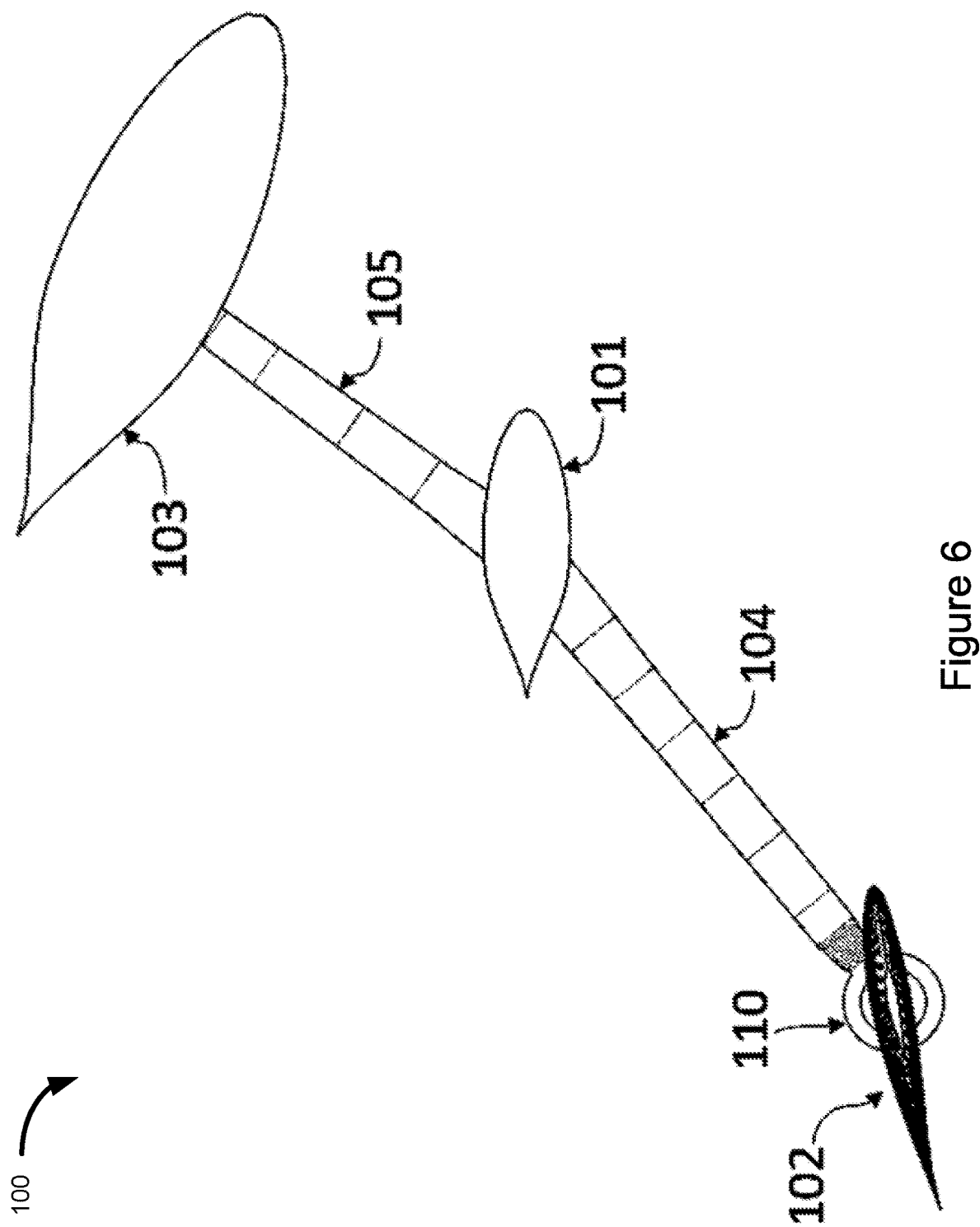
FIG. 6 is a side view of the vehicle shown in FIG. 4 with its telescopic wings in a retracted configuration, in accordance with some embodiments.

FIGS. 1-3 show FIA 102 in a fully extended state, while FIA 102 is in a fully retracted state in FIGS. 4-6.

The wing elements can be retracted in several different ways, as discussed previously in the context of FIA 202 and 203.

In other embodiments, the FIA 102 is substantially a fixed wing with limited ability to morph provided by ailerons, flaps or similar contraptions. The wing apparatus, whether substantially fixed or not, can have nonplanar features such as winglets.

The momentum storage apparatus 103, or "MSA" is configured to receive, store and deliver momentum impulses, as will be explained later. In some embodiments, the momentum is absorbed and released by accelerating and decelerating the mass associated with the MSA.

The mass associated with the MSA has two components. The first relates to the "interior mass", i.e. the mass contained within the structural boundaries of the MSA. This mass can comprise the mass of structural materials, such as Aluminum or carbon composites. The interior mass can also comprise non-structural mass such as batteries, or fuel. Note that the interior mass can vary over time, such as when fuel is expended and transferred to or from the remainder of the vehicle or to the environment. Another example of and interior mass is the mass of a portion of the payload located inside the MSA which can tolerate the periodic accelerations of the MSA during nominal operations. In the preferred embodiment, a large portion of the interior mass is mass which a vehicle would contain regardless of the configuration of the vehicle. This minimizes the additional mass increase of the vehicle due to the existence of the MSA, which reduces costs, and, in some embodiments, reduce the NFF related power consumption. If the entire vehicle does not contain any materials which cannot tolerate such periodic accelerations, a separate fuselage in the form and function illustrated in FIGS. 1-13 is not required. Thus a new embodiment can be formed by removing rod apparatus 105 and the original MSA 103 from the depicted embodiment and operating the fuselage of the depicted embodiment in the same manner as the MSA is operated in the depicted trajectories. In other embodiments, the MSA is fully encased by a fairing the motion of which is uncoupled from the depicted motion of the MSA to a certain degree, which can be optimized. In a simplified example, the fairing of the MSA does not accelerate in the inertial frame during nominal, level cruise. The fuselage or payload may also be housed in that fairing in some embodiments, or it may be housed in a separate fairing as shown in FIGS. 1-22. The benefit of such an approach would be the reduction in the variation of the free stream flow velocity experienced by an element of the fairing during one period. This can reduce the average NFF related power consumption of the fairing. Furthermore, the friction associated with the motion of the MSA in the inertial frame can be reduced. For example, the fairing can form a vacuum around the MSA such that any motion of the MSA relative to the fairing does not occur a power consumption which would offset the benefits of this approach. Even when there is an increase in the power consumption due to, for example, a larger than minimum volume and wetted area of the fairing there can be other benefits to the uncoupled fairing of the MSA. One benefit may be a simplified construction of the vehicle. For example, the fairing of the MSA can be rigidly connected to the FIA. This approach could simplify the connecting apparatus which no longer needs to be streamlined. The fairing could also serve to protect the connecting apparatus and MSA from the elements and improve the robustness of the vehicle.

The second component of the mass associated with the MSA is the "exterior mass", which can comprise any added mass or virtual mass of the MSA due to interaction with the fluid, for example. The exterior mass can also vary over time, and can be a function of the shape of the MSA as well as the local free stream flow velocity of the MSA, amongst other parameters, such as those related to the properties of the fluid.

In some embodiments (e.g., as shown in FIGS. 1-13) the interior mass stays constant over time, while the exterior mass has a negligible effect.

In some embodiments, the shape of the MSA is subject to a similar objective function as the fuselage. Like the fuselage, the MSA is designed to contain a portion of interior mass in a way in which the total drag of the vehicle is reduced.

In other embodiments, the constant shape of the MSA may be determined not just by an objective to minimize drag, but also by a constraint to provide a certain amount of exterior mass at a certain instant in time.

In some embodiments, the shape of the MSA also remains constant over time.

In other embodiments, the shape of the MSA is able to change over time. For example, in the aforementioned case in which the amount of interior mass of the MSA varies over time, such as when fuel is consumed or refilled, or payload removed or added, it is desirable for the volume of the MSA to change accordingly in order to minimize the wetted area and associated drag.

In another example of another embodiment, a change in shape of the MSA can be used to control the exterior mass of the MSA at any instant in time and any given local free stream velocity. This can be advantageous for reducing the NFF related power consumption of the MSA. By changing the mass associated with the MSA, the momentum of the MSA can be changed even while it is travelling at a constant velocity in the inertial frame, i.e. a constant free stream velocity. The benefit of this approach, compared to the approach where the momentum is changed by accelerating and decelerating a constant mass in the inertial frame, is that the variation of the free stream velocity of the MSA over one period can be reduced. By operating closer to the average free stream velocity, the power consumed by the MSA due to the drag acting on the MSA is also reduced. In some embodiments the MSA is configured in a way in which the power consumed by the vehicle in the process of changing the exterior mass of the MSA is minimized. In other words, the MSA is configured in a way in which a large portion of the work done during the increase of the added mass of the MSA can be recovered when the added mass of the MSA is subsequently reduced. By using exterior masses instead of any additional MSA related interior masses, the total weight of the vehicle can also be reduced, which can further reduce the NFF related power consumption of the vehicle.

Whether an MSA relies more on the exterior mass compared to the interior mass, as well as on a variable shape compared to a constant shape is determined by the objective function of and constraints imposed on the entire vehicle.

Note that the MSA is also an FIA, and can therefore be configured to experience forces and perform functions similar to those of FIA 102. In the limit in which MSA approaches the functionality of FIA 102, the embodiment shown in FIGS. 1-13 approaches the embodiment shown in FIGS. 14-22. The embodiments shown in FIGS. 1-13 and FIGS. 14-22 are two points of a continuous spectrum of possible embodiments. Note that the spectrum is also not bounded or limited by these points.

The velocity of the MSA in the inertial frame is controlled by the forces applied to it by the remainder of the vehicle via the connecting apparatus, by any fluid forces acting on it, by any other external forces acting on it, and by the aforementioned instantaneous mass associated with it.

In other embodiments, the vehicle comprises two or more MSAs.

In some embodiments, the vehicle comprises a connecting apparatus configured to transfer loads and facilitate relative motion between wing apparatus 106, wing apparatus 107, MSA 103, and fuselage 101.

The connecting apparatus comprises rod apparatuses 104 and 105. Rod apparatus 104 is rotatably connected to the fuselage 101 and rotatably connected to the base element 116 of wing apparatus 106 as well as base element 117 of wing apparatus 107. Rod apparatus 105 is rotatably connected to the fuselage 101 and rotatably connected to MSA 103. Rod apparatuses 104 and 105 are in some embodiments configured in a similar manner as the rod apparatuses of the embodiments shown in FIGS. 14-22. The length of some or all of the rod apparatuses can be adjusted in a similar manner as the length of the wing apparatuses can be adjusted. For clarity, the theoretical location of the tip of a rod element is indicated schematically by a dotted line 108 or 109. Rod apparatus 104 has 19 child elements while rod apparatus 105 has 6 child elements. Other embodiments can have any number of child elements.

Rod apparatus 104 has a rod apparatus base 122 as well as a rod apparatus tip 110, which is connected to the base of wing apparatus 106 and wing apparatus 107 by a rotational joint 112.

Rod apparatus 105 has a rod apparatus base 123 as well as a rod apparatus tip which is embedded inside fairing 114 of MSA 103. The fairing deforms passively or actively to allow the neck of the rod apparatus to pass through the MSA during rotation.

There is a similar fairing 115 which allows rod apparatuses 104 and 105 to rotate about the y-axis of the fuselage frame. The purpose of this fairing is to reduce any drag caused by the gap in the fuselage which allows the rod apparatuses to rotate by 360 degrees relative to the fuselage of variable shape. The fairing 113 at the wing apparatuses fulfills a similar purpose.

One can define a "rod apparatus base frame", or "RABF", as follows. The origin is located at the center of the rod apparatus base. This point lies on the rotational axis describing the relative motion between the rod apparatus base and fuselage 101. The point is located at the half-way point of the passage of this axis through the rod apparatus base. Similarly, the center of the rod apparatus tip can be defined in terms of the rotational axis describing the relative motion between the wing apparatus base and the rod apparatus tip. In some embodiments, during nominal, level cruise the RABF xz-plane is parallel to the fuselage frame xz-plane. The RABF x-axis is parallel to the projection of the vector that describes the relative position of the center of the rod apparatus tip and the center of the rod apparatus base onto the rod apparatus xz-plane.

In some embodiments, there is 1 rotational DOF between a rod apparatus base 122 of rod apparatus 104 and fuselage 101. In some embodiments, the 1 rotational DOF comprises a rotation about an axis fixed relative to the fuselage frame during nominal operations. In some embodiments, said axis of rotation is furthermore parallel to the fuselage frame y-axis. In some embodiments, the allowed rotational angles range through 360 degrees. In other embodiments, the range of angles describing the relative rotation between the fuselage frame and the RABF can be limited to a range less than 360 degrees.

The relative motion between rod apparatus base 123 of rod apparatus 105 and fuselage 101 can be described in the same manner.

In some embodiments, the origins of the RABF of rod apparatus 104 and 105 are coincident, and thus the axes of rotation of rod apparatus base 122 and 123 are also coincident. Rod apparatus base 122 and rod apparatus base 123 are configured to be able to rotate relative to each other. The range of relative angles is constrained by the requirement for the rod apparatuses to not interfere with each other. For example, the leading edge of rod apparatus base 123 should not collide with the trailing edge of rod apparatus base 122. The range of relative angles is large enough to facilitate nominal operation of the rod apparatuses. In some embodiments, this may require a different form of connecting apparatus, or a different method of operation.

In other embodiments, the origins of the RABF of rod apparatus 104 and 105 are not coincident, as long as other criteria, such as avoiding interference between the wing apparatuses and between the two rod apparatuses, are met. For example, two rod apparatuses offset in the positive and negative direction along the y-axis of the fuselage frame may be used in place of a portion or all of depicted rod apparatus 104. This approach could serve to increase the range of allowed relative angles between rod apparatus 104 and rod apparatus 105, for example.

Rotational joint 112 also has 1 DOF, with a rotational axis also fixed in a direction parallel to the fuselage frame y-axis. In some embodiments, base element 116 of wing apparatus 106 can rotate about this axis relative to the rod apparatus tip 110 by 360 degrees. The relative motion between base element 117 of wing apparatus 107 and rod apparatus tip 110 can be described in the same way. It follows that rotational joint 112 allows independent relative rotation between wing apparatuses 106 and 107.

In other embodiments, instead of including two wing apparatuses which can rotate relative to each other, FIA 102 can include just one continuous wing apparatus of the same type as wing apparatus 106, i.e. with a same or similar morphing capability. In this case, roll control can be provided by other methods, such as separate control surfaces such as ailerons or wing warping.

Between MSA 103 and the tip of rod apparatus 105 there is also 1 rotational DOF with a rotational axis fixed in a direction parallel to the fuselage frame y-axis and with a relative rotation range of 360 degrees.

In some embodiments the rod apparatuses can be reconfigured. The rod apparatus tip is able to translate relative to the rod apparatus base along the RABF x-axis. There are several possible embodiments for this axial extension mechanism. For example, a telescopic mechanism similar to the aforementioned wing apparatus morphing mechanism may be employed.

The benefit of using a morphing rod apparatus is a reduction of the wetted area of the rod apparatus compared to an embodiment where the rod apparatus wetted area remains constant over time. In other embodiments, the rod apparatus may not be able to substantially modify its wetted area. The benefit of such a configuration can be a reduced mechanical complexity.

In other embodiments of the connecting apparatus, electromagnetic levitation is used.

In some embodiments, a wing apparatus base element has 2 translational DOFs and 1 rotational DOF relative to the fuselage frame.

The 1 rotational DOF of the wing apparatus base element allows the angle of attack of the wing apparatus to be determined independently of the attitude of the remainder of the vehicle.

The 2 translational DOF allow the wing apparatus base element and rod apparatus tip to move in a 2 dimensional space relative to the fuselage frame. Note that in this context the rod apparatus tip center describes the position of the rod apparatus tip. The same is true for the rod apparatus base. The "relative range space" of the rod apparatus tip, i.e. set of possible relative positions of the rod apparatus tip relative to the rod apparatus base in the fuselage frame is constrained by the maximum and minimum length of each rod apparatus as well as the maximum and minimum allowed angles of the rod apparatus base relative to the fuselage frame. In this case, since the allowed angle range spans 360 degrees, the relative range space lies in the fuselage frame xz-plane, and includes the area between 2 concentric circles with radiuses equal to the maximum and minimum length of each rod apparatus. Note that this assumes the fuselage cannot interfere with the wing apparatuses when the rod is fully retracted. When this is not the case, the "inner boundary" is no longer a circle, but a path which is a function of the fuselage shape, the wing apparatus shape and configuration as well as the rod apparatus configuration. Note that structural considerations might also render the true "outer boundary" shape non-circular. Note that in other embodiments the relative range space of the rod apparatus need not be 2 dimensional, but can be 1 dimensional, when the allowed relative positions describe a line. Note that in other embodiments, the relative range space of the rod apparatus can be 3 dimensional as well. In other embodiments only 1 translational DOF may exist between the rod apparatus tip and the fuselage. In other words, the position of the rod apparatus tip relative to the rod apparatus base may be constrained to move along a prescribed path. The relative range space in this case can be two dimensional or one dimensional depending on the shape of the curve. It can also be three dimensional. In the two dimensional case, the shape of the prescribed relative path between an rod apparatus tip and the AFIAF or fuselage can take a closed form similar to the form shown in FIGS. 8-11 or FIGS. 19-21. The path can also take other shapes, such as the shape of a figure eight, an infinity sign, a straight line, or curved line.

The location of the center of gravity of FIA 102 depends on the configuration of wing apparatuses 106 and 107. By changing the angle of rotation of the wing apparatus base 116 and 117 relative to the rod apparatus tip 110, the location of the center of the center of gravity of FIA 102 projected on the xz-plane of the fuselage frame can be adjusted for some embodiments. By changing the span or the extension fraction of wing apparatuses 106 and 107 the location of the center of gravity of FIA 102 projected onto the y-axis of the fuselage frame can be adjusted. The center of gravity of FIA 102 therefore has 3 translational DOF in the fuselage frame, which allow it to move in a 3 dimensional space relative to the fuselage frame. During nominal, level cruise, for the depicted embodiment, wing apparatuses 106 and 107 are operated symmetrically about the xz-plane of the fuselage frame.

Similarly, the streamlined casing of MSA 103 depicted in FIGS. 1-13 also has 1 rotational DOF and 2 translational DOF relative to the fuselage frame. Note that MSA 103 may contain additional degrees of freedom inside the streamlined casing. For example, there may be a flywheel which is configured to rotate relative to the casing.

The benefit of at least 2 translational DOF, is that several different trajectory shapes, which describe the motion of the FIA 102 and MSA 103 relative to their respective AFIAF, are possible. Both FIA 202 and MSA 103 are able to move periodically within the xz-plane of the AFIAF frames. For example, for hovering flight, the optimal trajectory of FIA 102 relative to the AFIAF might lie in the xz-plane of the AFIAF frame. The same might be true for nominal, level cruise. The shape of the optimal trajectories, however, might be different. The ability to modify the shape of the trajectory, therefore, can lead to performance improvements.

In some embodiments, during thrusting locomotion, an optimal trajectory of an FIA relative to the AFIAF may be described as follows. As used herein "thrusting locomotion" refers to the scenario in which the average net fluid force is directed substantially parallel to the average direction motion of the FIA relative to the fluid flow during one period. The term "fluid flow" refers to both free stream flow, as well as any induced flow effects, where the induced flow effects may be produced by neighboring FIAs, or the specified FIA. Thus, hovering flight can also be considered to be thrusting locomotion, even though the free stream flow is zero. In some embodiments, thrusting locomotion may be described as the scenario in which the average net fluid force is directed substantially parallel to the average direction of motion of the FIA in inertial space. Thrusting locomotion refers to the scenario in which the FIA may be replaced by a conventional propeller. Thrusting locomotion also refers to the scenario in which the FIA is being used as a wind turbine. During thrusting locomotion, the x-direction of the AFIAF is directed in the opposite direction of the fluid flow. Consider a simplified scenario in which the required average thrust throughout one period is parallel to the x-axis of the AFIAF, and the free stream flow is constant. In some embodiments, during thrusting locomotion, a period may comprise 8 phases. These 8 phases are labelled "forcing phase 1", "transition phase 1", "cruising phase 1", "transition phase 2", "forcing phase 2", "transition phase 3", "cruising phase 2", and "transition phase 4". In some embodiments, during forcing phase 1, the motion of the specified FIA, such as FIA 102, relative to the AFIAF features a large component along the negative x-direction of the AFIAF. The motion of FIA 102 relative to the AFIAF may also feature a large component in the yz-plane of the AFIAF. For example, in some embodiments, the component in the yz-plane may be substantially along the positive z-direction of the AFIAF. The optimal extent of the motion of FIA 102 along the x-direction depends on the magnitude of the average fluid velocity, the magnitude of the required average thrust force, as well as structural constraints, amongst other factors. During forcing phase 1, as in all forcing phases discussed herein, FIA 102 is configured to produce a larger magnitude of thrust compared to cruising phase 1. In this example, the component of the required average thrust throughout one period along the x-direction may be positive when the specified FIA is used for propulsion, or negative when the FIA is part of a wind turbine or hydroelectric power plant. To that end, during forcing phase 1, FIA 102 may be in a configuration with a large effective flat plate drag area for zero-lift drag. In other words, the telescoping elements of FIA 102 may be in an extended position, resulting in a large net fluid force, albeit also a large wetted area and zero-lift drag. During cruising phase 1, the relative motion of FIA 102 relative to the AFIAF features a substantial component along the positive x-direction. As before, during cruising phase 1, following a reconfiguration throughout transition phase 1, FIA 102 is configured to be in a configuration with a small effective flat plate drag area for zero-lift drag compared to forcing phase 1. In some embodiments, the motion of FIA 102 throughout cruising phase 1 is parallel to the x-axis of the AFIAF. In some embodiments, the motion of FIA 102 throughout cruising phase 1 is substantially parallel to the x-axis of the AFIAF. Following transition phase 2, FIA 102 enters forcing phase 2. In some embodiments, forcing phase 2 can be considered to be a mirroring of forcing phase 1 in a plane parallel to the xy-plane of the AFIAF. In other words, the sign of the aforementioned component of the motion of FIA 102 along the z-direction of the AFIAF as well as the sign of the net fluid force component along the z-direction of the AFIAF is reversed in forcing phase 2 compared to forcing phase 1. Following transition phase 3, FIA 102 enters cruising phase 2, which is substantially similar to cruising phase 1, albeit offset in the negative z-direction from the path of cruising phase 1 in the AFIAF. Following transition phase 4, FIA 102 has returned to the initial condition of the period, at which point forcing phase 1 of the subsequent period commences during nominal operations. In some embodiments, the magnitude and direction of the velocity of the FIA 102 relative to the AFIAF may be substantially constant during a forcing phase or a cruising phase. In such embodiments, the paths followed by the center of mass of FIA 102 projected onto the xz-plane of the AFIAF during the forcing phases are "X"-shaped, with the origin of the AFIAF being located at the center, with the four transition phases being located at the four vertices of the "X", and with the x-axis of the AFIAF being directed horizontally to the right and the z-axis being directed downwards. The paths followed by the center of mass of FIA 102 projected onto the xz-plane of the AFIAF during the cruising phases are "="-shaped, with each line representing the projected path during a cruising phase, with the lines being parallel to the x-axis of the AFIAF, and with the lines connecting consecutive transition phases. The combined path followed by the center of mass of FIA 102 projected onto the xz-plane of the AFIAF therefore encloses an hourglass shape. In other embodiments the path of FIA 102 relative to the AFIAF can also be described as a figure eight. During hovering flight, the average fluid flow is directed along the negative Z-direction, resulting in a rotation of the aforementioned AFIAF, such that the aforementioned path may resemble the shape of an infinity sign instead of a FIG. 8 in inertial space.

During thrusting locomotion, an optimal trajectory of an FIA relative to an AFIAF may also take a different shape, such as the shape indicated in FIGS. 8-11. A forcing phase may be configured to provide a majority of the required thrust impulse, and a cruising phase may be configured to provide a majority of the required motion of the FIA relative to the fluid along the x-direction of the AFIAF. In other embodiments, structural and/or actuation limits may not allow sufficient time for a wing to be reconfigured throughout a transition phase. In such embodiments, as well as other embodiments, the FIA may not be reconfigured throughout one period of thrusting locomotion or hovering flight. Note that in some embodiments, an FIA is configured to provide thrust or lift at positive and negative angles of attack.

In the embodiment depicted in FIGS. 1-13 one can define an assembly of apparatuses, or "AA", as the entire vehicle excluding the "isolated fuselage". The isolated fuselage in this context is any part of the vehicle which is subject to a zero instantaneous translational or angular acceleration constraint at all times during nominal, level cruise. The isolated fuselage is a subset of the fuselage apparatuses 101 or 201 depicted in the drawings. The fuselage apparatus may contain apparatuses which are not subject to the zero net acceleration constraint. For example, a portion or all of the MSA may be part of and encased by a fuselage apparatus in another embodiment. The fuselage apparatus may further contain a flywheel apparatus or an apparatus with a similar function. As per the aforementioned definition, these additional apparatuses are not considered to be part of the isolated fuselage. In the depicted embodiments, the fuselage apparatuses 101 and 201 comprise a streamlined casing, the outline of which is visible in the drawings. The casing encloses the remainder of the fuselage apparatuses, amongst other apparatuses such as portions of the connecting apparatus, and provide a portion of the interface between the fuselage apparatus and the fluid. In some embodiments, the casings are also part of the isolated fuselage.

During nominal, level cruise and for a given average cruise velocity, the isolated fuselage is subject to an instantaneous internal force constraint, as well as an instantaneous free stream flow velocity vector constraint. The instantaneous free stream flow velocity vector constraint arises from the requirement that the isolated fuselage experiences zero acceleration during nominal, level cruise. For the given definition of the inertial frame axes, this results in a zero instantaneous free stream flow velocity vector component in the inertial frame Y-direction and Z-direction. Due to a given average cruise velocity, the instantaneous free stream flow velocity vector component in the negative inertial frame X-direction is constrained to be equal to the given average cruise velocity magnitude. In general, the instantaneous internal force constraint can be calculated as follows. The center of gravity of a specified apparatus may be required to follow a specified trajectory in the inertial frame. From this trajectory, it is possible to calculate the instantaneous acceleration acting on the center of gravity. And from the instantaneous acceleration as well as the given external forces acting on the center of gravity of the specified apparatus, one can calculate the instantaneous internal force constraint. In some embodiments, the specified apparatus is the isolated fuselage and the specified trajectory of the center of gravity of the isolated fuselage is given by the constant velocity motion along the X-axis of the inertial frame. Therefore, the instantaneous acceleration is constrained to be zero during nominal, level cruise. In other words, the net force acting on the isolated fuselage is constrained to be zero at all times during nominal, level cruise. The net force is the sum of the internal and external forces acting on the isolated fuselage, so the instantaneous net internal force is equal and opposite to the net external force acting on the isolated fuselage. In some embodiments, the net external force is given by the sum of the weight force and the fluid dynamic drag force acting on the isolated fuselage.

Since the AA encompasses the entire vehicle sans the isolated fuselage, the instantaneous net internal force constraint on the isolated fuselage translates to an equal and opposite instantaneous net internal force constraint on the AA.

Consider a scenario where the objective is to minimize the energy consumed by the vehicle per unit horizontal distance travelled. Since the average free stream velocity is given in this case, the optimal configuration for this objective is identical to the optimal configuration for the case in which the objective is the minimization of the average power consumed by the vehicle. For other objectives, a method similar to the following approach can be used.

In some embodiments, such instantaneous internal force and free stream velocity constraints on the isolated fuselage are unnecessarily transferred to all FIAs within the AA. For example, in the case of a conventional fixed wing propeller aircraft, the AA includes the fixed wing, the propeller and the empennage. The fixed wing is rigidly mounted to the isolated fuselage, and therefore the instantaneous free stream velocity constraint of the isolated fuselage is transferred to the fixed wing as well as the propeller. The instantaneous internal force constraint on the fuselage is distributed amongst the propeller and the fixed wing, both of which provide a constant instantaneous internal force to the isolated fuselage at all times during nominal, level cruise. The problem with the unnecessary transferal of the limiting, instantaneous constraints from the isolated fuselage to the FIAs of the AA, is that the individual FIAs may operate more effectively at different operating conditions for the given objective function of the vehicle. For example, the objective function of the vehicle may be lower if these FIAs of the AA were configured to operate at different internal forces and free stream velocities than those dictated by the isolated fuselage due to the particular configuration of the vehicle.

To illustrate this problem, consider the following simplified, ideal scenario. Note that this simplified, ideal scenario is just a theoretical consideration intended to explain and motivate the example embodiments and example methods of operation depicted in FIGS. 1-13 as well as FIGS. 14-22. Consider an AA configured in a way in which it comprises at least one FIA which is subject to an average internal force constraint as well as an average free stream velocity constraint. In other embodiments, the FIA may be internal force or free stream velocity may also be subject to instantaneous constraints.

A range of different types of FIA may be available to the designer of the AA. In this simplified, ideal scenario, the given FIA can be described as follows. The FIA is able to generate a NFF substantially via the second type of fluid interaction, where the rate of change of momentum of the fluid is generated by deflection of the fluid flow during interaction with the surface of the FIA. An example of such an FIA is a wing of a conventional fixed wing aircraft. The FIA is further able to modify its shape relative to the fluid. The shape can be modified in several ways. The shape can be modified by changing the orientation of the FIA relative to the free stream flow. In some embodiments, the shape can also be modified by changing the magnitude of the wetted area.

In the following paragraphs, one possible method of operation, or one trajectory embodiment, will be described for the embodiments described in the previous paragraphs and shown in FIGS. 1-6. The possible method of operation is depicted in FIGS. 7-11 and the type of locomotion mode chosen for this particular example is nominal, level cruise. Other locomotion modes such as hover may require alternative and/or additional method operations. Given the concepts described in this example, however, those skilled in the art will be able to synthesize these other methods of operation.

Note that these characteristics of the FIA are only provided in order to give a clear and concise example of an embodiment of the invention, and are not intended to limit the invention in any way. By following a similar approach of configuring and operating a vehicle as suggested by the insights in this disclosure, and as described in the guidelines and examples of this disclosure, the teachings of this disclosure can also be applied to the novel design, configuration, and method of operation of other types of FIA resulting in an improvement in the performance of the vehicle.

As mentioned previously, the isolated fuselage is subject to an instantaneous internal force constraint, as well as an instantaneous free stream velocity constraint. As a result, the AA, which comprises the entire vehicle excluding the isolated fuselage, is subject to an equal and opposite instantaneous internal force constraint. In order to prevent these potentially performance limiting instantaneous internal force and free stream velocity constraints from being transferred to FIA 102, the AA comprises an MSA 103 and a connecting apparatus. FIA 102 is uncoupled from the instantaneous internal force constraint of the isolated fuselage by MSA 103 as well as any other apparatuses of the AA that are not already part of FIA 102 or MSA 103. MSA 103 and the aforementioned other apparatuses are configured to apply to the isolated fuselage the difference between the instantaneous internal forces or moment required by the isolated fuselage and any instantaneous internal forces or moments applied by FIA 102 to the isolated fuselage. FIA 102 is uncoupled from the instantaneous free stream velocity constraint of the isolated fuselage by the connecting apparatus. The range of relative motion that has been enabled by the connection apparatus between the center of gravity of FIA 102 and the center of gravity of the isolated fuselage as well as between the center of gravity of MSA 103 and the center of gravity of the isolated fuselage have been described previously. The periodicity constraint on the position of the center of gravity of FIA 102 and MSA 103 in the fuselage frame during nominal, level cruise is equivalent to a constant average velocity constraint, where this average velocity is equal to the average cruise velocity in the inertial frame, or equal to zero in the fuselage frame. Therefore, in accordance with some embodiments, the instantaneous internal force constraint and the instantaneous free stream velocity constraint on the AA have been uncoupled from FIA 102 contained within the AA. Thus FIA 102 can be operated with an average internal force constraint as well as an average free stream velocity constraint. This also applies to MSA 103. This improves the vehicle performance as measured for some vehicles and trajectories. Features in accordance with some embodiments will now be described.

During nominal, level cruise, the relative position of a rod apparatus tip to the rod apparatus base is a periodic path in the fuselage xz-plane. For a given rod apparatus, this path can take several shapes depending on the objective.

In some embodiments, the motion during one trajectory embodiment for nominal, level cruise, can be described as follows. FIA 102 is configured to generate a NFF substantially via the second type of fluid interaction.

Owing to the instantaneous zero net acceleration constraint on the isolated fuselage, the isolated fuselage is configured to move with a constant instantaneous velocity in the inertial frame which is equal to the given cruise velocity of the vehicle.

In order to describe the periodic motion of FIA 102 and MSA 103, one could describe one period in terms of 4 phases. These 4 phases are labelled "forcing phase 1", "transition phase 1", "cruising phase 1", and "transition phase 2". In other trajectory embodiments, one period may be described in terms of a different composition of phases. For example, if the specified FIA is not able to modify its wetted area, or if it is not desirable for the FIA to do so, one period may be described in terms of two forcing phases separated from each other by transition phases. The benefit of using a dedicated MSA instead of one or more additional FIAs is the increased freedom in determining the ratio xt, which is the ratio of the duration of the forcing phase to the duration of one period.

The operation of FIA 102 is similar to the operation of FIA 202 described previously, where the function of FIA 203 is fulfilled by MSA 103.

MSA 103 performs a similar function as FIA 203 during forcing phase 1. The NFF acting on MSA 103 in some embodiments arises primarily from the drag force experienced by MSA 103. The NFF is therefore substantially parallel to and pointing in the direction of the free stream flow velocity of MSA 103. The NFF has a component in the negative X-direction. The component of the NFF in the Z-direction varies with the velocity of MSA 103 in the inertial frame. Note that in other embodiments, a non-negligible portion of the NFF acting on the MSA may also arise from other sources, such as lift forces due to a rate of change of momentum of the fluid, or buoyancy forces. MSA 103 also experiences a net weight force due to the mass associated with its elements. A net internal force is also acting on MSA 103. During forcing phase 1, a portion of the internal force applied by FIA 102 to the remainder of the vehicle is applied to MSA 103. The internal force applied to MSA 103 has a positive component along the internal force applied by FIA 102 to the remainder of the vehicle. The internal force applied to MSA 103 has a component the positive Z-direction. In some embodiments, the component in the X-direction is comparatively negligible. When all these forces acting on MSA 103 are summed together, a net force is found. This net force accounts for any deceleration or acceleration of MSA 103 along its desired trajectory in the inertial frame. During forcing phase 1 the net force is directed in the positive Z-direction and negative X-direction.

During forcing phase 1, the momentum of MSA 103 increases in the direction of the net force.

During forcing phase 1, work is done by the remainder of the vehicle on MSA 103. Work is also done by FIA 102 on the remainder of the vehicle.

The translational velocity of MSA 103 in the inertial frame has a component in the positive X-direction during forcing phase 1. The component in the Z-direction is negative at the beginning of forcing phase 1, and positive at the end of forcing phase 1. The component in the Y-direction is zero at all times in this trajectory example.

In some embodiments, the rotational velocity of the depicted casing of MSA 103 has a velocity in the inertial frame is parallel to the Y-axis at all times during nominal, level cruise. The rotation of the depicted casing of MSA 103 is intended to minimize the drag on MSA 103. The rotational velocity is therefore a function of the rate of change of free stream flow velocity of MSA 103. Note that MSA 103 may contain additional apparatuses such as one or more flywheels which have a rotational velocity vector in the inertial frame which is independent of the rotational velocity of the depicted casing.

MSA 103 performs a similar function in cruising phase 1 of FIA 102 as FIA 203 during cruising phase 1 of FIA 202. Both FIA 203 and MSA 103 provide a force to the remainder of the vehicle, a portion of which is transferred to FIA 202 and FIA 102 respectively. In the case of MSA 103, a substantial portion of this force is provided by the rate of change of momentum of MSA 103 as opposed to a rate of change of momentum of the fluid as in the case of FIA 203. As in forcing phase 1, the NFF acting on MSA 103 arises primarily from the drag force experienced by MSA 103. The NFF can therefore be described in the same manner as already discussed in the context of forcing phase 1. MSA 103 also experiences a net weight force due to the mass associated with its elements. A net internal force is also acting on MSA 103. The internal force applied to MSA 103 has a component in the negative X-direction and negative Z-direction. When all these forces acting on MSA 103 are summed together, a net force is found. This net force accounts for any deceleration or acceleration of MSA 103 along its desired trajectory in the inertial frame. During cruising phase 1 the net force is directed in the negative X-direction and negative Z-direction.

During cruising phase 1, the momentum of MSA 103 increases in the direction of the net force.

During cruising phase 1, work is done by the remainder of the vehicle on FIA 102. Work is also done by MSA 103 on the remainder of the vehicle. A portion of momentum absorbed when work was done on the MSA by the remainder of the vehicle during forcing phase 1 is released when the MSA does work on the remainder of the vehicle during cruising phase 1. A portion of the corresponding work that is absorbed and subsequently released is stored in the form of potential and kinetic energy of the MSA, for example. Another portion of this work is lost due to imperfect interactions with the fluid, such as those that lead to drag forces acting on the MSA.

The translational velocity of MSA 103 in the inertial frame has a component in the positive X-direction during cruising phase 1. The magnitude of the translational velocity of MSA 103 during cruising phase 1 is less than the magnitude during forcing phase 1. In some embodiments, the component in the Z-direction is negative throughout cruising phase 1.

During transition phase 1, FIA 102 and MSA 103 are reconfigured to assume the configuration and state of FIA 102 and MSA 103 in cruising phase 1, respectively. In some embodiments, the duration of the transition phase is as short as possible since it might involve temporarily less ideal operation of the vehicle compared to forcing phase 1 or cruising phase 1. As before, the operation of the vehicle during the transition process can be a function of actuation or structural constraints. The most suitable operation of the vehicle during the transition phase depends on the details of the vehicle. During transition phase 2, FIA 102 and MSA 103 are reconfigured to assume the configuration and state of FIA 102 and MSA 103 in forcing phase 1, respectively.

The aforementioned velocities of FIA 102 and MSA 103 in the inertial frame result in the following velocities relative to the AFIAF. During forcing phase 1, FIA 102 has a velocity relative to the AFIAF with components along the positive z-direction and negative x-direction of the AFIAF. MSA 103 has a velocity relative to the AFIAF with components along the positive x-direction of the AFIAF. The component of the velocity of MSA 103 relative to the AFIAF in the z-direction is positive at the start of forcing phase 1, and negative at the end.

During cruising phase 1, FIA 102 has a velocity relative to the AFIAF with components along the negative z-direction and positive x-direction of the AFIAF. MSA 103 has a velocity relative to the AFIAF with components along the negative x-direction and negative z-direction of the AFIAF.

The relative positioning of MSA 103 and FIA 102 relative to the fuselage and relative to each other is subject to considerations similar to those already described in the context of FIA 202 and FIA 203.

Meeting any instantaneous and average moment constraints on some apparatuses of the vehicle can be accomplished using methods and configurations similar to those already described in the context of FIA 202 and FIA 203.

Note that MSA 103 can also contain a moment generating apparatus, such as a flywheel or an apparatus comprising a gyroscope.

The apparatuses and methods for actuation of the vehicle shown in FIGS. 1-13 are subject to considerations similar to those already described in the context of FIA 202 and FIA 203.

In FIG. 7 three different views of the same trajectories in the inertial frame are shown. The locomotion type is nominal, level cruise. From top to bottom, the figure contains a side view, followed by a top view, followed by a perspective view of the vehicle. In the side and top view, the vehicle is travelling from left to right, and in the perspective view it is travelling from the bottom left to the top right. The paths traced in the inertial frame by points on the vehicle are also shown.

The top sequence shows the right side of the vehicle which is moving from left to right in the figure. The middle sequence is a top view of the vehicle shown at same points in time as in the top sequence. The bottom sequence is a projected view from the top rear of the vehicle. Each configuration snapshot shows the vehicle at a different location as viewed by an observer stationary in the inertial frame. The trajectories shown are the path 136 of fuselage 101, path 137 of the tip of wing apparatus 106, path 138 of the tip of wing apparatus 107, path 139 of MSA 103. Snapshots 124, 128, 129, 130, 131, 132 depict the vehicle during forcing phase 1, with wing apparatuses 106 and 107 of FIA 102 in their fully extended configurations. Snapshot 125 shows the vehicle during transition phase 1. Snapshot 126 exemplifies cruising phase 1, with wing apparatuses 106 and 107 now in their fully retracted configuration. Snapshots 127 illustrates the reconfiguration occurring during transition phase 2.

Note that the trajectory shown in FIG. 7 is a sketch meant to illustrate the basic principles that could be employed by a vehicle with similar features. The most suitable trajectory which satisfies the constraints depends on the embodiment and objective.

FIGS. 8-11 show the same trajectories as FIG. 7 as viewed by an observer moving with the fuselage frame. The paths indicate the relative motion of the wing apparatus tips and a reference point on MSA 103 in the fuselage frame during one period.

Figure 8:
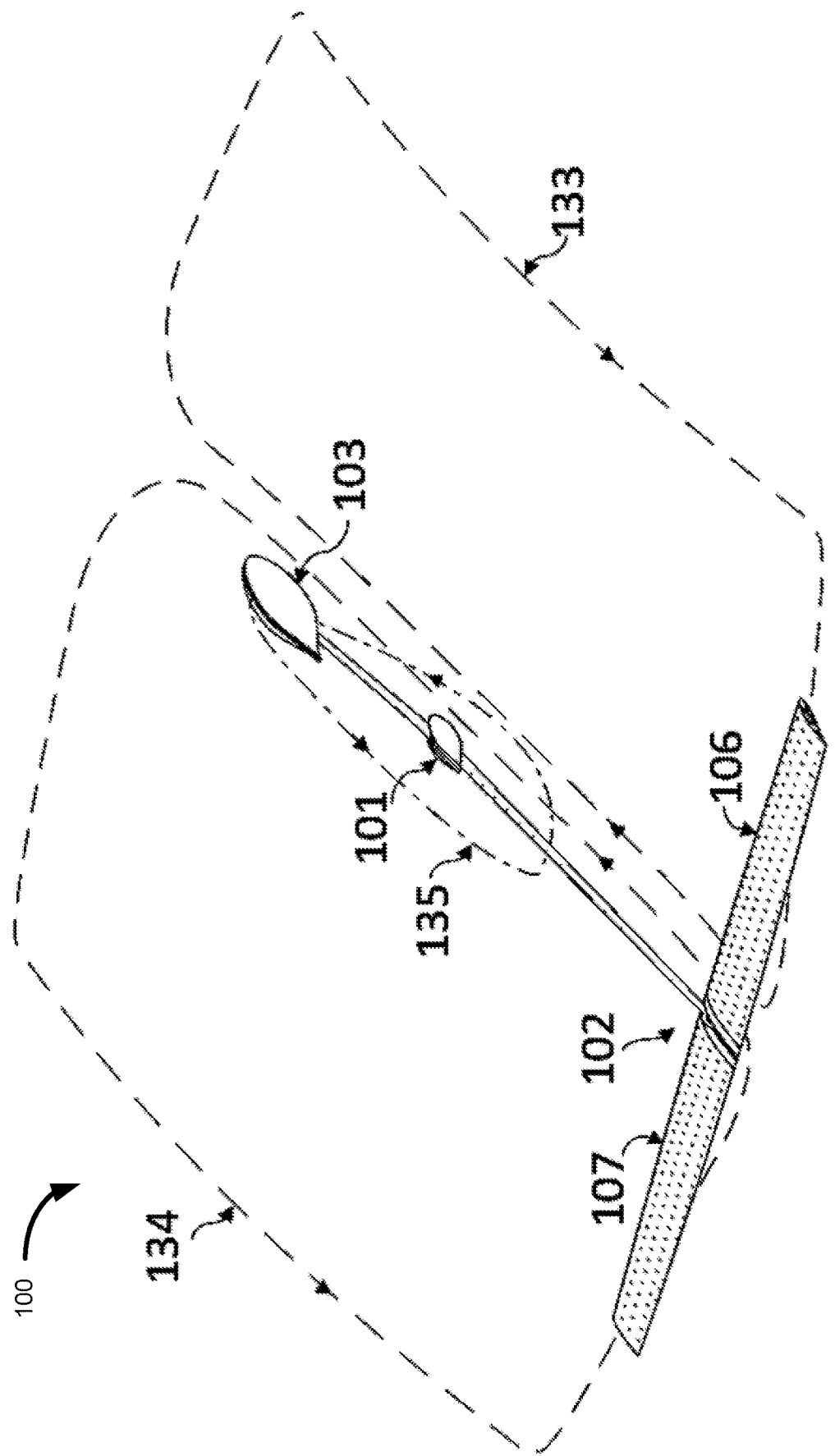
FIG. 8 is a perspective view of the vehicle shown in FIG. 1, illustrating paths traced by points on the vehicle during the trajectory shown in FIG. 7 as viewed by an observer travelling with the average velocity of the vehicle, in accordance with some embodiments.

FIG. 8 shows a perspective view of the relative path 133 of the tip of wing apparatus 106, the relative path 134 of the tip of wing apparatus 107, and the relative path 135 of a reference point on MSA 103. A snapshot of the vehicle is also shown. The direction of motion along the depicted paths is indicated by the arrow heads superimposed on the path.

FIG. 9 shows the side view of the relative paths 133 to 135 during nominal, level cruise as well as the vehicle snapshot. The fuselage frame y-axis is pointing out of the page, and the x-axis is pointing to the right. In the configuration shown the vehicle is in transition phase 1, with FIA 102 reducing its wetted area by retracting wing apparatuses 106 and 107.

Figure 10:
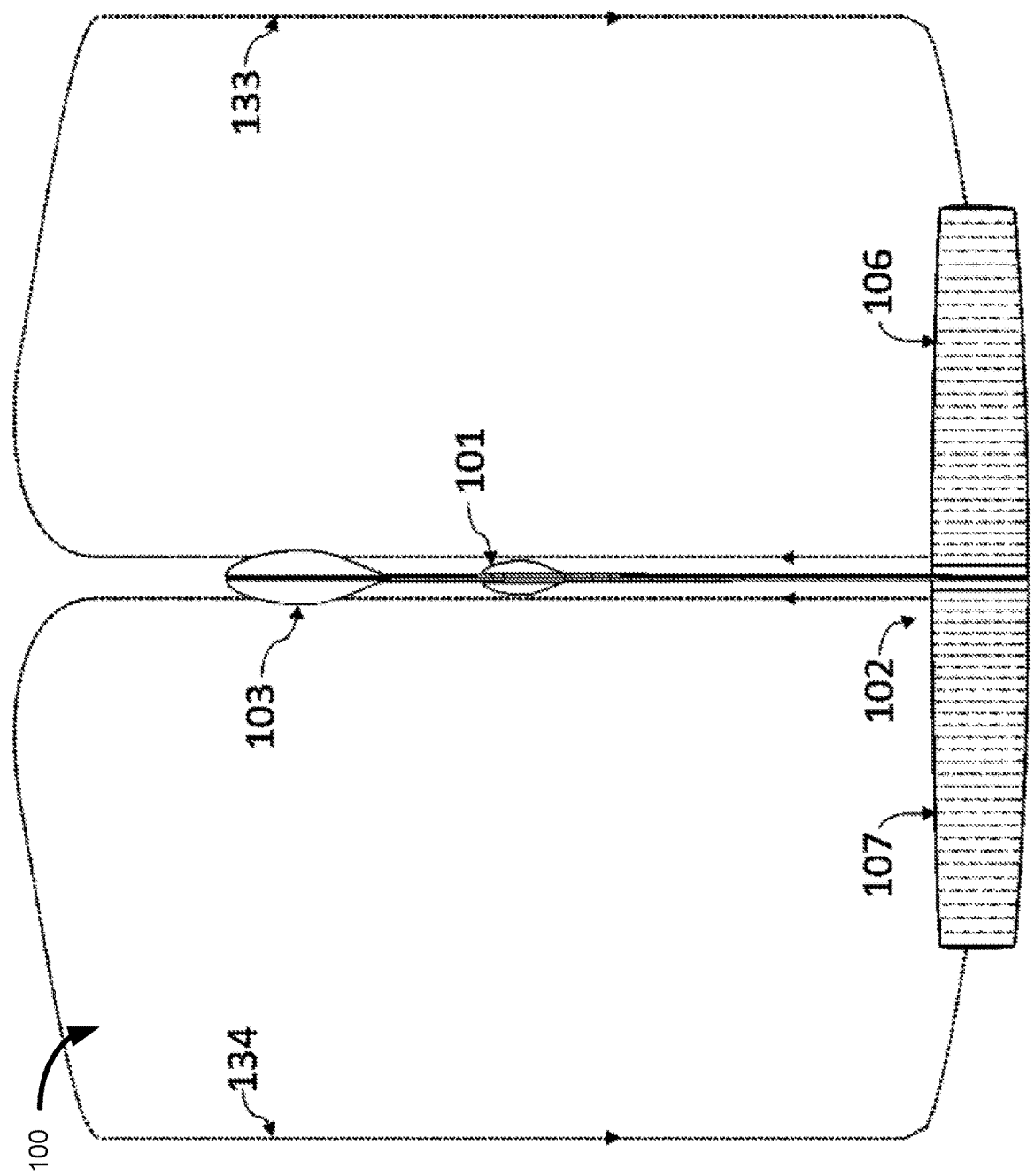
FIG. 10 is a top view of the vehicle and trajectory shown in FIG. 8, in accordance with some embodiments.

FIG. 10 shows a top view of the relative paths of FIG. 8 as well as the vehicle snapshot. The fuselage frame z-axis is pointing into the page, and the fuselage frame y-axis is pointing to the right. The change of wetted area by means of telescopic extension and retraction of the wing apparatuses is particularly apparent.

Figure 11:
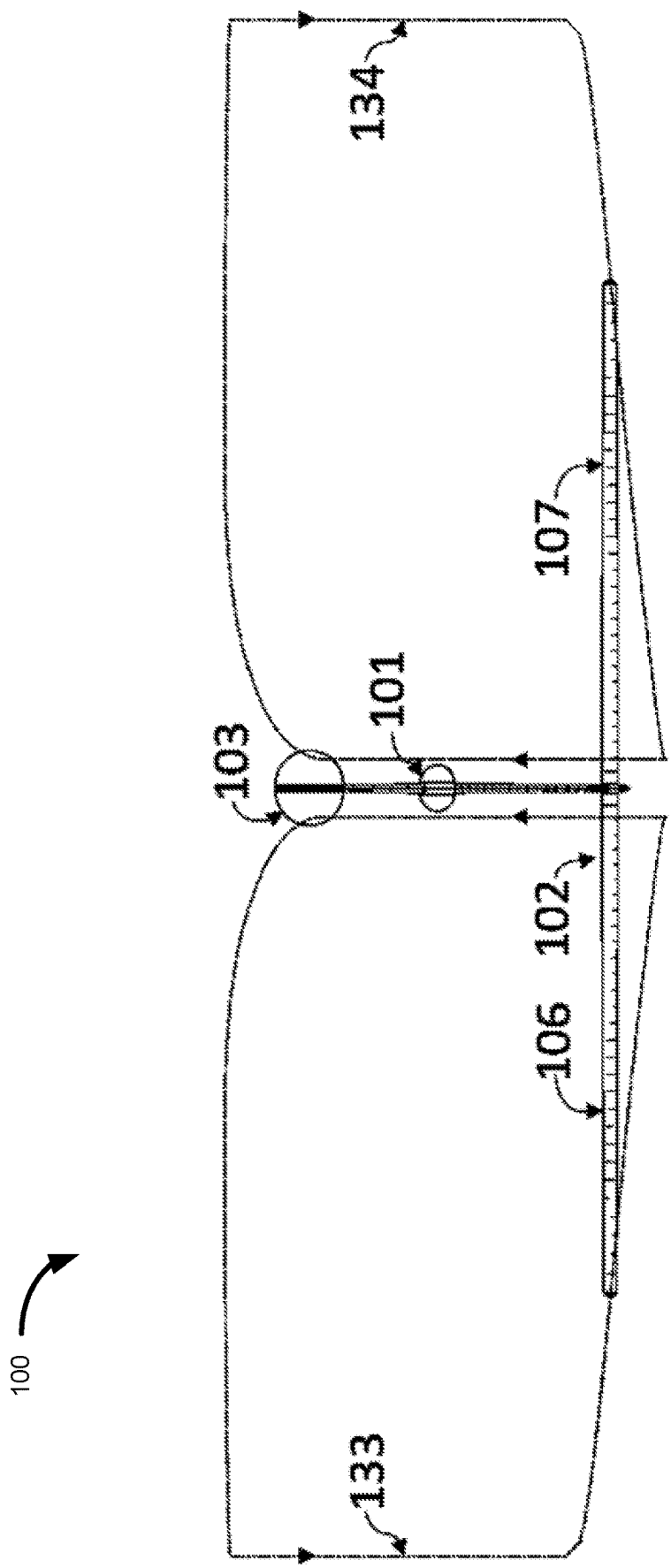
FIG. 11 is a front view of the vehicle and trajectory shown in FIG. 8, in accordance with some embodiments.

FIG. 11 is a frontal view of the scene shown in FIGS. 8-10.

FIG. 12 shows the vehicle in a configuration that illustrates the individual degrees of freedom. Note that some or all of the wing and rod apparatuses can rotate and extend independently to other wing and rod apparatuses within the allowed range of angles and lengths.

FIG. 13 is a side view of the scene shown in FIG. 12.

Figure 25:
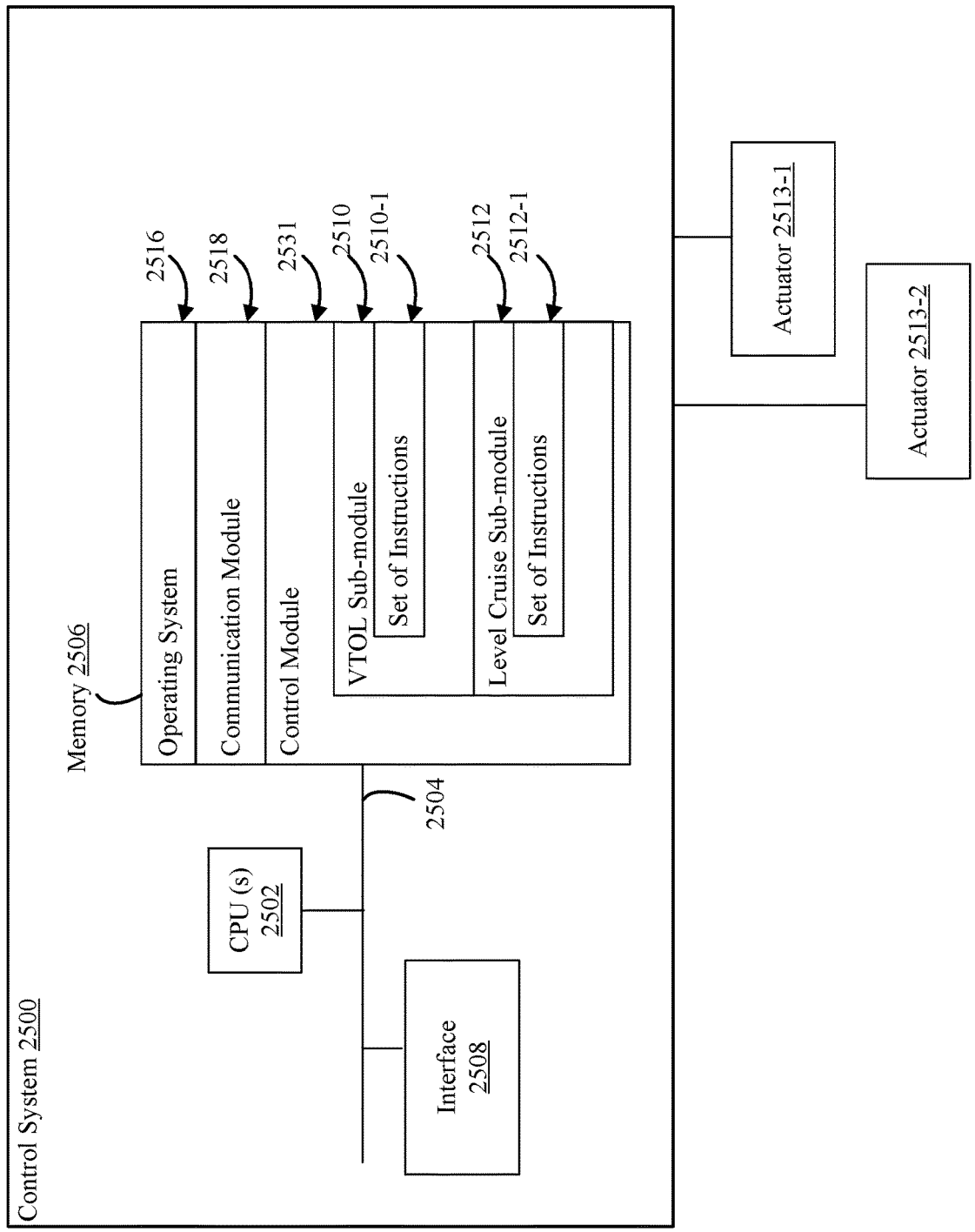
FIG. 25 illustrates a computer-implemented control system for controlling an aircraft, in accordance with some embodiments.

FIG. 25 is a block diagram illustrating a computer-implemented control system 2500 (e.g., a flight control system). In some embodiments, control system 2500 is used to control the movement of a fluid interaction apparatus (e.g., fluid interaction apparatus 100, FIGS. 1-13, or fluid interaction apparatus 200, FIGS. 14-24) (e.g., an aircraft). While certain specific features are illustrated, those skilled in the art will appreciate from the present disclosure that various other features have not been illustrated for the sake of brevity and so as not to obscure more pertinent aspects of the implementations disclosed herein.

To that end, control system 2500 includes one or more processing units (CPUs) 2502, one or more network or other communications interfaces 2508, memory 2506, and one or more communication buses 2504 for interconnecting these and various other components. The communication buses 2504 may include circuitry (sometimes called a chipset) that interconnects and controls communications between system components. Memory 2506 includes high-speed random access memory, such as DRAM, SRAM, or other random access solid state memory devices; and may include non-volatile memory, such as one or more magnetic disk storage devices, optical disk storage devices, flash memory devices, or other non-volatile solid state storage devices. Memory 2506, including the non-volatile and volatile memory device(s) within memory 2506, comprises a non-transitory computer readable storage medium.

In some implementations, memory 2506 or the non-transitory computer readable storage medium of memory 2506 stores the following programs, modules and data structures, or a subset thereof including an operating system 2516, a network communication module 2518, and a control module 2531.

The operating system 1016 includes procedures for handling various basic system services and for performing hardware dependent tasks.

In some embodiments, control system 2500 controls the movement of any of the fluid interaction apparatus described here. For example, control system 2500 controls the movement of an aircraft that includes a body having a longitudinal axis, a telescopic wing configured to extend and contract along a primary axis of the telescopic wing during periodic movement of the telescopic wing relative to the body, and a support member having a first end rotatably coupled to the body and an opposing second end rotatably coupled to the telescopic wing. Control system 2500 includes a set of modules for controlling the movement of the aircraft. For example, in some embodiments, the aircraft includes a first actuator 2513-1 configured to extend and contract the telescopic wing along the span of the telescopic wing during the periodic movement of the telescopic wing relative to the body and a second actuator 2513-2 configured to rotate the support member about a first axis of rotation. Memory 2506 stores instructions to drive one or more actuators 2513 (e.g., including the first actuator 2513-1) to effect periodic movement of the telescopic wing relative to the body. In some embodiments, memory 2506 stores instructions to drive one or more actuators 2513 to effect the expansion and contraction of the telescopic wing.

In some embodiments, memory 2506 stores instructions for a plurality of flight modes. For example, memory 2506 stores a vertical take-off and landing (VTOL) module 2510 with a corresponding set of instructions 2510-1 to drive the actuators 2513 on the aircraft to effect a vertical take-off and landing (VTOL) flight mode. In addition, memory 2506 stores a level cruise sub-module 2512 with a corresponding set of instructions 2512-1 to drive the actuators 2513 to effect a level cruise mode (e.g., in which the body travels in a level trajectory). In some embodiments, in the level cruise mode, the support member rotates entirely around the body of the aircraft. In some embodiments, the memory 2506 stores a set of instructions for a mode in which the support member does not rotate entirely around the body of the aircraft (e.g., effects a linear path of the wing).

The network communication module 2518 facilitates communication between the control system 2500 and other devices (e.g., the actuators) via the one or more communication network interfaces 2508 (wired or wireless) and one or more communication networks, such as those typically used in fly-by-wire and fly-by-optics avionics systems.

The flight controls (e.g., generated automatically using the control module) are converted to electronic signals transmitted by the one or more communication network interfaces 2508. Control module 2531 determines how to move the actuators 2513 at the various control surface to provide expected responses. Commands from computer 2500 are also input (e.g., without a pilot's knowledge) to stabilize the aircraft and perform other tasks.

FIG. 26 is a flow diagram of a method 2600 for interacting with a fluid. Some operations of method 2600 (e.g., moving operation 2604 and/or changing operation 2606 are optionally performed or controlled by a computer system (e.g., control system 2500, FIG. 25).

Method 2600 includes providing (2602) a fluid interaction apparatus that includes a wing having a first configuration with a first profile drag coefficient and a second configuration (e.g., different from the first) with a second profile drag coefficient that is less than the first profile drag coefficient. the fluid interaction apparatus also includes a body coupled to the wing. The fluid interaction apparatus can be any of the fluid interaction apparatuses provided herein (e.g., fluid interaction apparatus 100/200). In some embodiments, the fluid interaction apparatus is a vehicle (e.g., an aircraft or a boat/ship). In some embodiments, the fluid interaction apparatus is stationary (e.g., fixed to the ground). In some embodiments, the fluid interaction apparatus is a wind turbine. In some embodiments, the wing is or is replaced by a foil, blimp, propeller blade, or turbine blade.

Method 2600 includes moving (2604) (e.g., driving) the wing through a fluid in a periodic path relative to the body, including moving the wing in a first direction (e.g., through the fluid, relative to the body) during a first phase of the periodic path and, during a second phase of the periodic path, moving the wing in a second direction (e.g., through the fluid, relative to the body) having a substantial component parallel to a velocity of the fluid. The first direction and the second direction are different directions. In some embodiments, the first direction is substantially opposite the second direction. In some embodiments, the first direction is substantially parallel to the second direction. In some embodiments, moving the wing periodically in the periodic path produces lift or thrust. In some embodiments, the periodic path is a non-circular periodic path in a reference frame of the body (e.g., in the XZ-plane). In some embodiments, the periodic path is a non-ellipsoid in a reference frame of the body (e.g., in the XZ-plane).

In some embodiments, the method 2600 includes moving the body in a direction (e.g., relative to the ground or relative to wind). Moving the wing periodically in the periodic path relative to the body includes moving the wing in the same direction as the body (relative to a stationary reference on the ground) (e.g., moving the wing with a substantial component in the same direction as seen by the stationary reference). In some embodiments, moving the wing includes translating the wing relative to the body (e.g., the wing has at least one translational degree-of-freedom relative to the body, e.g., along the x-axis as defined above).

In some embodiments, the periodic path has a period of less than a minute, or less than 10 seconds, or less than 1 second. In some embodiments, the second direction is toward a front of the body (e.g., as defined by the designed-for use or travel-direction of the fluid interaction apparatus). In some embodiments, the first direction is toward the rear of the body.

In some embodiments, the body is coupled to the wing by a telescopic support member. In some embodiments, moving the wing periodically in the periodic path relative to the body includes extending (or contracting) the telescopic support member (e.g., the telescopic support member has an extended configuration and a contracted configuration, and moving the wing periodically in the periodic path relative to the body includes changing the telescopic support member from the extended configuration to the contracted configuration).

Method 2600 includes changing (2606) (e.g., morphing) the wing from the first configuration when moving in the first direction to the second configuration when moving in the second direction. In some embodiments, the wing is changed from the first configuration to the second configuration periodically, with a period of less than a minute, less than 10 seconds, or less than 1 second. In some embodiments, the period over which the wing is changed from the first configuration to the second configuration and back again is the same as the period of the periodic path of the wing.

In some embodiments, changing the wing from the first configuration when moving in the first direction to the second configuration when moving in the second direction includes changing a wetted area of the wing (e.g., the first configuration has a first wetted area and the second configuration has a second wetted area that is different and less than the first). In some embodiments, changing the wetted area includes changing a volume of the wing. For example, as described above, in some embodiments, the wing is a telescopic wing, and extending/contracting the telescopic wing changes the volume of the wing, which changes the wetted area of the wing, which changes the equivalent flat plate drag area for zero-lift drag of the wing.

As used herein, the equivalent flat plate drag area for zero-lift drag is calculated using the following equation:

$$A_0 = \frac{D_0}{\frac{1}{2}\rho U_{inf}^2} \quad (2)$$

where $D_0$ is the zero-lift drag, $\rho$ is the free stream fluid density, and $U_{inf}$ is the magnitude of the free stream flow velocity.

In some embodiments, changing the wing from the first configuration when moving in the first direction to the second configuration when moving in the second direction relative to a body includes changing a profile drag coefficient. Profile drag is the drag incurred from frictional resistance of blades (e.g., airfoils) passing through the air. In general, it does not change significantly with angle of attack of the blade section, but increases moderately as airspeed increases. As used herein, the profile drag coefficient refers a constant reference area profile drag coefficient (e.g., a profile drag coefficient calculated using a constant reference area, even though the wetted area of the wing may change over the period of the periodic path). For example, in some embodiments, the profile drag coefficient is calculated using the following equation:

$$C_{d0} = \frac{D_0}{\frac{1}{2}\rho U_{inf}^2 S_{ref}} \quad (1)$$

where $S_{ref}$ is a suitable reference area for the wing. For example, $S_{ref}$ may be an average area over the periodic path, a maximum area over the periodic path, or a minimum area over the periodic path.

As noted above, the profile drag (and thus profile drag coefficient) may change slightly with the airspeed (free stream flow) increase. This disclosure, however, refers to a profile drag coefficient that is independent of the free stream flow (e.g., a property of the wing, not the fluid).

In addition, as used herein, the profile drag coefficient refers to the component of the total drag coefficient which is not a function of the lift coefficient. The profile drag coefficient can thus be considered to be a zero-lift drag coefficient. Thus, wherever the term "profile drag" appears in this disclosure, it may be replaced by the term "zero-lift drag." In some cases, the term "lift" can also be replaced by the term "thrust".

Since the reference area is constant throughout a reconfiguration of the wing as defined herein, the profile drag coefficient is proportional to the equivalent flat plate drag area for zero-lift drag. Thus, wherever the term "equivalent flat plate drag area for zero-lift drag" appears in this disclosure, it may be replaced by the term "profile drag coefficient," and vice-versa.

In some embodiments, changing the wing from the first configuration to the second configuration includes modifying an orientation (e.g., angle-of-attack) of the wing.

In some embodiments, changing the wetted area of the wing includes decreasing the wetted area of the wing, relative to an average wetted area of the wing, during the second phase of the periodic path during which the wing is moving faster than the body (e.g., is moving toward the front of the body). In some embodiments, changing the wetted area of the wing includes increasing the wetted area of the wing, relative to an average wetted area of the wing, during the first phase of the period during which the wing is moving slower than the body (e.g., moving toward the rear of the body).

In some embodiments, changing the wing from the first configuration when moving in the first direction to the second configuration when moving in the second direction changes the net fluid force (e.g., the vector sum of lift and drag) on the wing. For example, during the first phase (e.g., the cruising phase) the net fluid force is larger than an average net fluid force on the wing; the free stream velocity is smaller than an average free stream velocity of the wing; and the volume, profile drag coefficient, and/or wetted area are larger than an average volume, profile drag coefficient, and/or wetted area of the wing. Similarly, during the second phase (e.g., the forcing phase) the net fluid force is smaller than the average net fluid force on the wing; the free stream velocity is larger than the average free stream velocity of the wing; and the volume, profile drag coefficient, and/or wetted area are smaller than the average volume, profile drag coefficient, and/or wetted area of the wing.

It will also be understood that, although the terms first, second, etc. are, in some instances, used herein to describe various elements, these elements should not be limited by these terms. These terms are only used to distinguish one element from another. For example, a first wing could be termed a second wing, and, similarly, a second wing could be termed a wing, without departing from the scope of the various described implementations. The first wing and the second wing are both wings, but they are not the same wing unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A fluid interaction apparatus, comprising:
    a wing having a first configuration with a first profile drag coefficient and a second configuration with a second profile drag coefficient that is less than the first profile drag coefficient;
    a body having a longitudinal axis, wherein the body is coupled to the wing, the wing being configured to move substantially periodically in a lift- or thrust-producing periodic path relative to the body; and
    an actuator configured to change the wing from the first configuration while the wing is moving along the lift- or thrust-producing periodic path in a first direction relative to the body to the second configuration while the wing is moving along the lift- or thrust-producing periodic path in a second direction relative to the body, the second direction having a substantial component parallel to the longitudinal axis of the body.

2. The fluid interaction apparatus of claim 1, further including an actuator configured to move the wing relative to the body.

3. The fluid interaction apparatus of claim 1, wherein the first configuration has a first wetted area and the second configuration has a second wetted area.

4. The fluid interaction apparatus of claim 1, wherein the fluid interaction apparatus is a vehicle and the longitudinal axis of the body is substantially parallel to a travel direction of the vehicle.

5. The fluid interaction apparatus of claim 1, wherein the body is substantially elongate.

6. The fluid interaction apparatus of claim 1, wherein the body has a substantially tear drop shape.

7. The fluid interaction apparatus of claim 1, wherein the wing is configured to move continuously along the lift- or thrust-producing periodic path relative to the body.

8. The fluid interaction apparatus of claim 1, wherein the wing is configured to move around the body along the lift- or thrust-producing periodic path relative to the body.

9. A method, comprising:
   providing a fluid interaction apparatus that includes:
      a wing having a first configuration with a first profile drag coefficient and a second configuration with a second profile drag coefficient that is less than the first profile drag coefficient; and
      a body coupled to the wing; and
   moving the wing through a fluid in a lift- or thrust-producing periodic path relative to the body, including moving the wing in a first direction during a first phase of the lift- or thrust-producing periodic path and, during a second phase of the lift- or thrust-producing periodic path, moving the wing in a second direction having a substantial component parallel to a velocity of the fluid;
   changing the wing from the first configuration while moving in the first direction along the lift- or thrust-producing periodic path to the second configuration while moving in the second direction along the lift- or thrust-producing periodic path.

10. The method of claim 9, wherein changing the wing from the first configuration while moving in the first direction to the second configuration while moving in the second direction includes changing a wetted area of the wing.

11. The method of claim 10, wherein changing the wetted area includes changing a volume of the wing.

12. The method of claim 11, wherein moving the wing periodically in the lift- or thrust-producing periodic path includes moving the wing periodically with a period of less than a minute.

13. A fluid interaction apparatus, comprising:
   a wing;
   a body coupled to the wing; and
   an actuator configured to move the wing periodically along a lift- or thrust-producing periodic path relative to the body, wherein:
      a direction of motion of the wing within the lift- or thrust-producing periodic path is in a plane perpendicular to the span of the wing; and
      the lift- or thrust-producing periodic path is one of a linear path or a figure-eight-shaped path.

* * * * *